(12) United States Patent
Watanabe et al.

(10) Patent No.: US 7,654,139 B2
(45) Date of Patent: *Feb. 2, 2010

(54) VIBRATORY GYROSENSOR HAVING A VIBRATION ELEMENT PROVIDED WITH TERMINALS

(75) Inventors: Shigeto Watanabe, Miyagi (JP); Junichi Honda, Miyagi (JP); Shin Sasaki, Miyagi (JP); Kazuo Takahashi, Miyagi (JP); Teruo Inaguma, Miyagi (JP); Koji Suzuki, Miyagi (JP); Manabu Aizawa, Miyagi (JP)

(73) Assignee: Sony Corporation, Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 10/599,833

(22) PCT Filed: Feb. 23, 2006

(86) PCT No.: PCT/JP2006/030333

§ 371 (c)(1),
(2), (4) Date: Sep. 26, 2007

(87) PCT Pub. No.: WO2006/090805

PCT Pub. Date: Aug. 31, 2006

(65) Prior Publication Data

US 2008/0257044 A1    Oct. 23, 2008

(30) Foreign Application Priority Data

| Feb. 23, 2005 | (JP) | ............................. 2005-047802 |
| Feb. 25, 2005 | (JP) | ............................. 2005-050962 |
| Mar. 9, 2005 | (JP) | ............................. 2005-066051 |
| Dec. 27, 2005 | (JP) | ............................. 2005-374325 |

(51) Int. Cl.
*G01P 9/04* (2006.01)
*G01C 19/56* (2006.01)

(52) U.S. Cl. ................................. 73/504.12; 73/504.15

(58) Field of Classification Search .............. 73/504.12, 73/504.15, 504.04, 504.16, 504.14; 310/348, 310/330, 370
See application file for complete search history.

(56) References Cited

U.S. PATENT DOCUMENTS 6,140,144 A * 10/2000 Najafi et al. .................. 438/53

(Continued)

FOREIGN PATENT DOCUMENTS

JP          03-00261          1/1991

(Continued)

OTHER PUBLICATIONS

International Search Report dated Mar. 20, 2006.

*Primary Examiner*—Helen C. Kwok
(74) *Attorney, Agent, or Firm*—Sonnenschein Nath & Rosenthal LLP

(57) ABSTRACT

To improve characteristics by achieving size reduction and high Q value with a simple structure. A vibratory gyrosensor 1 according to the present invention includes a supporting substrate 2, which has a circuit element mounted thereon and a wiring pattern having a plurality of lands 4 disposed thereon; and a vibration element 20 mounted on a surface 2-1 of the supporting substrate. The vibration element 20 includes a base portion 22 having a mounting surface 22-2 provided with a plurality of terminals 25 that are connected to the lands; and a vibrator portion 23 extending integrally from a side of the base portion 22 in a cantilever manner and having a substrate-facing surface which is flush with the mounting surface of the base portion 22, the substrate-facing surface being provided with a first electrode layer 27, a piezoelectric layer 28 stacked on the first electrode layer, and a second electrode layer 29, 30 stacked on the piezoelectric layer. The vibration element 20 is mounted on the supporting substrate 2 by joining the terminals 25 to the lands 4 with metallic projections 26 disposed therebetween.

14 Claims, 81 Drawing Sheets

U.S. PATENT DOCUMENTS

| | | | |
|---|---|---|---|
| 6,313,529 B1 * | 11/2001 | Yoshihara et al. | 257/724 |
| 6,631,642 B2 * | 10/2003 | Oguchi et al. | 73/514.32 |
| 7,400,078 B2 * | 7/2008 | Takahashi et al. | 310/348 |
| 2001/0051396 A1 * | 12/2001 | Iwahashi et al. | 438/120 |
| 2002/0158699 A1 * | 10/2002 | Iizuka et al. | 331/158 |
| 2006/0202591 A1 * | 9/2006 | Inaguma et al. | 310/348 |

FOREIGN PATENT DOCUMENTS

| | | |
|---|---|---|
| JP | 07-113643 | 5/1995 |
| JP | 07-201650 | 8/1995 |
| JP | 08-078954 | 3/1996 |
| JP | 08-264540 | 10/1996 |
| JP | 10-051263 | 2/1998 |
| JP | 11-264730 | 9/1999 |
| JP | 11-266135 | 9/1999 |
| JP | 11-289238 | * 10/1999 |
| JP | 2001-308141 | 11/2001 |
| JP | 2005-039435 | 2/2005 |
| JP | 2005-127758 | * 5/2005 |
| WO | 98/41818 | 9/1998 |

* cited by examiner

WIDTH f OF NON-JUNCTION SECTION (um)

FIG. 54

|  | 3cm-SQUARE SUBSTRATE | 4in-φ SUBSTRATE | 5in-φ SUBSTRATE |
|---|---|---|---|
| ONE-AXIS VIBRATION ELEMENTS | 60 (30) | 1200 (600) | 4000 (2000) |
| TWO-AXIS INTEGRATED VIBRATION ELEMENTS | 20 | 300 | 800 |

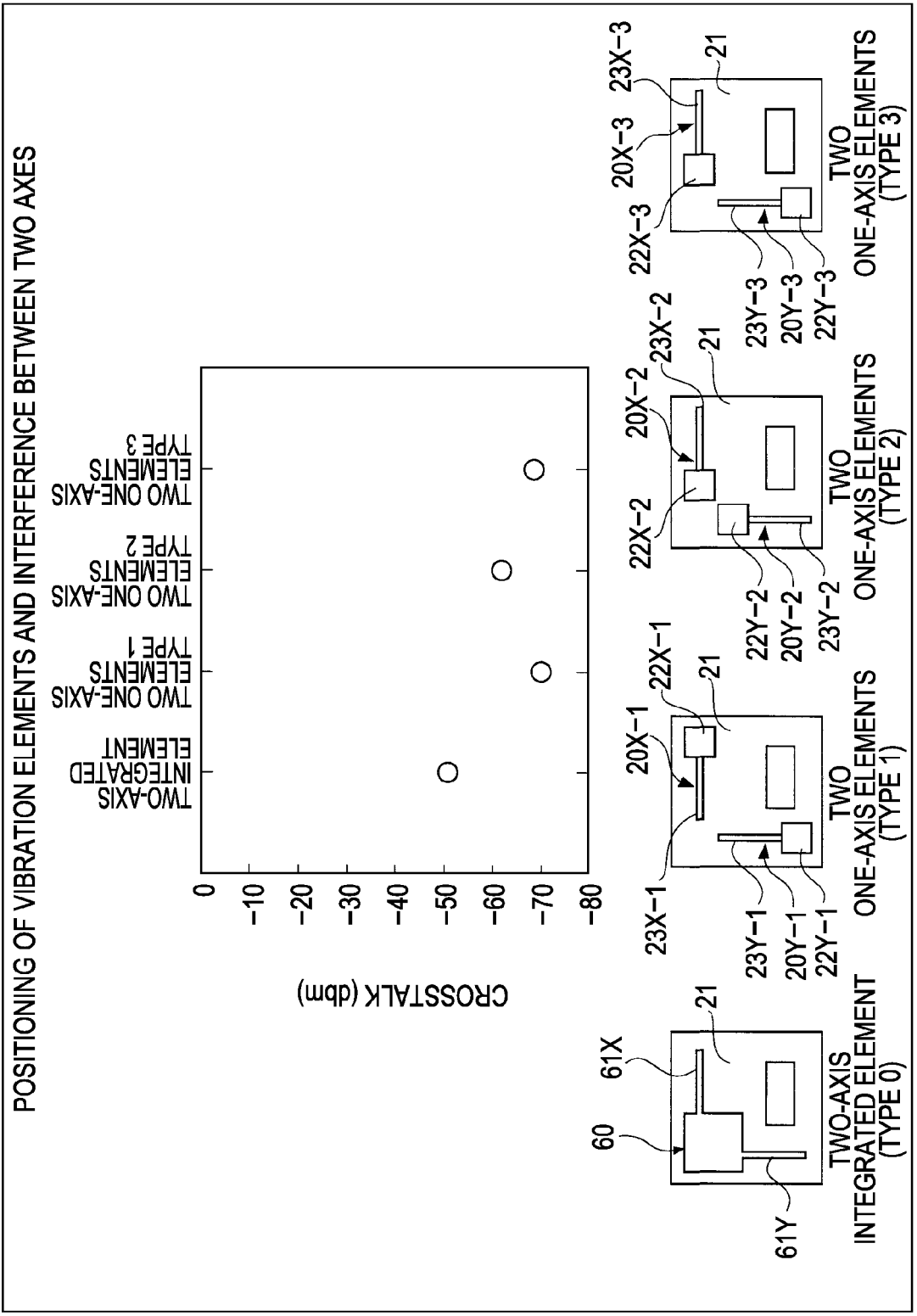

|  | LARGE (A1) | SMALL (A2) |
|---|---|---|
| WIDTH OF GOLD WIRE (μm) | 38 | 25 |
| BALL DIAMETER (μm) | 130 | 90 |

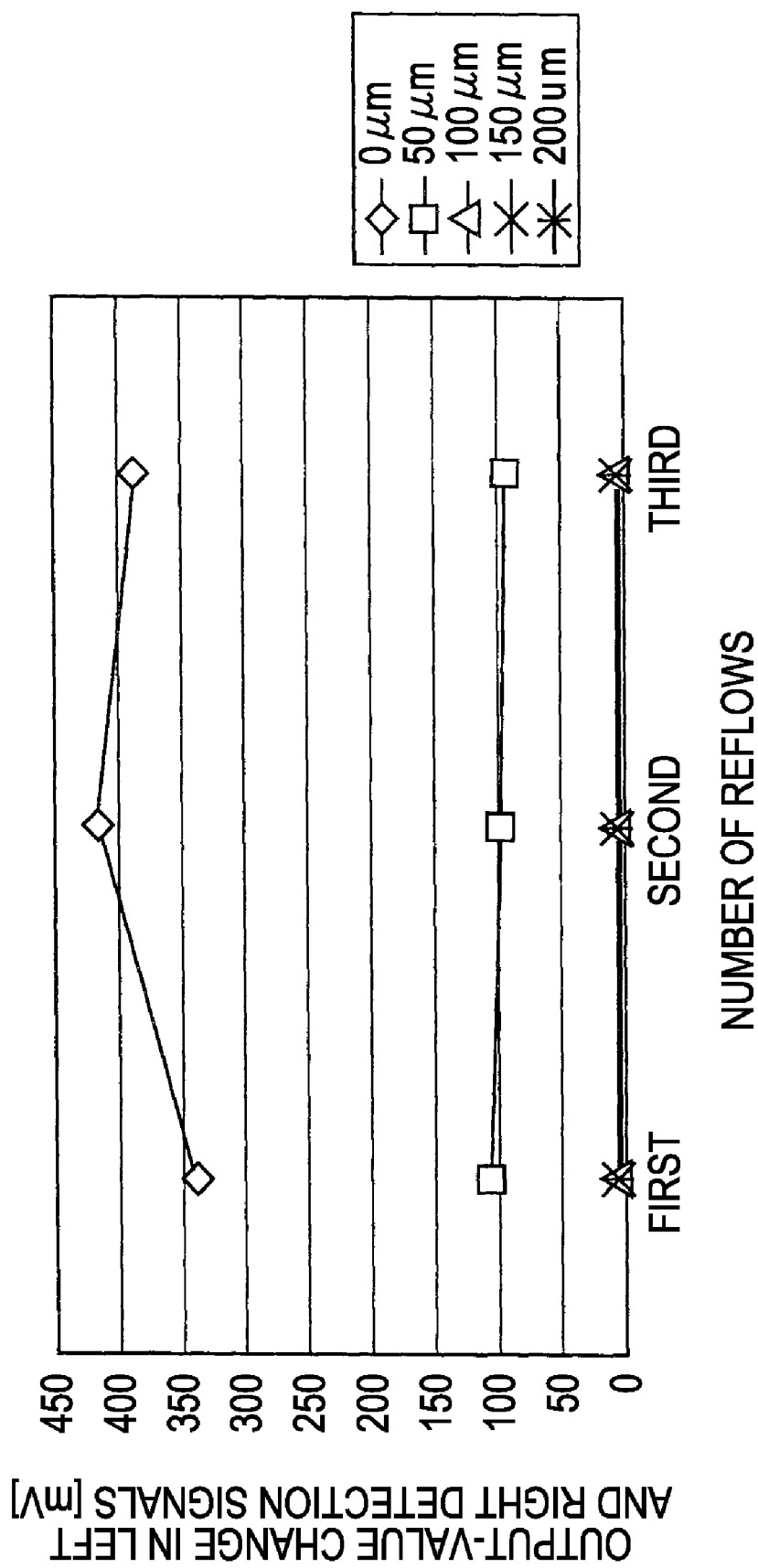

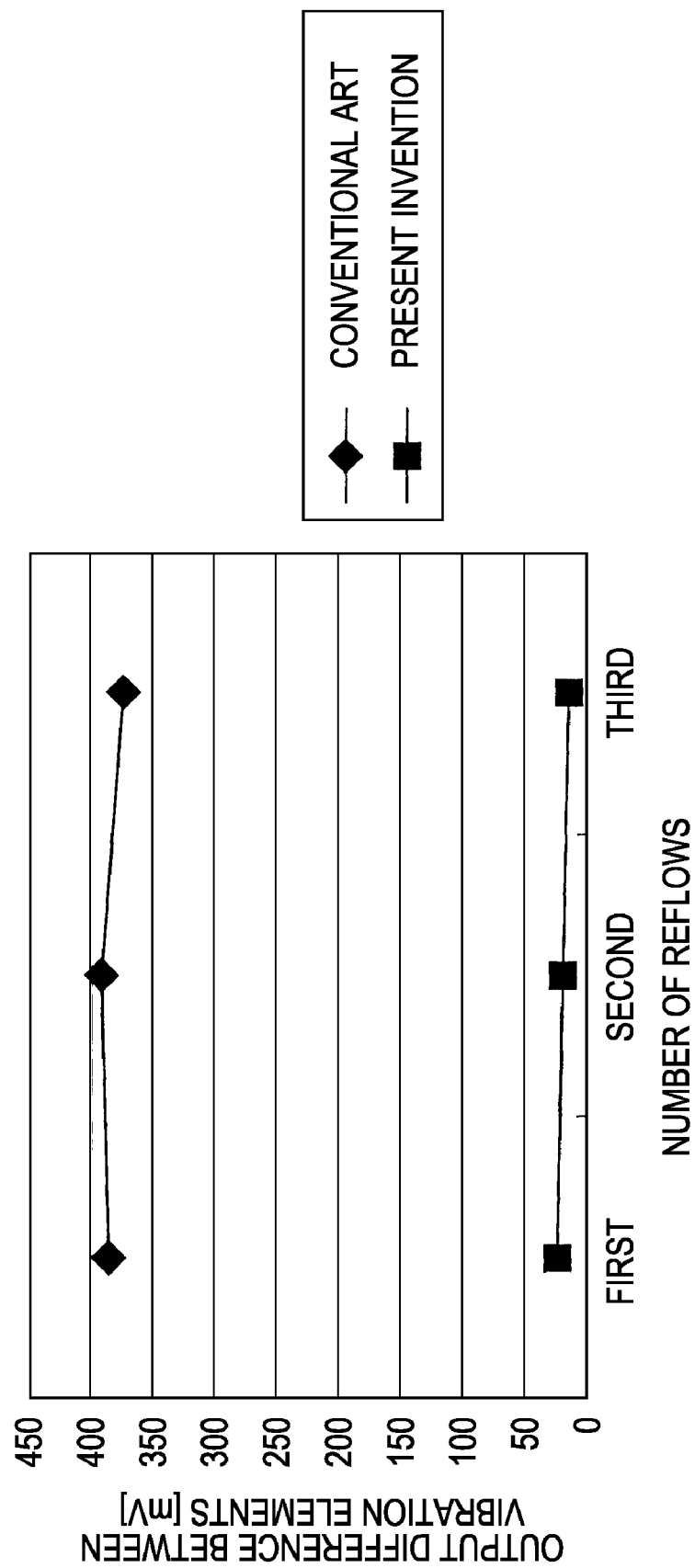

VIBRATORY GYROSENSOR HAVING A VIBRATION ELEMENT PROVIDED WITH TERMINALS

TECHNICAL FIELD

The present invention relates to angular-velocity sensors used as, for example, motion-blur detectors in video cameras, motion detectors in virtual reality devices, or direction finders in car navigation systems. In particular, the present invention relates to a vibratory gyrosensor that includes a vibration element having a cantilever vibrator.

BACKGROUND ART

As consumer-oriented angular-velocity sensors, so-called vibratory gyrosensors are widely used. A vibratory gyrosensor detects an angular velocity by allowing a cantilever vibrator to vibrate at a predetermined resonant frequency, and then detecting a Coriolis force produced in response to an effect of angular velocity using a piezoelectric element.

Vibratory gyrosensors are advantageous in having a simple mechanism, short activation time, and low manufacturing cost. For example, vibratory gyrosensors are incorporated in electronic devices, such as video cameras, virtual reality devices, and car navigation systems, so as to function as sensors for motion-blur detection, motion detection, and direction finding, respectively.

A typical vibratory gyrosensor includes a vibration element which is manufactured by machine-cutting an appropriate piezoelectric material into a predetermined shape. With reduction in size and weight and improvements in functionality and performance of a main apparatus in which a vibratory gyrosensor is to be incorporated, a vibratory gyrosensor requires a smaller size and higher performance. However, it is difficult to manufacture a small vibration element with high precision due to limitations in machining accuracy.

Recently, there has been proposed a vibratory gyrosensor including a cantilever vibration element that is formed by laminating a pair of electrode layers with a piezoelectric thin film layer interposed therebetween on a silicon substrate by means of a thin film technique used in semiconductor processes (for example, see Patent Document 1). Such a vibratory gyrosensor achieves reduction in size and thickness and can thus be combined with a sensor used for other purposes, thereby achieving composition and higher functionality.

With the reduction in size and weight and improvements in functionality and performance of an apparatus in which a vibratory gyrosensor is to be incorporated, a vibratory gyrosensor requires a smaller size and higher performance. For example, by combining a vibratory gyrosensor with another type of sensor, multi-functionality is achieved. Moreover, in the vibratory gyrosensor, the vibration element is mounted on the supporting substrate, and the vibratory gyrosensor is mounted on a control substrate of the main apparatus together with the another type of sensor, thereby achieving size reduction as a whole.

However, in the typical vibratory gyrosensor, the electrodes of the vibration element and terminals provided on the supporting substrate are generally connected to each other by wire bonding. This means that a space is required around the periphery of the vibration element so that the wires can extend within the space. This space is one of the factors that interfere with an achievement of size reduction.

Furthermore, due to the size reduction, a vibratory gyrosensor may be significantly affected by, for example, vibration from the outside. This may be problematic in leading to an increase in cost as the supporting structure for the vibration element becomes more complex. Although an installation condition of a vibratory gyrosensor is determined based on specifications of the apparatus, it is required that predetermined characteristics be stably attained under any condition. In order to attain stable characteristics with high sensitivity in a vibratory gyrosensor, a mechanical quality coefficient Q value (Q factor), which determines the resonant state of the vibration element, must be increased. A mechanical quality coefficient Q value is determined on the basis of the material of the vibration element and the securing structure for the vibration element.

[Patent Document 1] Japanese Unexamined Patent Application Publication No. 7-113643

DISCLOSURE OF INVENTION

In view of the circumstances described above, it is an object of the present invention to provide a vibratory gyrosensor whose characteristics are improved by achieving size reduction and high Q value with a simple structure.

In order to achieve the aforementioned object, the present invention provides a vibratory gyrosensor including a supporting substrate, which has a circuit element mounted thereon and a wiring pattern having a plurality of lands disposed thereon; and a vibration element mounted on a surface of the supporting substrate. The vibration element includes a base portion having a mounting surface provided with a plurality of terminals that are connected to the lands; and a vibrator portion extending integrally from a side of the base portion in a cantilever manner and having a substrate-facing surface which is flush with the mounting surface of the base portion, the substrate-facing surface being provided with a first electrode layer, a piezoelectric layer disposed on the first electrode layer, and a second electrode layer disposed on the piezoelectric layer. The vibration element is mounted on the supporting substrate by joining the terminals to the lands with metallic projections disposed therebetween.

In the vibratory gyrosensor according to the present invention, the metallic projections are defined by, for example, gold bumps or projections extending integrally from the base portion of the vibration element. The vibration element is electrically connected and mechanically fixed to the supporting substrate by joining the terminals of the vibration element to the lands on the supporting substrate with the metallic projections disposed therebetween. Accordingly, this achieves an efficient use of the mounting space.

In the vibratory gyrosensor according to the present invention, a natural vibration occurs in the vibrator portion in response to an alternating voltage of a predetermined frequency applied to the vibration element from the supporting substrate. Then, a Coriolis force produced in the vibrator portion in response to, for example, motion blur is electrically detected, and a detection signal thereof is output. In the present invention, the vibration element has a cantilever structure in which the vibrator portion extends integrally from the base portion in a cantilever manner. Moreover, the vibration element is secured above the supporting substrate in a floating-like state by means of the metallic projections. Accordingly, the displacement-damping rate of the vibrator portion is reduced, whereby a high Q value is attained.

On the other hand, the vibratory gyrosensor is significantly affected by an external load, such as vibration or shock applied from the outside or thermal stress generated when the vibratory gyrosensor is joined to a control substrate of a main apparatus. Thus, a load buffering structure is preferably provided, which can absorb or buffer strain or stress produced in the supporting substrate in response to such an external load.

A load buffering structure may include, for example, a load buffering groove which surrounds a mounting region of the vibration element on the supporting substrate, a groove which extends across a region between a base end of the vibrator portion and one of the terminals with respect to the mounting surface of the base portion of the vibration element, or a load buffering layer provided between the supporting substrate and the control substrate of the main apparatus. By providing the load buffering structure, the vibration element can vibrate stably, thereby achieving improved detection accuracy.

Since the vibration element is mounted on the supporting substrate with the metallic projections disposed therebetween, the vibratory gyrosensor according to the present invention attains stable characteristics with high sensitivity while achieving size reduction and high Q value.

Furthermore, with the load buffering structure, an effect of an external load can be buffered, thereby achieving stable detecting operation and high detection accuracy of the vibration element.

BRIEF DESCRIPTION OF THE DRAWINGS

FIG. 54 is a comparison diagram with regard to the number of elements obtained from the silicon substrate.

FIG. 55 is a characteristic diagram illustrating interference between two axes in accordance with positioning of the vibration elements.

FIG. 80 is a characteristic diagram showing measurement results of a practical example according to the sixth embodiment of the present invention.

FIG. 83 is a characteristic diagram showing measurement results of a practical example according to the seventh embodiment of the present invention.

BEST MODE FOR CARRYING OUT THE INVENTION

Embodiments of a vibratory gyrosensor according to the present invention will now be described with reference to the drawings.

The present invention is not to be limited to the embodiments below, and modifications are permissible within the scope and spirit of the present invention. In this specification, although each portion of an element will be described below using specific dimensional values, each dimensional value is a central reference value. Moreover, the dimensional values of each portion are not limited to these central reference values, and therefore, each portion may be formed with dimensional values within a general tolerance range. Furthermore, the dimensional values of the vibratory gyrosensor are not limited to these dimensional values, and each portion may be formed appropriately in accordance with characteristic specifications.

First Embodiment

[General Structure of Vibratory Gyrosensor]

Figure 1:
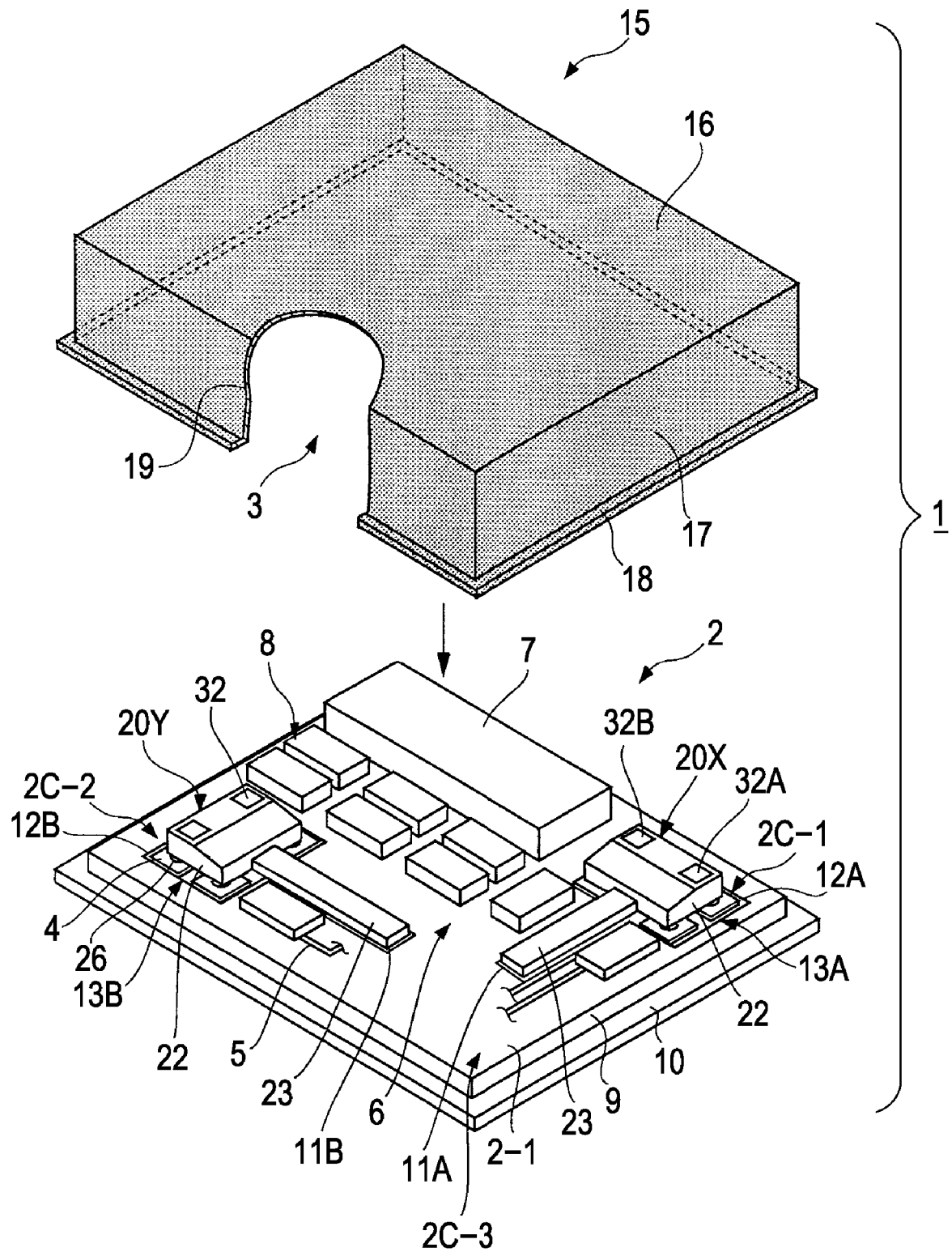
FIG. 1 is an overall perspective view of a vibratory gyrosensor according to a first embodiment of the present invention shown in a state where a cover is detached.

Referring to FIG. 1, a vibratory gyrosensor 1 includes a supporting substrate 2 and a cover 15, which is disposed on a first main surface 2-1 of the supporting substrate 2 so as to provide a component-installation space 3. The supporting substrate 2 and the cover 15 define external members of the vibratory gyrosensor 1. The vibratory gyrosensor 1 serves as a blur correcting mechanism incorporated in, for example, a video camera. Alternatively, the vibratory gyrosensor 1 may serve as, for example, a motion detector in a virtual-reality device or a direction finder in a car navigation device.

In the vibratory gyrosensor 1, a ceramic substrate or a glass substrate, for example, is used as the supporting substrate 2. The first main surface 2-1 of the supporting substrate 2 has a component-installation area 6 which is provided with a predetermined wiring pattern 5 having a plurality of lands 4. The component-installation area 6 has mounted thereon a pair of first and second vibration elements 20X and 20Y, which will be described below in detail, an IC circuit element 7, and a plurality of external ceramic capacitors and electronic components 8. The first and second vibration elements 20X and 20Y (which will simply be referred to as vibration elements 20 hereinafter unless the two are described individually) detect vibrations in different axial directions from each other.

Figure 2:
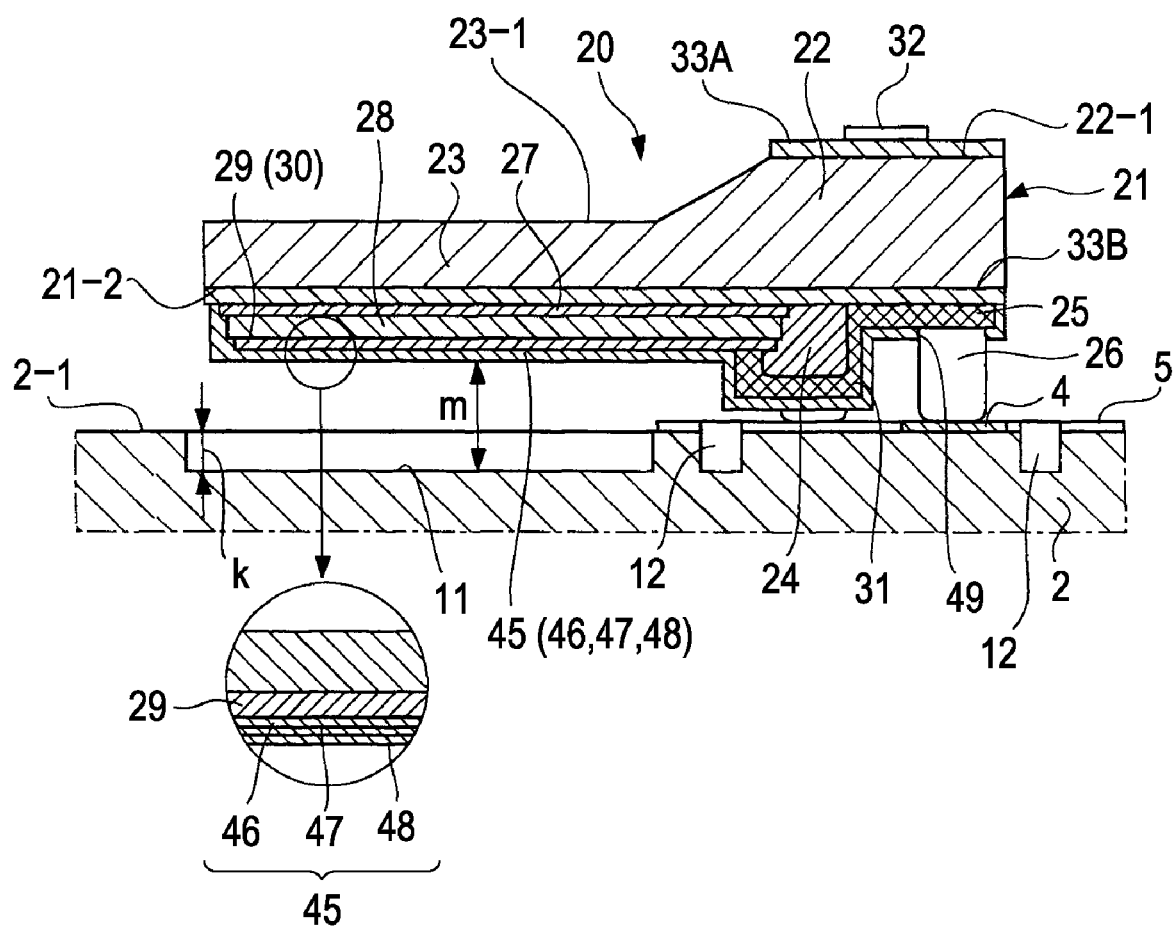
FIG. 2 is a cross-sectional view showing a relevant portion of one of vibration elements included in the vibratory gyrosensor.

The vibration elements 20 are mounted on the component-installation area 6 of the supporting substrate 2 together with the IC circuit element 7 and the electronic components 8 by a surface mounting technique, such as a flip chip assembly technique, using an appropriate mounting device. The pair of vibration elements 20X and 20Y having the same shape is respectively disposed on opposing corner regions 2C-1 and 2C-2 of the first main surface 2-1 of the supporting substrate 2, and has axis lines that are oriented in different directions from each other. Referring to FIG. 2, each of the vibration elements 20 includes a base portion 22 having a mounting surface provided with a plurality of terminals 25 that are connected to the lands 4 with gold bumps 26 therebetween, and a vibrator portion 23 extending integrally from one side of the base portion 22 in a cantilevered manner. The structure of the vibration elements 20 will be described below in detail.

Referring to FIG. 1, the first vibration element 20X has its base portion 22 fixed to a first vibration-element mounting section 13A, which is a floating-island-like section in the corner region 2C-1 within the component-installation area 6 of the supporting substrate 2. Moreover, the vibrator portion 23 extending integrally from the base portion 22 along an edge of the supporting substrate 2 is oriented towards a corner region 2C-3 adjacent to the corner region 2C-1. The second vibration element 20Y has its base portion 22 fixed to a second vibration-element mounting section 13B, which is a floating-island-like section in the corner region 2C-2 within the component-installation area 6 of the supporting substrate 2. Moreover, the vibrator portion 23 extending integrally from the base portion 22 along an edge of the supporting substrate 2 is oriented towards the corner region 2C-3 adjacent to the corner region 2C-2.

In other words, the first vibration element 20X and the second vibration element 20Y are mounted on the supporting substrate 2 in a manner such that the vibrator portions 23 thereof oriented towards the corner region 2C-3 have a 90° relationship with respect to each other. Although the vibratory gyrosensor 1 detects vibrations in two perpendicular axes by means of the pair of vibration elements 20X and 20Y, the vibration elements 20X and 20Y may alternatively be mounted on the supporting substrate 2 at an appropriate angle with respect to each other in accordance with the specifications of a main apparatus.

In a state where the vibrator portions 23 of the vibration elements 20 are resonated, the vibratory gyrosensor 1 detects angular velocities applied to the vibrator portions 23 around the longitudinal directions thereof. In the vibratory gyrosensor 1, the first vibration element 20X and the second vibration element 20Y are disposed at different angles on the supporting substrate 2 so that angular velocities in X-axis and Y-axis directions can be detected simultaneously. Thus, the vibratory gyrosensor 1 serves as a blur correcting mechanism that outputs a control signal based on a vibrational state caused by motion blur in, for example, a video camera.

The structure of the supporting substrate 2 will be described below in detail.

[Load Buffering Structure]

The supporting substrate 2 is given a small thickness so as to achieve a compact, low-profile vibratory gyrosensor 1. This implies that the supporting substrate 2 may be subject to strain or stress in response to an external load, such as vibration or shock applied from the outside. In this embodiment, the supporting substrate 2 is given a buffering structure against external load so as to reduce adverse effects on the vibration elements 20 disposed on the supporting substrate 2 even when the supporting substrate 2 is under strain or stress.

Figure 3:
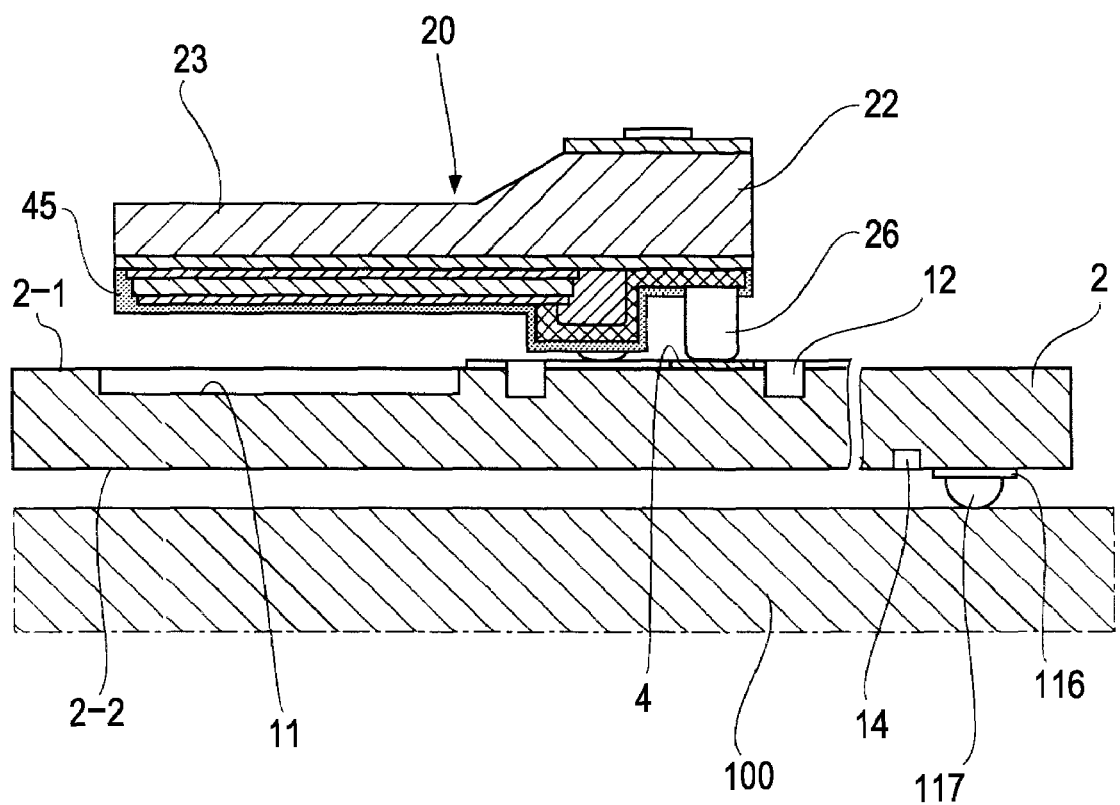
FIG. 3 is a cross-sectional view showing a relevant portion of the vibration element when the vibratory gyrosensor is mounted on a control substrate.

Referring to FIGS. 1 to 3, the supporting substrate 2 is provided with first load buffering grooves 12A, 12B (which will simply be referred to as first load buffering grooves 12 hereinafter unless the two are described individually) respectively in the corner regions 2C-1, 2C-2 of the first main surface 2-1. The vibration-element mounting sections 13A, 13B (which will simply be referred to as vibration-element mounting sections 13 hereinafter unless the two are described individually) are surrounded by the corresponding first load buffering grooves 12. Each vibration-element mounting section 13 has the corresponding vibration element 20 mounted thereon.

Figure 5:
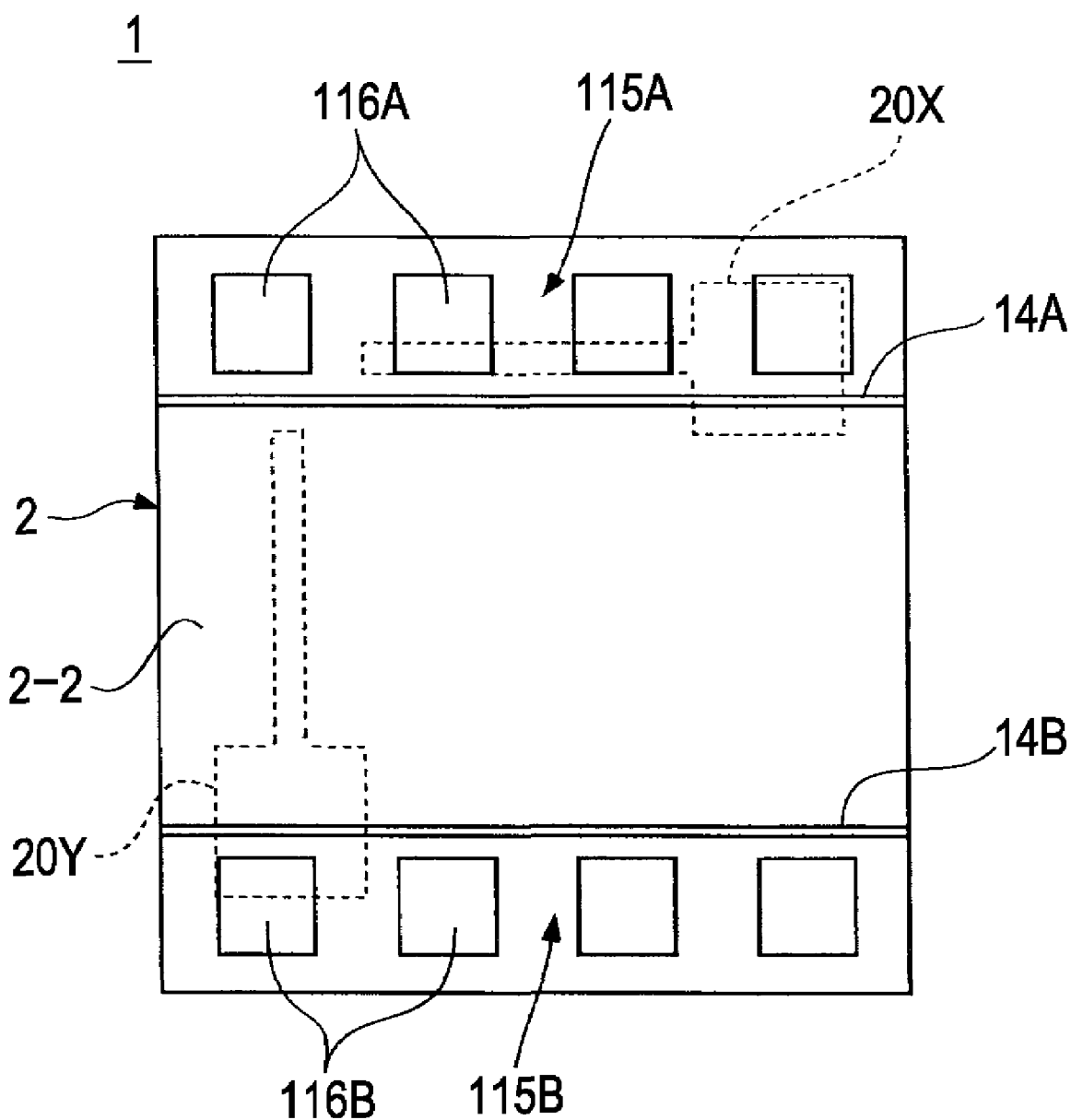
FIG. 5 is a bottom view of the vibratory gyrosensor.

Referring to FIG. 3, the supporting substrate 2 has second load buffering grooves 14 in a second main surface 2-2 thereof, which is the surface mounted to an external control substrate 100 of, for example, the main apparatus. Referring to FIG. 5, the second load buffering grooves 14 include a second load buffering groove 14A and a second load buffering groove 14B, which will simply be referred to as second load buffering grooves 14 hereinafter unless the two are described individually. As shown in FIG. 5, regions surrounded by the second load buffering grooves 14 serve as terminal regions 115A, 115B (which will simply be referred to as terminal regions 115 hereinafter unless the two are described individually).

Figure 4:
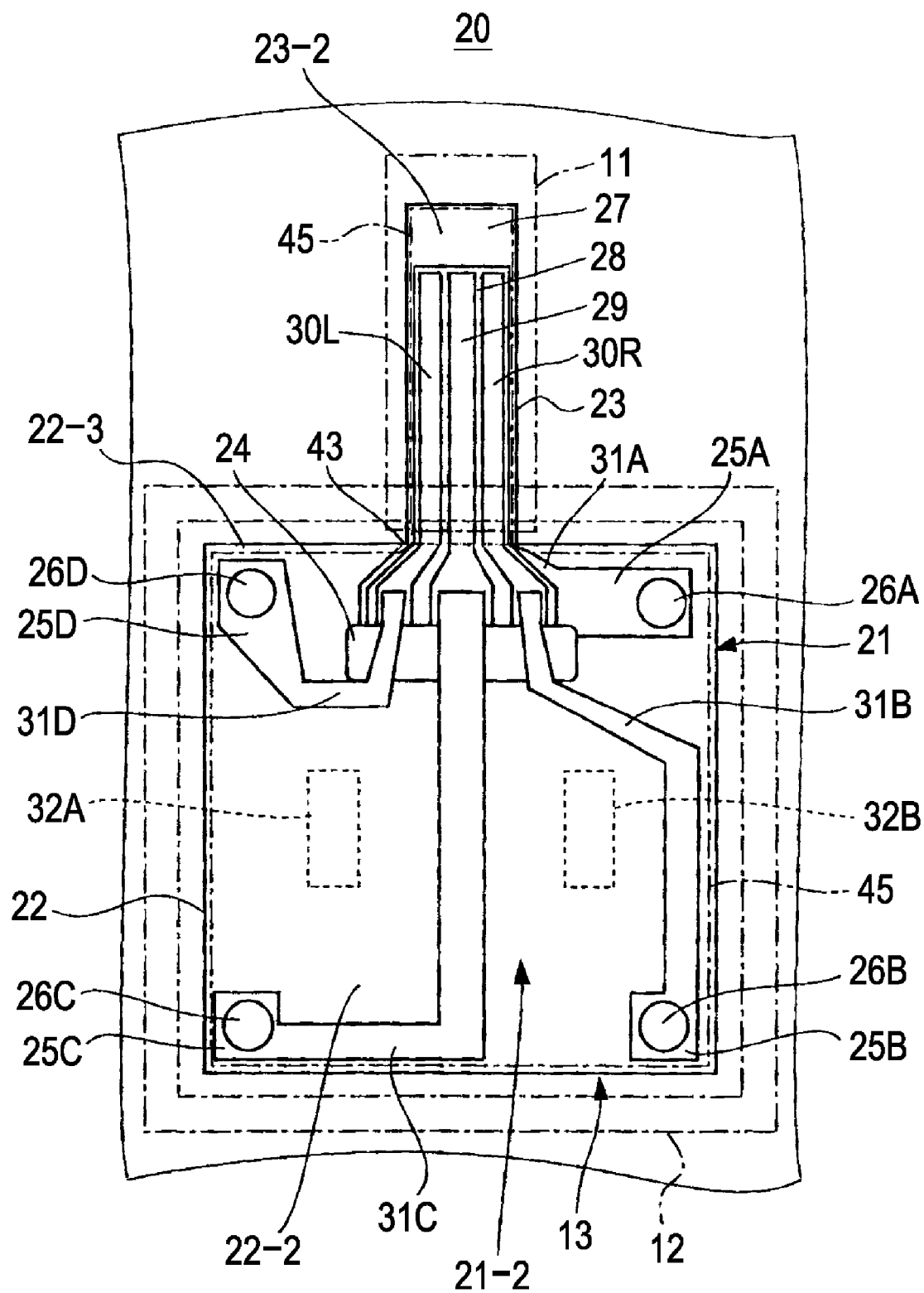
FIG. 4 is a bottom view of the vibration element.

Referring to FIG. 4, each first load buffering groove is a frame-like groove having a bottom and provides the corresponding vibration-element mounting section 13 that has dimensions greater than the outer dimensions of the base portion 22 of the corresponding vibration element 20. The first load buffering grooves 12 are formed by mechanical grooving using, for example, a dicer, or by chemical grooving using a wet-etching technique, or by dry etching using, for example, laser. The first load buffering grooves are given a depth of 100 μm or more so as not to impair the mechanical strength of the supporting substrate 2 (this will be described below in detail with reference to FIG. 52).

Referring to FIG. 5, the second load buffering grooves 14A, 14B are disposed parallel to each other along outer edges of the supporting substrate 2. The second load buffering grooves 14A, 14B and the outer edges have the terminal regions 115A, 115B therebetween. The terminal regions 115A, 115B respectively have a plurality of mounting terminals 116A, 116B appropriately arranged thereon, which serve as external connection terminals (the mounting terminals 116A, 116B will simply be referred to as mounting terminals 116 hereinafter unless the they are described individually). The supporting substrate 2 is mounted on the control substrate 100 in a manner such that the mounting terminals (external connection terminals) 116 are connected to opposing lands on the control substrate 100 with bumps 117 disposed therebetween, which are provided individually for the corresponding mounting terminals 116.

Similar to the first load buffering grooves 12, the second load buffering grooves 14 are formed in the second main surface 2-2 of the supporting substrate 2 to a predetermined depth by mechanical grooving using, for example, a dicer, or by chemical grooving using a wet-etching technique, or by dry etching using, for example, laser. The second load buffering grooves 14 provide the floating-island-like terminal regions 115 on the second main surface 2-2 of the supporting substrate 2. The terminal regions 115 have the plurality of mounting terminals 116 arranged along the outer edges. The second load buffering grooves 14 are not limited to linear grooves extending along the outer edges, and may alternatively be, for example, frame-like grooves that surround the mounting terminals 116 or substantially C-shaped grooves whose opposite ends are free towards the outer edges.

The supporting substrate 2 has a plurality of via holes extending between the first main surface 2-1 and the second main surface 2-2. The wiring pattern 5 on the first main surface 2-1 and the mounting terminals 116 on the second main surface 2-2 are connected through these via holes.

For example, when shock is applied to the main apparatus, the supporting substrate 2 of the vibratory gyrosensor 1 is subject to strain or stress in response to the shock received via the control substrate 100. In this embodiment, since the vibration elements 20 are mounted on the vibration-element mounting sections 13 that are in a floating-island-like state by being surrounded by the first load buffering grooves 12, the strain or stress produced in the supporting substrate 2 in response to an external load is absorbed by the first load buffering grooves 12. Thus, the first load buffering grooves 12 effectively serve as a kind of damper so as to reduce negative effects of the external load on the vibration elements 20 mounted on the vibration-element mounting sections 13. Accordingly, the vibration elements 20 can stably perform a detecting operation.

On the other hand, in the vibratory gyrosensor 1, the mounting terminals 116 provided in the terminal regions 115, which are in a floating-island-like state by means of the second load buffering grooves 14, are secured on the control substrate 100. In this embodiment, the second load buffering grooves 14 absorb the external load transmitted via the control substrate 100. Thus, the second load buffering grooves 14 effectively serve as a kind of damper so as to reduce negative effects of the external load on the vibration elements 20 mounted on the vibration-element mounting sections 13. Accordingly, the vibration elements 20 can stably perform a detecting operation.

Each of the first load buffering grooves 12 is C-shaped in cross section and extends continuously around the entire circumference, but is not limited to this form. Under the condition that the first load buffering grooves 12 satisfy predetermined characteristics, each of the first load buffering grooves 12 may have a plurality of groove portions that are arranged in the form of a frame as a whole. Furthermore, each of the second load buffering grooves 14 does not have to be in the form of a continuous groove, and may alternatively have, for example, a plurality of arranged groove portions. Moreover, the first load buffering grooves 12 are provided in the first main surface 2-1 of the supporting substrate 2 and the second load buffering grooves 14 are provided in the second main surface 2-2 so as to define load buffering structures in the first and second main surfaces. Alternatively, under the condition that predetermined characteristics are satisfied, a load buffering structure may be defined by only the first load buffering grooves 12 or only the second load buffering grooves 14.

Figure 6:
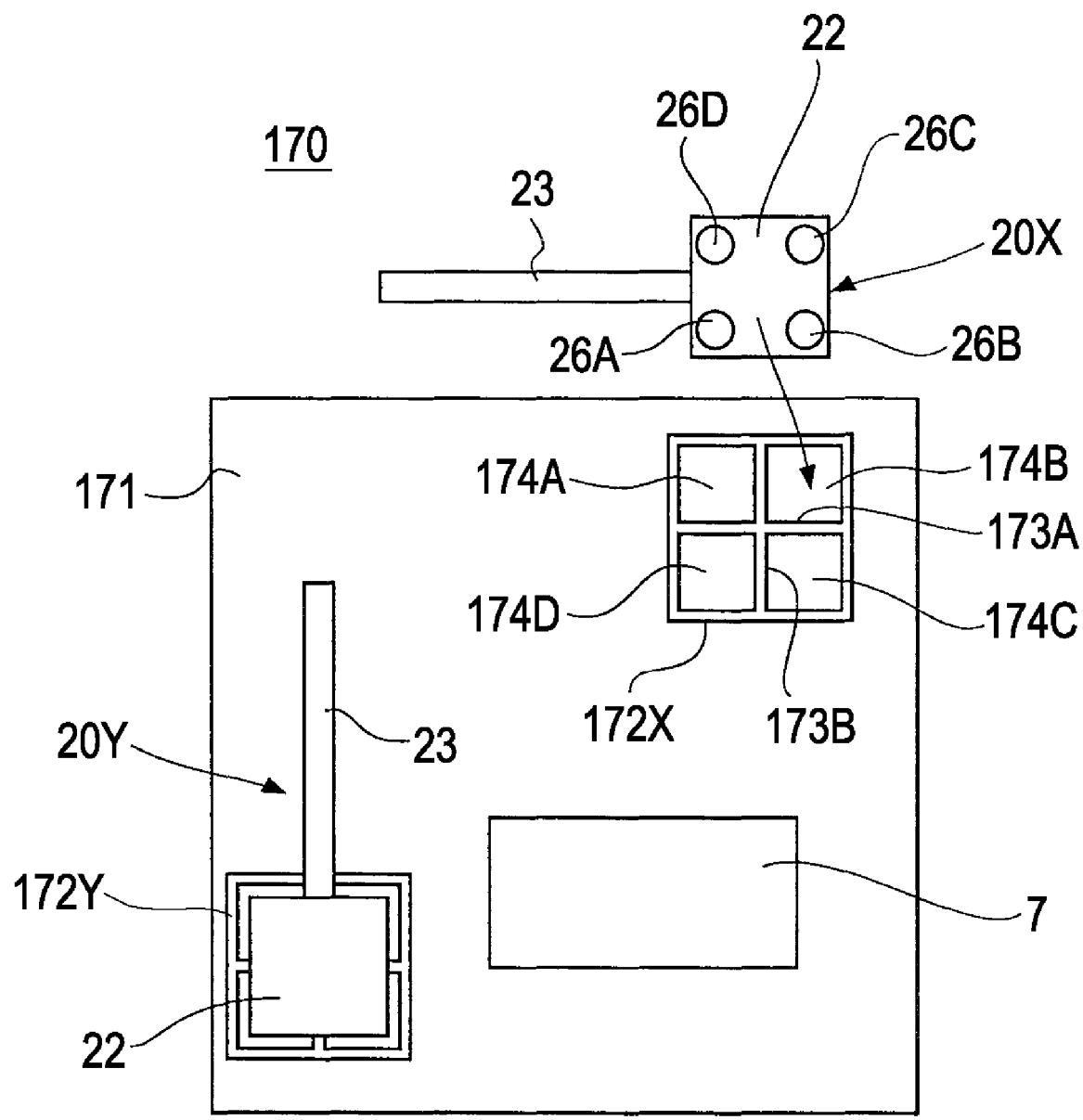
FIG. 6 is a plan view of a supporting substrate and shows a modified example of load buffering grooves.

Although the first load buffering grooves 12 in the form of frames that surround the vibration-element mounting sections 13 are provided in the first main surface 2-1 of the supporting substrate 2 as described above, the first load buffering grooves 12 are not limited to this form. A vibratory gyrosensor 170 shown in FIG. 6 has a supporting substrate 171 provided with first load buffering grooves 172X, 172Y that are in the form of frames. In this example, partitioning grooves 173A, 173B forming a cross within the frame of each first load buffering groove 172 are also provided so as to provide four separate mounting subsections 174A to 174D.

Specifically, in the vibratory gyrosensor 170, the separate mounting subsections 174 are separated in correspondence to the terminals 25 provided in the base portion 22 of each vibration element 20, and are provided with mounting terminals, although not shown. In the vibratory gyrosensor 170, each vibration element 20 is mounted on the supporting substrate 171 by securing the terminals 25 onto the opposing mounting terminals with the gold bumps 26 therebetween. In detail, each vibration element 20 is entirely mounted within a first floating-island-like section surrounded by the corresponding first load buffering groove 172, and has fixed portions that are individually fixed to second floating-island-like subsections that are separated by the partitioning grooves 173. Consequently, in the vibratory gyrosensor 170, the negative effects of strain or stress in the supporting substrate 171, caused by an external load, on the vibration elements 20 can be properly reduced, thereby achieving a stable detecting operation for angular velocity.

[Clearance Recesses]

The supporting substrate 2 has recesses 11A, 11B (which will simply be referred to as clearance recesses 11 hereinafter unless the two are described individually) in the component-installation area 6 in correspondence to the vibration elements 20X and 20Y. The clearance recesses 11 provide spaces in which the corresponding vibrator portions 23 are allowed to vibrate freely in the thickness direction thereof. Each of the clearance recesses 11 is in the form of a rectangular groove having a bottom and is formed to a predetermined thickness and opening dimensions in the first main surface 2-1 of the supporting substrate 2 by, for example, etching or grooving.

In the vibratory gyrosensor 1, the vibration elements 20 integrally having the base portions 22 and the cantilever-like vibrator portions 23 are mounted on the first main surface 2-1 of the supporting substrate 2 with the gold bumps 26. In view of achieving a low-profile structure as a whole, the distance between the vibrator portions 23 of the vibration elements 20 and the first main surface 2-1 of the supporting substrate 2 is determined by the thickness of the gold bumps 26. However, there are cases where a sufficient distance cannot be maintained due to machining limitations in the gold bumps 26.

Each vibration element 20 and the first main surface 2-1 of the supporting substrate 2 form an airflow therebetween in response to vibration of the vibrator portion 23. This airflow hits against the first main surface 2-1 of the supporting substrate 2 and thus produces a damping effect that pushes the vibrator portion 23 upward. In this embodiment, each of the clearance recesses 11 provided in the first main surface 2-1 of the supporting substrate 2 provides a sufficient distance m between the supporting substrate 2 and the corresponding vibrator portion 23 as shown in FIG. 2, thereby reducing such a damping effect on the vibration element 20.

The vibration elements 20 are mounted on the first main surface 2-1 of the supporting substrate 2 while the vibrator portions 23 extend facing the corresponding clearance recesses 11. Thus, while a low-profile structure of the vibratory gyrosensor 1 is attained, a sufficient distance between the vibrator portions 23 and the supporting substrate 2 is maintained, as shown in FIG. 2. Consequently, when the vibrator portions 23 vibrate in the thickness direction thereof, a damping effect thereon is reduced, which will be described later with reference to FIG. 53, thereby ensuring a stable detecting operation by the vibration elements 20.

The clearance recesses 11 are formed in the supporting substrate 2 to optimal dimensions in accordance with the dimensions of the vibrator portions 23 in the vibration elements 20. In this embodiment, if the vibration elements 20 are given dimensional values to be described later and the vibrator portions 23 have a maximum vibrational magnitude of p, each of the clearance recesses 11 is given opening dimensions of 2.1 mm×0.32 mm and a depth k (see FIG. 2) of k≧p/2+0.05 (mm). The clearance recesses 11 with these dimensions provided in the supporting substrate 2 allow for height reduction, thereby contributing to a low-profile structure. In addition, the damping effect on the vibration elements 20 is reduced and a high Q value is maintained, thereby ensuring a stable detecting operation with high sensitivity for, for example, motion blurs.

The structure of the vibration elements 20 will now be described in detail.

[Gold Bumps]

In each vibration element 20, a second main surface (22-2) of the base portion 22, which is included in a second main surface 21-2 of a silicon substrate 21 to be described later, serves as a securing surface (mounting surface) with respect to the supporting substrate 2. The securing surface is the surface of the vibration element 20 that is mounted on the corresponding vibration-element mounting section 13. Referring to FIG. 4, the mounting surface 22-2 of the base portion 22 is provided with first terminal 25A to fourth terminal 25D (which will simply be referred to as terminals 25 hereinafter unless the four are described individually) and first gold bump 26A to fourth gold bump 26D (which will simply be referred to as gold bumps 26 hereinafter unless the four are described individually) serving as metallic projections disposed individually on the corresponding terminals 25.

The terminals 25 in each vibration element 20 are disposed on the corresponding lands 4 provided in the wiring pattern 5 on the supporting substrate 2. The terminals 25 are positioned on the supporting substrate 2 in alignment with the corresponding lands 4. In this state, an ultrasonic wave is applied while the vibration elements 20 are pressed against the supporting substrate 2, and the terminals 25 and the lands 4 are welded together with the gold bumps 26 disposed therebetween. Thus, the vibration elements 20 are mounted on the supporting substrate 2. Because the vibration elements 20 are mounted on the supporting substrate 2 via the gold bumps 26 having a predetermined height, the vibrator portions 23 can vibrate in a predetermined motion in a state where second main surfaces 23-2 (i.e. substrate-facing surfaces) of the vibrator portions 23 are maintained at a predetermined height from the first main surface 2-1 of the supporting substrate 2.

This embodiment achieves an efficient mounting process by applying a surface mounting technique for mounting the vibration elements 20 to the supporting substrate 2. As connection components to be used for a surface mounting technique, this embodiment is not limited to the gold bumps 26. Alternatively, other types of metallic projections, such as solder balls and copper bumps, which are generally used in a semiconductor process, may be used. In this embodiment, the mounting terminals 116 of the supporting substrate 2 are fixedly connected to the corresponding lands of the control substrate 100 with the bumps 117 therebetween by implementing a reflow soldering treatment in the manufacturing process of the main apparatus. Therefore, the gold bumps 26 having high heat-resisting properties and high workability are used as the connection components.

In a vibratory gyrosensor, a mechanical quality coefficient Q (Q factor) is determined on the basis of the securing structure of vibration elements on a supporting substrate. In this embodiment, the base portions 22 of the vibration elements 20 are disposed in a raised state from the first main surface 2-1 of the supporting substrate 2 by means of the gold bumps 26. Therefore, unlike a case where the base portions are surface-bonded to the supporting substrate with adhesive layers therebetween, for example, the damping rate at the tip end of each vibrator portion 23 is greater, whereby a satisfactory Q value can be attained. Furthermore, in view of the fact that higher Q-value characteristics can be attained by securing each base portion 22 to the first main surface 2-1 of the supporting substrate 2 at multiple points rather than at one point, each base portion 22 is secured to the supporting substrate 2 at the four corners thereof. This enables satisfactory Q-value characteristics.

The gold bumps 26 may be provided such that the overall center of mass thereof is positioned within a range of a width t6 of the vibrator portion 23 (see FIG. 9) with respect to a central axis line in the longitudinal direction thereof. This positioning of the gold bumps 26 allows the vibrator portion 23 to vibrate in the thickness direction thereof stably without losing balance in the horizontal direction.

Furthermore, from the base end of the vibrator portion 23 extending from the base portion 22, the gold bumps 26 are disposed outside of a region whose radius is twice the width t6 of the vibrator portion 23. This reduces the effect of gold bumps 26 absorbing the vibration of the vibrator portion 23, whereby high Q-value characteristics can be maintained.

Moreover, from the base end of the vibrator portion 23, at least one of the gold bumps 26 is disposed within a region having twice the thickness t1 (see FIG. 8) of the base portion 22. This prevents the resonant frequency from shifting when the vibration of the vibrator portion 23 is transmitted to the base portion 22.

Alternatively, the gold bumps 26 may each be a double-tiered bump. Moreover, an electrical connection process may be performed on the second main surface of the base portion 22 so as to form a fifth dummy gold bump. In that case, the supporting substrate 2 will naturally be provided with a dummy terminal to which the fifth gold bump is to be welded.

[Element Shape]

Figure 8:
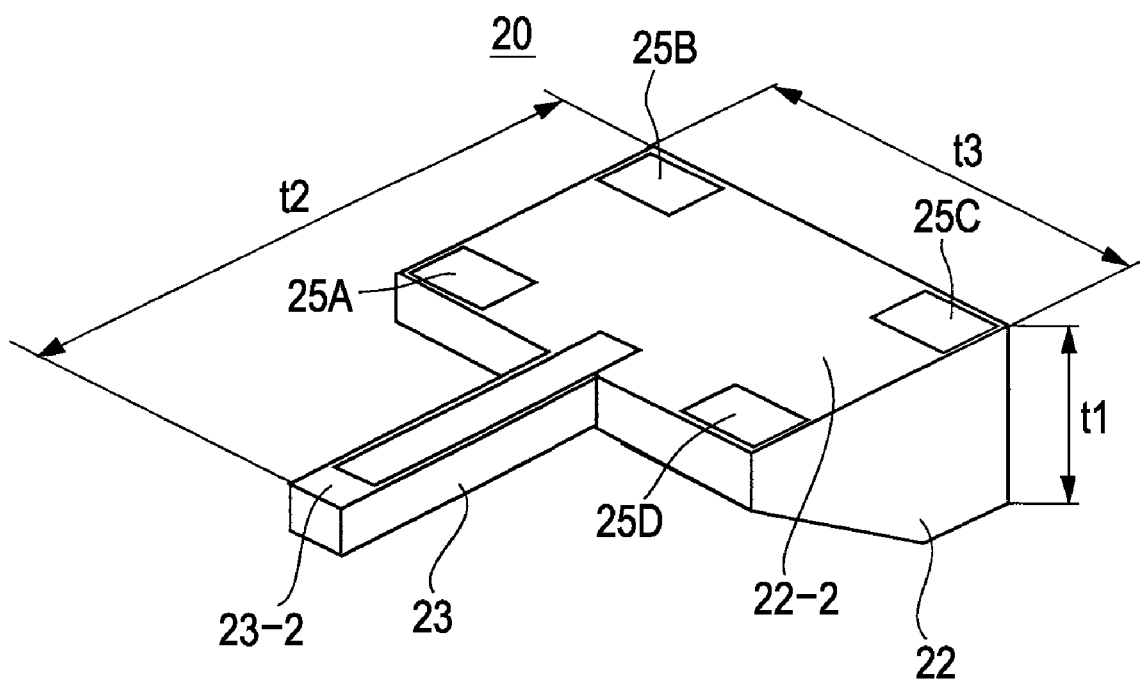
FIG. 8 is an overall perspective view of the vibration element as viewed from the bottom thereof.

Referring to FIG. 8, in each of the vibration elements 20 according to this embodiment, the vibrator portion 23 has the second main surface 23-2 (i.e. substrate-facing surface), which is flush with the second main surface 22-2 (i.e. mounting surface) of the base portion 22, and extends integrally from the base portion 22 in a cantilever manner. As shown in FIG. 2, the vibrator portion 23 has a top surface 23-1 that is at a level lower than a first main surface (top surface) 22-1 of the base portion 22, such that the vibrator portion 23 is given a predetermined thickness. The vibrator portion 23 has a predetermined length and cross-sectional area, and is defined by a cantilever that is rectangular in cross section and is integrated with a side of the base portion 22.

Figure 9:
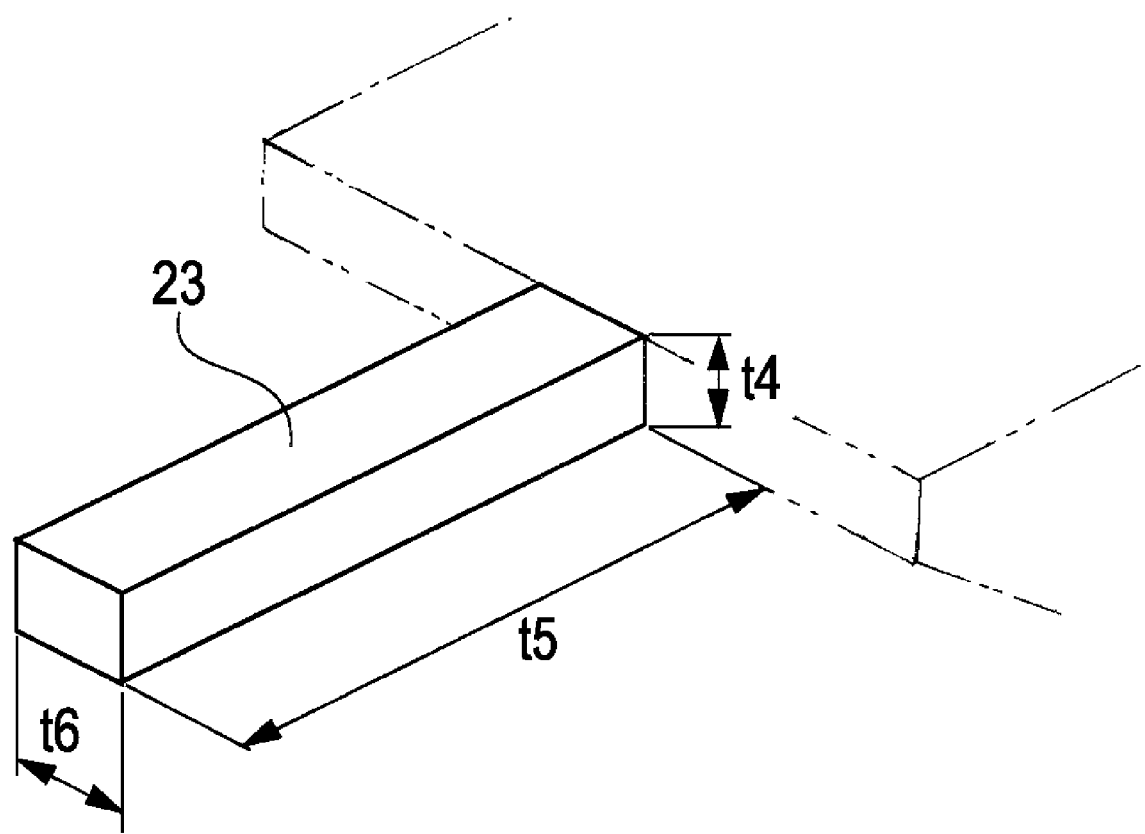
FIG. 9 is a perspective view of a vibrator portion of the vibration element.

Referring to FIG. 8, the base portion 22 of each vibration element 20 has a thickness t1 of 300 μm, a length t2 of 3 mm to the tip end of the vibrator portion 23, and a width t3 of 1 mm. Referring to FIG. 9, the vibrator portion 23 of each vibration element 20 has a thickness t4 of 100 μm, a length t5 of 2.5 mm, and a width t6 of 100 μm. The vibration element 20 is vibrated in response to a drive voltage of a predetermined frequency applied from a driving detection circuit unit 50, which will be described later in detail, and vibrates at a resonant frequency of 40 kHz based on the above-described dimensions. The structure of the vibration elements 20 is not limited to the above, and may be determined in accordance with the frequency to be used or the overall target shape.

Each vibration element 20 may be formed such that the base portion 22 and the vibrator portion 23 satisfy the following conditions. Specifically, the base portion 22 has a width t3 that is greater than twice the width t6 of the vibrator portion 23, and has its center of mass positioned within a range having twice the width t6 of the vibrator portion 23 with respect to the central axis line in the longitudinal direction of the vibrator portion 23. Accordingly, the vibrator portion 23 can vibrate properly without losing balance horizontally. Furthermore, the base portion 22 has a thickness t1 that is 1.5 times the thickness t4 of the vibrator portion 23 so that the mechanical strength of the base portion 22 is maintained. This inhibits the base portion 22 from vibrating in response to the vibration of the vibrator portion 23, thereby preventing the resonant frequency from shifting.

[Piezoelectric Film and Electrode Layers]

Referring to FIG. 4, as a result of a vibration-element forming step, which will be described later, each vibration element 20 is provided with a reference electrode layer (first electrode layer) 27, a piezoelectric thin film layer 28, and a drive electrode layer (second electrode layer) 29, which are stacked on the second main surface (i.e. substrate-facing surface) 23-2 of the vibrator portion 23 and cover substantially the entire length of the vibrator portion 23 in the longitudinal direction thereof. The second main surface (i.e. substrate-facing surface) 23-2 of the vibrator portion 23 has a pair of detection electrodes 30R, 30L (which will simply be referred to as detection electrodes 30 hereinafter unless the two are described individually) disposed thereon, which have the drive electrode layer 29 interposed therebetween. The drive electrode layer 29 and the detection electrodes 30 constitute a second electrode layer.

The second main surface (substrate-facing surface) 23-2 of the vibrator portion 23 has disposed thereon the reference electrode layer 27 as a first layer. The piezoelectric thin film layer 28 having substantially the same length as the reference electrode layer 27 is stacked on the reference electrode layer 27. The drive electrode layer 29 having substantially the same length as but narrower than the piezoelectric thin film layer 28 is stacked on the piezoelectric thin film layer 28. The drive electrode layer 29 is positioned in the central portion in the width direction of the piezoelectric thin film layer 28. In addition, the piezoelectric thin film layer 28 has stacked thereon the pair of detection electrodes 30R, 30L at opposite sides of the drive electrode layer 29.

[Leads and Terminals]

Referring to FIG. 4, in each vibration element 20, the second main surface (mounting surface) 22-2 of the base portion 22 is provided with a first lead 31A which connects the reference electrode layer 27 and the first terminal 25A, and a third lead 31C which connects the drive electrode layer 29 and the third terminal 25C. Similarly, the second main surface 22-2 of the base portion 22 is provided with a second lead 31B which connects the detection electrode 30R and the second terminal 25B, and a fourth lead 31D which connects the detection electrode 30L and the fourth terminal 25D. The leads 31A to 31D will simply be referred to as leads 31 hereinafter unless the four are described individually.

The first lead 31A extends integrally towards the base portion 22 from the base end of the reference electrode layer 27 in the vibrator portion 23. Referring to FIG. 4, the first lead 31A is integrated with the first terminal 25A disposed in one of the corner regions proximate to the vibrator portion 23 on the second main surface (mounting surface) 22-2 of the base portion 22. The drive electrode layer 29 and the detection electrodes 30 extend from the vibrator portion 23 towards the base portion 22 and have their base ends integrated at a slightly wide region. This wide region is covered with a planarizing layer 24.

The second lead 31B has its one end portion extending over the planarizing layer 24, and extends along a first side of the base portion 22 to a rear corner region opposite to the first terminal 25A so as to be connected to the second terminal 25B disposed in this corner region. The third lead 31C has its one end portion extending over the planarizing layer 24, and extends across substantially the central portion of the base portion 22 towards the rear. The third lead 31C then extends along the rear side of the base portion 22 to a corner region opposite to the second terminal 25B so as to be connected to the third terminal 25C disposed in this corner region. The fourth lead 31D has its one end portion extending over the planarizing layer 24, and extends along a second side of the base portion 22 to the other front corner region opposite to the third terminal 25C so as to be connected to the fourth terminal 25D disposed in this corner region.

Alternatively, regardless of the above-described structure, each of the vibration elements 20 may be provided with an optimal number of the terminals 25 at optimal positions on the second main surface (mounting surface) 22-2 of the base portion 22. Moreover, the connection pattern between the leads 31 and the terminals 25 for the electrode layers in each vibration element 20 is not limited to the above-described pattern, and may be determined in accordance with the positions and the number of the terminals 25 on the second main surface of the base portion 22.

[Insulative-Protective Layer]

Referring to FIGS. 2 and 4, the second main surface 21-2 of each vibration element 20 is provided with an insulative-protective layer 45 covering the base portion 22 and the vibrator portion 23. The insulative-protective layer 45 has a triple-layer structure including a first alumina (aluminum oxide: $AL_2O_3$) sublayer 46 as a first sublayer, a silicon oxide (SiO2) sublayer 47 as a second sublayer, and a second alumina sublayer 48 as a third sublayer.

Referring to FIG. 2, the insulative-protective layer 45 has terminal openings 49 in correspondence to the locations of the terminals 25. The terminals 25 are exposed to the outside through the terminal openings 49. As shown in FIG. 2, in each vibration element 20, the gold bumps 26 protrude from the terminals 25 through the terminal openings 49.

Referring to FIG. 4, the insulative-protective layer 45 is provided in a manner such that the second main surface 21-2 of the silicon substrate 21 is exposed in a frame-like manner between the peripheries of the base portion 22 and the vibrator portion 23 and the outermost peripheries of the reference electrode layer 27 and the terminals 25. The insulative-protective layer 45 allows a portion of the second main surface 21-2 to be exposed around the periphery portion thereof so that when a cutout step of the vibration element 20 is performed, the periphery portion is prevented from peeling. The insulative-protective layer 45 is given a width of, for example, 98 μm when the vibrator portion 23 has a width t6 of 100 μm.

In the insulative-protective layer 45, the first alumina sublayer 46 has a thickness of, for example, 50 nm. The first alumina sublayer 46 functions as a foundation adhesive layer for enhancing the adhesiveness between the main surfaces of the base portion 22 and the vibrator portion 23, and allows the insulative-protective layer 45 to be securely coated over the vibrator portion 23 that vibrates so that the insulative-protective layer 45 is prevented from, for example, peeling.

The silicon oxide sublayer 47 blocks moisture in the air from attaching to the electrode layers. Moreover, the silicon oxide sublayer 4 inhibits the electrode layers from oxidizing, electrically insulates the electrode layers, or mechanically protects the electrode layers and the piezoelectric thin film layer 28. The second alumina sublayer 48, which is the topmost layer, enhances the adhesiveness to a resist layer formed when performing an outline-groove forming step on the silicon substrate 21 in the course of forming the vibrator portion 23. The second alumina sublayer 48 prevents the silicon oxide sublayer 47 from being damaged by an etching agent.

The silicon oxide sublayer 47 has at least twice the thickness of a second electrode layer 42, and has a thickness of 1 μm or less. Moreover, the silicon oxide sublayer 47 is formed over the first alumina sublayer 46 by sputtering in an argon gas atmosphere of 0.4 Pa or lower. The silicon oxide sublayer 47 is given the above-described thickness so that the insulative-protective layer 45 achieves a sufficient insulative-protective function and is prevented from burr formation during the film forming process. Furthermore, because the silicon oxide sublayer 47 is formed under the abovementioned sputtering condition, the silicon oxide sublayer 47 is formed with high density.

[Positioning Marks]

In the vibratory gyrosensor 1, the locations of the lands 4 on the supporting substrate 2 are recognized by the mounting device in order to position the first vibration element 20X and the second vibration element 20Y having the same shape precisely on the supporting substrate 2. In each of the vibration elements 20, the first main surface (top surface) 22-1 of the base portion 22 is provided with positioning marks 32A, 32B (which will be referred to as positioning marks 32 hereinafter) so that the vibration element 20 is mounted and positioned in correspondence to the locations of the lands 4 recognized by the mounting device.

Referring to FIGS. 1 and 4, the positioning marks 32 are defined by a pair of rectangular segments composed of, for example, a metallic foil. The rectangular segments are separated from each other in the width direction of the first main surface (top surface) 22-1 of the base portion 22. For each vibration element 20, the positioning marks 32 are read by the mounting device, and mounting data related to the positioning and orientation of the vibration element 20 with respect to the supporting substrate 2 is produced. Subsequently, based on the mounting data and data of the lands 4, the vibration element 20 is mounted precisely in position on the supporting substrate 2.

Although the positioning marks 32 are disposed on the first main surface of the base portion 22 in each vibration element 20, the positioning marks 32 may alternatively be disposed on the second main surface (mounting surface) 22-2 of the base portion 22. In that case, for example, the positioning marks may be defined by conductor segments formed in the same step as a wiring step, and may be disposed at positions free of the terminals 25 or the leads 31. The positioning marks 32 are preferably disposed in alignment with reference markers used for a reactive ion etching process performed by an inductively-coupled plasma device, which is used in the outline-groove forming step for forming the electrode layers and the vibrator portion 23 of each vibration element 20. The positioning marks 32 can be formed to a precision of 0.1 μm or less with respect to the vibrator portion 23 using a stepper exposure device.

The positioning marks 32 are formed by an appropriate method. For example, the positioning marks 32 may be formed by patterning a first electrode layer 40 including a titanium sublayer and a platinum sublayer on the second main surface (mounting surface) 22-2 of the base portion 22. In this case, when image processing is performed after a reading process is implemented for a mounting step, a satisfactory contrast is attained and the mounting accuracy is enhanced.

[Cover]

The cover 15, which shields the first main surface 2-1 of the supporting substrate 2 from the outside, will now be described in detail.

The vibratory gyrosensor 1 detects displacement of the vibration elements 20 caused by a Coriolis force produced in response to, for example, motion blur by means of the piezoelectric thin film layer 28 and the detection electrodes 30 in the vibration elements 20, and outputs a detection signal. When the piezoelectric thin film layer 28 is irradiated with light, a voltage is generated as a result of a pyroelectric effect. This pyroelectric voltage adversely affects the detecting operation and deteriorates the detection characteristics.

In the vibratory gyrosensor 1, the supporting substrate 2 and the cover 15 shield the component-installation space 3 from light so that the characteristics are prevented from being deteriorated by external light. Referring to FIG. 1, a periphery portion of the supporting substrate 2 surrounding the entire circumference of the component-installation area 6 is at a level lower than the first main surface 2-1 so as to form a cover securing portion 10. The first main surface 2-1 and the cover securing portion 10 are separated by a vertical wall which defines a light-blocking shoulder portion 9. The cover 15, which is formed of a sheet metal, is joined to the supporting substrate 2 by applying a resin adhesive around the entire circumference of the cover securing portion 10. Consequently, the component-installation space 3 is a lightproof space that is sealed and prevented from dust and moisture.

Referring to FIG. 1, the cover 15 is in the form of a box and includes a main surface 16 having outer dimensions that are sufficient for covering the component-installation area 6 of the supporting substrate 2, and periphery walls 17 bent integrally from the main surface 16. The periphery walls 17 extend entirely around the periphery of the main surface 16. In a state where the periphery walls 17 are joined to the supporting substrate 2, the cover 15 has a height that provides the component-installation space 3 in which the vibrator portions 23 of the vibration elements 20 can vibrate. The cover 15 is integrally provided with a periphery flange 18 which is slightly narrower than the cover securing portion 10 of the supporting substrate 2 and which extends along the rim of the periphery walls 17. The periphery flange 18 defines a ground projection, which is connected to a ground terminal provided on the control substrate 100 when the vibratory gyrosensor 1 is mounted on the control substrate 100.

The cover 15 is formed of a sheet metal so as to contribute to size and weight reduction of the vibratory gyrosensor 1. However, there may be cases where the cover 15 cannot exhibit its light-shielding function sufficiently when the light shielding properties against external light of an infrared wavelength are deteriorated. Therefore, in this embodiment, an infrared-absorbing coating material for absorbing infrared light is coated entirely over the main surface 16 and the periphery walls 17 so as to form a light shielding layer 19. Thus, external light of an infrared wavelength is blocked from entering the component-installation space 3, thereby allowing the vibration elements 20 to stably perform a detecting operation. The light shielding layer 19 may be formed on both sides of the cover 15 by dipping the cover 15 into an infrared-absorbing coating solution, or may be formed by a black chromium plating treatment, black oxide finish treatment, or black anodizing treatment.

As described above, in the vibratory gyrosensor 1, the cover 15 is combined with the supporting substrate 2 by joining the periphery flange 18 to the cover securing portion 10 using an adhesive, thereby forming the component-installation space 3 which is sealed and is lightproof. However, there may be a case where external light enters the component-installation space 3 by passing through the adhesive layer disposed in a gap between the cover securing portion 10 and the periphery flange 18. On the other hand, according to the supporting substrate 2 in this embodiment, the cover securing portion 10 is set at a level lower than the first main surface 2-1 with the light-blocking shoulder portion 9 therebetween, such that the external light passing through the adhesive layer is blocked by the light-blocking shoulder portion 9.

Similar to other components in this embodiment, the cover 15 is combined with the supporting substrate 2 by surface mounting so as to achieve an efficient assembly process. In the vibratory gyrosensor 1, since the cover 15 is secured on the cover securing portion 10 of the supporting substrate 2, which is set at a lower level, a low-profile structure is achieved, and moreover, the adhesive is prevented from flowing into the component-installation area 6. Furthermore, since the component-installation space 3 is lightproof in addition to being dustproof and moisture-proof, a pyroelectric effect on the vibration elements 20 is inhibited, whereby a stable motion-blur detecting operation, for example, can be implemented.

[Circuit Configuration]

A circuit configuration for driving the vibratory gyrosensor 1 will now be described with reference to FIG. 7.

The vibratory gyrosensor 1 is provided with a first driving detection circuit unit 50X and a second driving detection circuit unit 50Y, which are respectively connected to the first vibration element 20X and the second vibration element 20Y and which include, for example, the IC circuit element 7 and the electronic components 8. The first driving detection circuit unit 50X and the second driving detection circuit unit 50Y have the same circuit configuration, and will therefore be referred to as driving detection circuit units 50 hereinafter. Each driving detection circuit unit 50 includes, for example, an impedance converter circuit 51, an adding circuit 52, an oscillator circuit 53, a differential amplifier circuit 54, a synchronous detector circuit 55, and a direct-current amplifier circuit 56.

Figure 7:
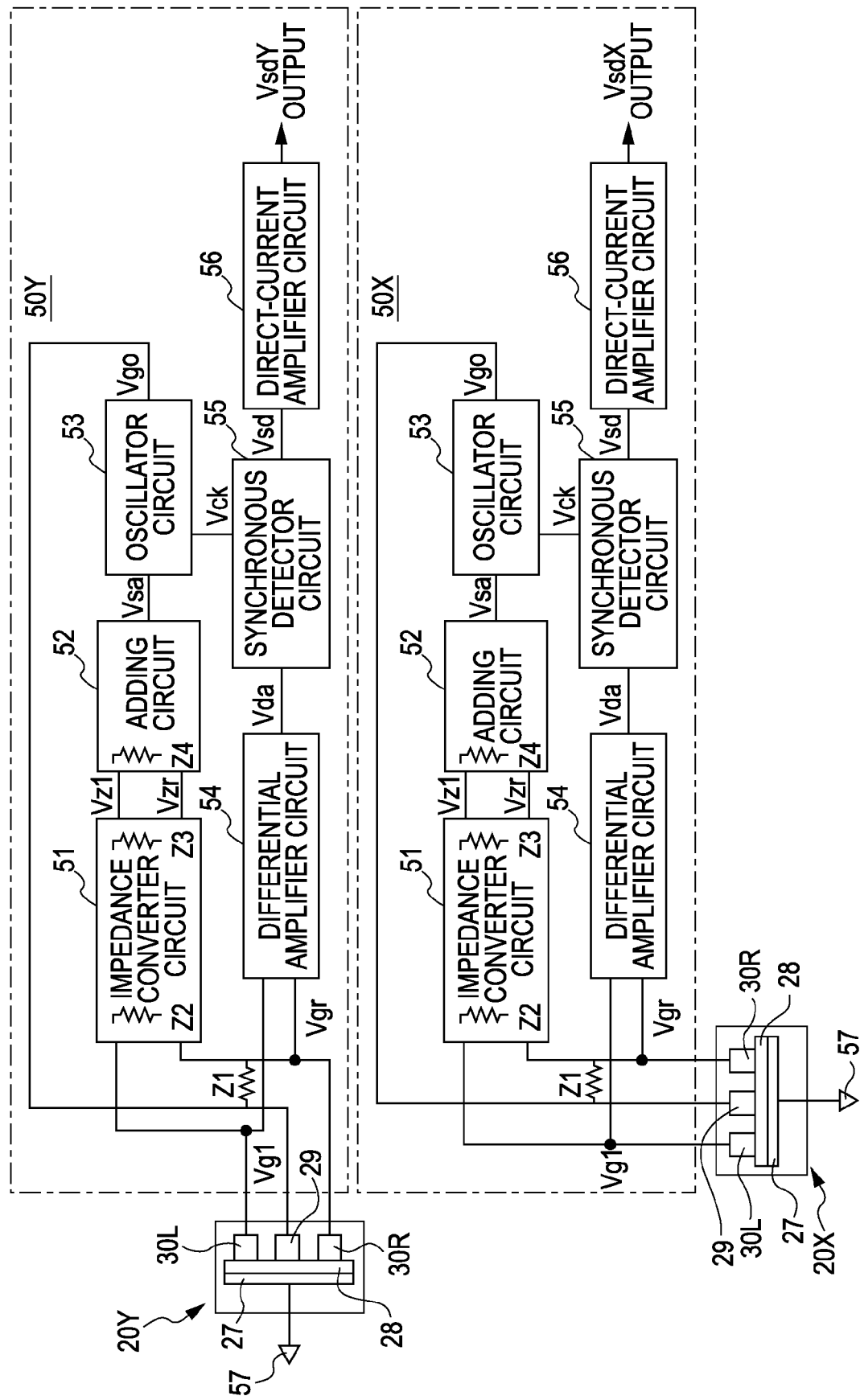
FIG. 7 is a circuit diagram of the vibratory gyrosensor.

Referring to FIG. 7, in each driving detection circuit unit 50, the impedance converter circuit 51 and the differential amplifier circuit 54 are connected to the first detection electrode 30R and the second detection electrode 30L of the corresponding vibration element 20. The impedance converter circuit 51 is connected to the adding circuit 52, and the adding circuit 52 is connected to the oscillator circuit 53. The oscillator circuit 53 is connected to the drive electrode layer 29. The differential amplifier circuit 54 and the oscillator circuit 53 are connected to the synchronous detector circuit 55, and the synchronous detector circuit 55 is connected to the direct-current amplifier circuit 56. The reference electrode layer 27 of the vibration element 20 is connected to a reference potential 57 on the supporting substrate 2.

In each driving detection circuit unit 50, the corresponding vibration element 20, the impedance converter circuit 51, the adding circuit 52, and the oscillator circuit 53 constitute a self-oscillation circuit system. When the oscillator circuit 53 sends an oscillation output Vgo at a predetermined frequency to the drive electrode layer 29, a natural vibration occurs in the vibrator portion 23 of the vibration element 20. An output Vgr from the first detection electrode 30R and an output Vgl from the second detection electrode 30L of the vibration element 20 are sent to the impedance converter circuit 51. Based on these outputs received, the impedance converter circuit 51 sends an output Vzr and an output Vzl to the adding circuit 52. Based on these outputs received, the adding circuit 52 sends a combined output Vsa to the oscillator circuit 53.

The output Vgr from the first detection electrode 30R of each vibration element 20 and the output Vgl from the second detection electrode 30L are supplied to the differential amplifier circuit 54. In each driving detection circuit unit 50, when the corresponding vibration element 20 detects a motion blur, a difference occurs between the output Vgr and the output Vgl. Thus, a predetermined output Vda is produced from the differential amplifier circuit 54. The output Vda from the differential amplifier circuit 54 is supplied to the synchronous detector circuit 55. The synchronous detector circuit 55 synchronously detects the output Vda, converts the output Vda to a direct-current signal Vsd, and sends the direct-current signal Vsd to the direct-current amplifier circuit 56. The direct-current amplifier circuit 56 outputs the direct-current signal Vsd after performing predetermined direct-current amplification.

The synchronous detector circuit 55 performs full-wave rectification on the output Vda from the differential amplifier circuit 54 at the timing of a clock signal Vck output in synchronization with a drive signal from the oscillator circuit 53. Then, the synchronous detector circuit 55 integrates the output Vda so that the direct-current signal Vsd is produced. The driving detection circuit unit 50 amplifies this direct-current signal Vsd in the direct-current amplifier circuit 56. The direct-current signal Vsd is then output so that an angular velocity signal generated in response to motion blur is detected.

In each driving detection circuit unit 50, the impedance converter circuit 51 produces a low impedance output Z3 in a state of high impedance input Z2, and separates the impedance Z1 between the first detection electrode 30R and the second detection electrode 30L from the impedance Z4 between the inputs of the adding circuit 52. By providing the impedance converter circuit 51, a large output difference can be obtained from the first detection electrode 30R and the second detection electrode 30L.

In each driving detection circuit unit 50, the impedance converter circuit 51 performs only impedance conversion for the inputs and outputs without affecting the magnitude of the signals. Thus, the output Vgr from the first detection electrode 30R and the output Vzr from one side of the impedance converter circuit 51 have the same magnitude, and the output Vgl from the second detection electrode 30L and the output Vzl from the other side of the impedance converter circuit 51 have the same magnitude. In each driving detection circuit unit 50, when the corresponding vibration element 20 performs motion-blur detection, even if there is a difference between the output Vgr from the first detection electrode 30R and the output Vgl from the second detection electrode 30L, the difference is maintained in the output Vsa from the adding circuit 52.

In each driving detection circuit unit 50, even if noise is superposed due to, for example, a switching operation, components other than a resonant frequency component are removed by a function similar to a band filter in the vibration element 20 so as to remove a noise component superposed on the output Vgo from the oscillator circuit 53. Thus, a high-precision output Vda from which the noise component is removed can be obtained from the differential amplifier circuit 54. In the vibratory gyrosensor 1, the driving detection circuit units 50 are not limited to those described above. When motion blur induces displacement of the vibrator portion 23 subject to natural vibration, the displacement may be detected by the piezoelectric thin film layer 28 and the pair of detection electrodes 30, and the detection outputs may be obtained by performing appropriate processes.

The vibratory gyrosensor 1 is provided with the first vibration element 20X that detects an angular velocity in the X-axis direction, and the second vibration element 20Y that detects an angular velocity in the Y-axis direction. A detection output VsdX corresponding to the X-axis direction can be obtained from the first driving detection circuit unit 50X connected to the first vibration element 20X, and a detection output VsdY corresponding to the Y-axis direction can be obtained from the second driving detection circuit unit 50Y connected to the second vibration element 20Y. In the vibratory gyrosensor 1, the operating frequencies of the first vibration element 20X and the second vibration element 20Y may be set within a range of several kHz to several hundreds of kHz. Moreover, by setting a frequency difference (fx−fy) between an operating frequency fx of the first vibration element 20X and an operating frequency fy of the second vibration element 20Y to 1 kHz or more, crosstalk is reduced, whereby the vibration detection can be implemented precisely.

[Method for Manufacturing Vibratory Gyrosensor]

Figure 10:
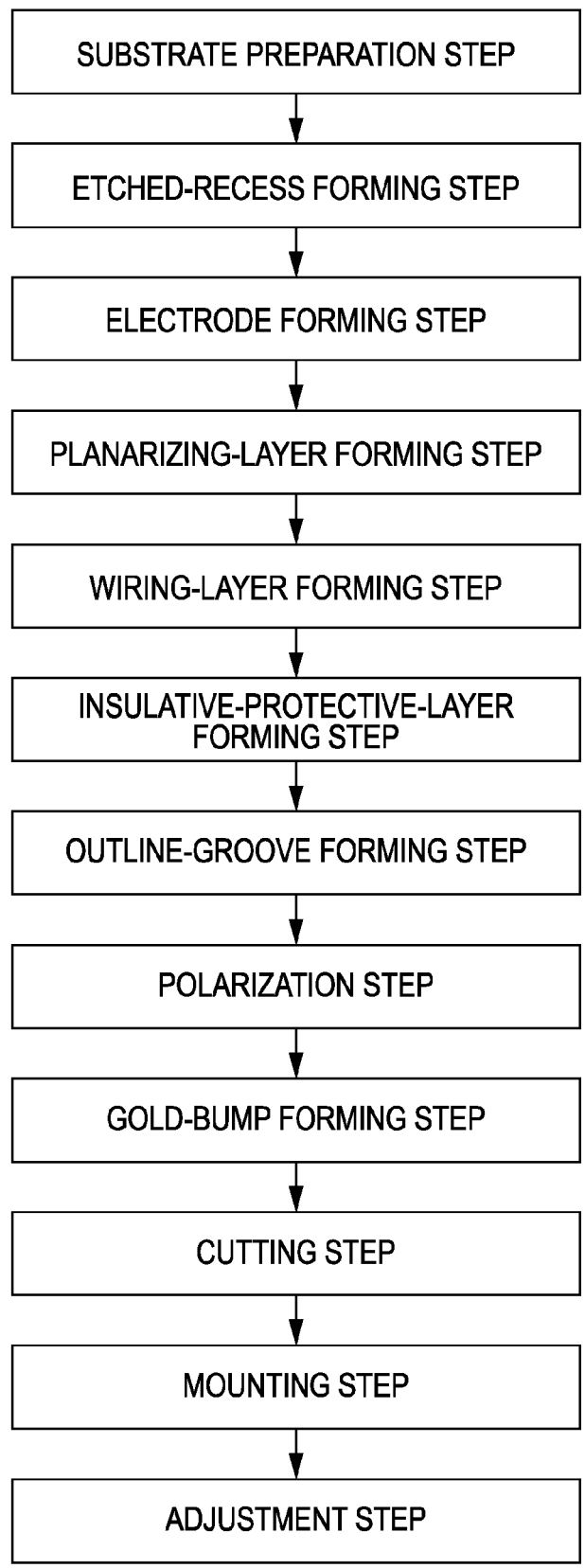
FIG. 10 is a flow chart showing principal steps included in a method for manufacturing the vibratory gyrosensor.

A method for manufacturing the vibratory gyrosensor 1 according to this embodiment will now be described. FIG. 10 is a flow chart showing principal steps included in the method for manufacturing the vibratory gyrosensor 1.

Figure 11:
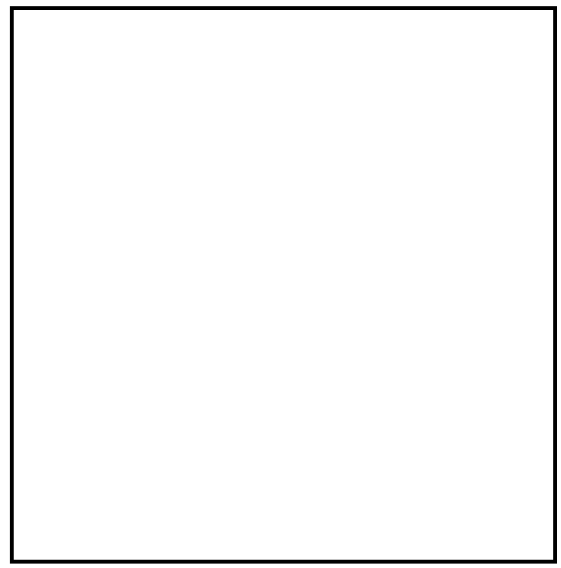
FIG. 11 is a plan view of a silicon substrate used in a vibration-element forming process.
Figure 12:
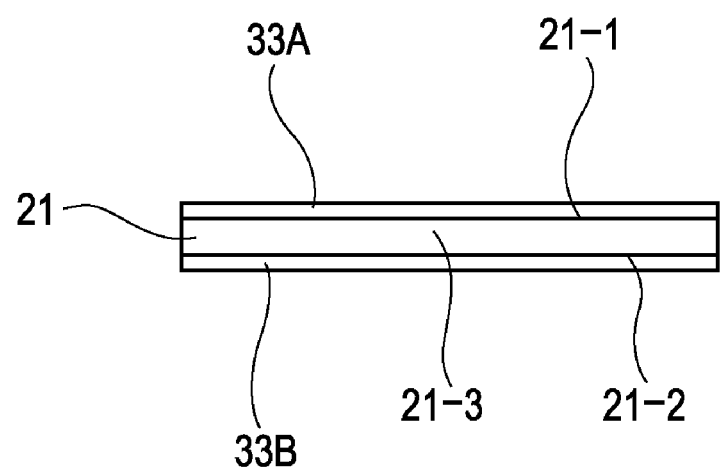
FIG. 12 is a cross-sectional view of the silicon substrate.

For example, referring to FIGS. 11 and 12, the vibratory gyrosensor 1 is manufactured by simultaneously forming multiple vibration elements 20 using the silicon substrate 21 as a base material. The silicon substrate 21 is cut in a manner such that the main surface 21-1 is a (100) orientation surface, and each side surface 21-3 is a (110) orientation surface. Subsequently, a cutting step is performed so as to cut the silicon substrate 21 into the vibration elements 20 in a one-by-one fashion.

[Substrate Preparation Step]

The outer dimensions of the silicon substrate 21 are determined in accordance with the specifications of the equipment used for the step, and are set to, for example, 300×300 (mm). The silicon substrate 21 is not limited to a substrate having a rectangular shape in plan view as shown in FIG. 11, and alternatively, a wafer-like substrate having a circular shape in plan view may be used. The thickness of the silicon substrate 21 is determined based on, for example, workability and cost, but the thickness may be larger than at least the thickness of the base portions 22 of the vibration elements 20. In view of the fact that each base portion 22 has a thickness of 300 μm and each vibrator portion 23 has a thickness of 100 μm as described above, the silicon substrate 21 may have a thickness of 300 μm or more.

As shown in FIG. 12, by thermal oxidation, the first main surface 21-1 and the second main surface 21-2 of the silicon substrate 21 are entirely coated with silicon oxide films ($SiO_2$ films) 33A, 33B (which will simply be referred to as silicon oxide films 33 hereinafter unless the two are described individually). When the silicon substrate 21 is given a crystal anisotropic etching treatment, the silicon oxide films 33 function as protective films. The silicon oxide films 33 are given a thickness sufficient to function as protective films. For example, the thickness thereof is set to about 0.3 μm.

[Etched Recess Forming Step]

The vibration-element forming process includes a step similar to a thin film step in a semiconductor process. Specifically, the process includes an etched-recess forming step for etching the first main surface 21-1 of the silicon substrate 21 to form etched recesses 37 having a predetermined thickness at positions where the vibrator portions 23 of the vibration elements 20 are to be formed.

Referring to FIGS. 13 to 19, the etched-recess forming step includes, for example, a photoresist-layer forming substep for forming a photoresist layer 34 on the first main surface 21-1 of the silicon substrate 21, a photoresist patterning substep for forming photoresist-layer openings 35 in the photoresist layer 34 in correspondence to the positions where the etched recesses 37 are to be formed, a first etching substep for removing portions of the silicon oxide film 33A exposed through the photoresist-layer openings 35 so as to form silicon-oxide-film openings 36, and a second etching substep for forming the etched recesses 37 in the silicon-oxide-film openings 36.

In the photoresist-layer forming substep, a photoresist material is applied entirely over the silicon oxide film 33A disposed on the first main surface 21-1 of the silicon substrate 21 so as to form the photoresist layer 34. In the photoresist-layer forming substep, a photosensitive photoresist material called "OFPR-8600" manufactured by Tokyo Ohka Kogyo Co., Ltd. is used as the photoresist material. After this photoresist material is applied, the photoresist material is pre-baked by heating with microwaves so as to remove moisture, thereby forming the photoresist layer 34 on the silicon oxide film 33A.

Figure 13:
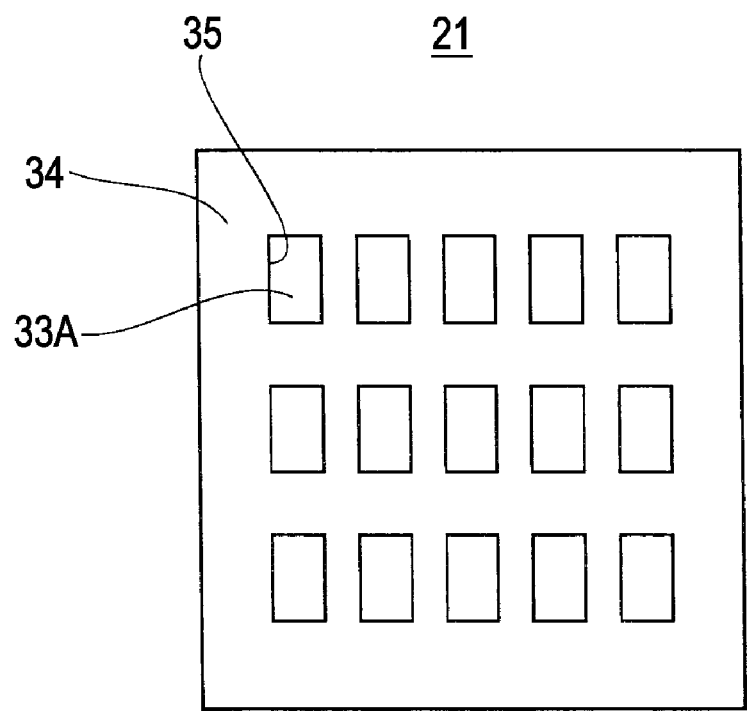
FIG. 13 is a plan view of the silicon substrate provided with a photoresist layer having patterned sections in which the vibration elements are to be formed.
Figure 14:
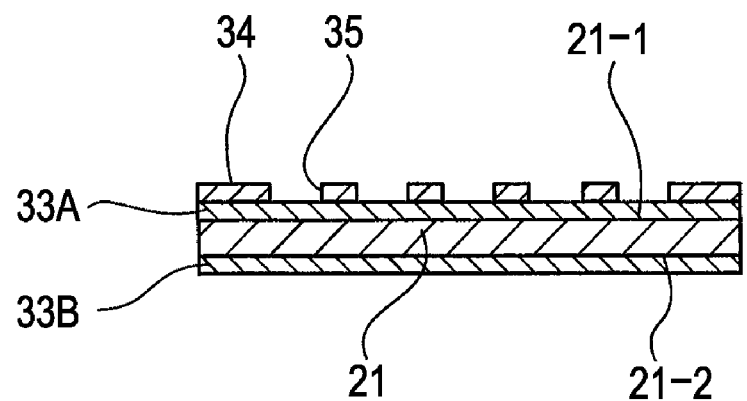
FIG. 14 is a cross-sectional view of the silicon substrate shown in FIG. 13.

In the photoresist patterning substep, the photoresist layer 34 is given a masking treatment so that the sections in which the silicon-oxide-film openings 36 are to be formed are exposed. The photoresist layer 34 then undergoes exposure and development. In the photoresist patterning substep, the sections of the photoresist layer 34 corresponding to the silicon-oxide-film openings 36 are removed so as to form the plurality of photoresist-layer openings 35 simultaneously, which allow sections of the silicon oxide film 33A to be exposed to the outside, as shown in FIGS. 13 and 14. Referring to FIG. 13, the silicon substrate 21 is provided with (3×5) photoresist-layer openings 35 so that 15 vibration elements 20 are simultaneously formed as a result of the steps to be described below.

The first etching substep is for removing the sections of the silicon oxide film 33A exposed to the outside through the photoresist-layer openings 35. In the first etching substep, a wet etching technique is adopted for removing only the above-mentioned sections of the silicon oxide film 33A so that the smoothness of the interface of the silicon substrate 21 can be maintained. However, the etching technique is not limited to the above, and may be other appropriate types of techniques, such as an ion etching technique.

Figure 15:
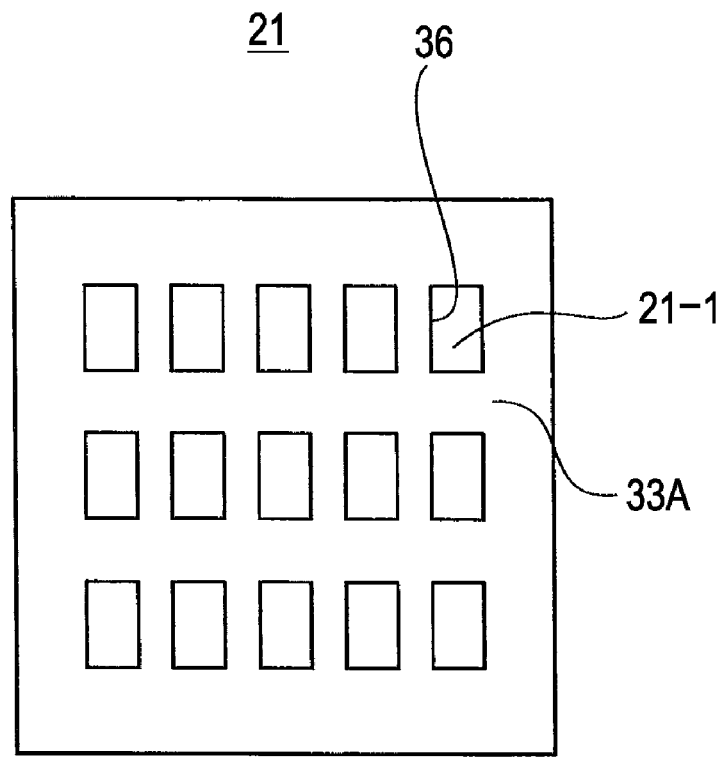
FIG. 15 is a plan view of the silicon substrate provided with a silicon oxide film having patterned sections in which the vibration elements are to be formed.
Figure 16:
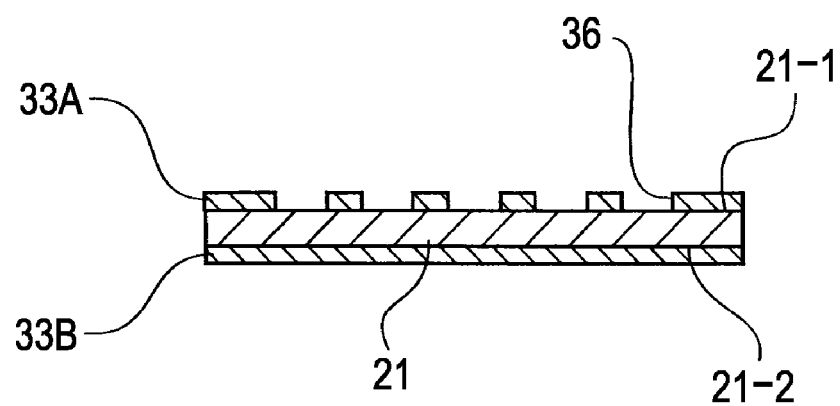
FIG. 16 is a cross-sectional view of the silicon substrate shown in FIG. 15.

In the first etching substep, an ammonium fluoride solution, for example, is used as an etching solution for removing the sections of the silicon oxide film 33A to form the silicon-oxide-film openings 36. Thus, as shown in FIGS. 15 and 16, sections of the first main surface 21-1 of the silicon substrate 21 are exposed to the outside. If etching is performed over a long time in the first etching substep, a side etching phenomenon may occur, in which etching proceeds from the sides of the silicon-oxide-film openings 36. Therefore, it is preferable that the etching time be controlled precisely such that the etching is stopped at a point at which the silicon oxide film 33A is completely etched.

The second etching substep is for forming the etched recesses 37 at sections of the first main surface 21-1 of the silicon substrate 21 that are exposed to the outside through the silicon-oxide-film openings 36. In the second etching substep, the silicon substrate 21 is etched until reaching the thickness of the vibrator portions 23 by crystal anisotropic wet etching, which is based on the property that the etching rate depends on the crystal orientation of the silicon substrate 21.

In the second etching substep, a TMAH (tetramethylammonium hydroxide), KOH (potassium hydroxide), or EDP (ethylenediamine-pyrocatechol-water) solution, for example, is used as the etching solution. Specifically, in the second etching substep, a 20% TMAH solution is used as the etching solution so as to increase the selection ratio of the etching rate of the silicon oxide films 33A, 33B on the front and back surfaces thereof. The etching is performed for six hours while stirring the etching solution kept at a temperature of 80° C. so as to form the etched recesses 37 shown in FIGS. 17 and 18.

In the second etching substep, the etching is performed on the basis of the property of the silicon substrate 21 as a base material that the etching rate of each side surface 21-3 is lower than that of the first main surface 21-1 and the second main surface 21-2. Thus, a (110) orientation surface at an angle of about 55° with respect to a (100) orientation surface is formed. Accordingly, each of the etched recesses 37 is given opening dimensions that gradually decrease at an inclination angle of about 55° from the opening to the bottom, such that the etched recess 37 has etched slopes 133 on inner walls thereof, which have an inclination angle of about 55°.

Figure 17:
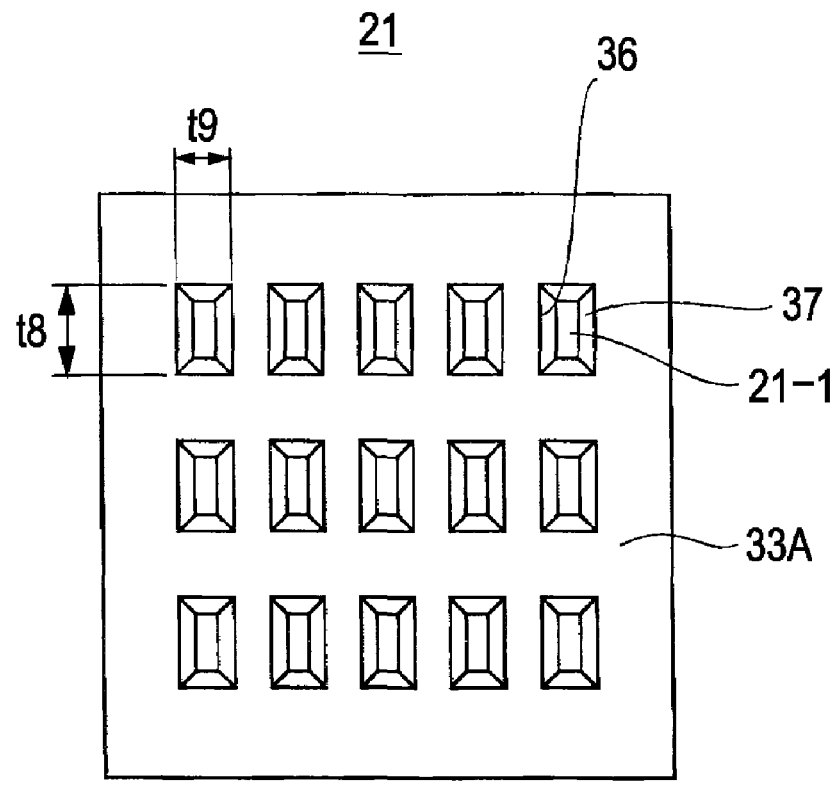
FIG. 17 is a plan view of the silicon substrate provided with etched recesses constituting diaphragm portions, the diaphragm portions determining the thickness of the vibrator portions.
Figure 18:
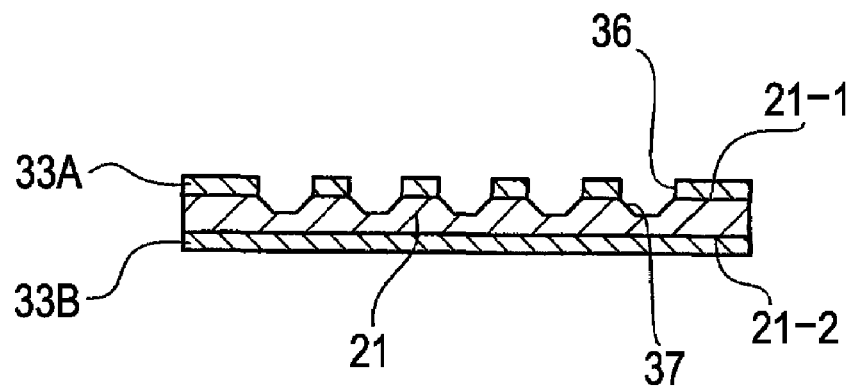
FIG. 18 is a cross-sectional view of the silicon substrate shown in FIG. 17.
Figure 19:
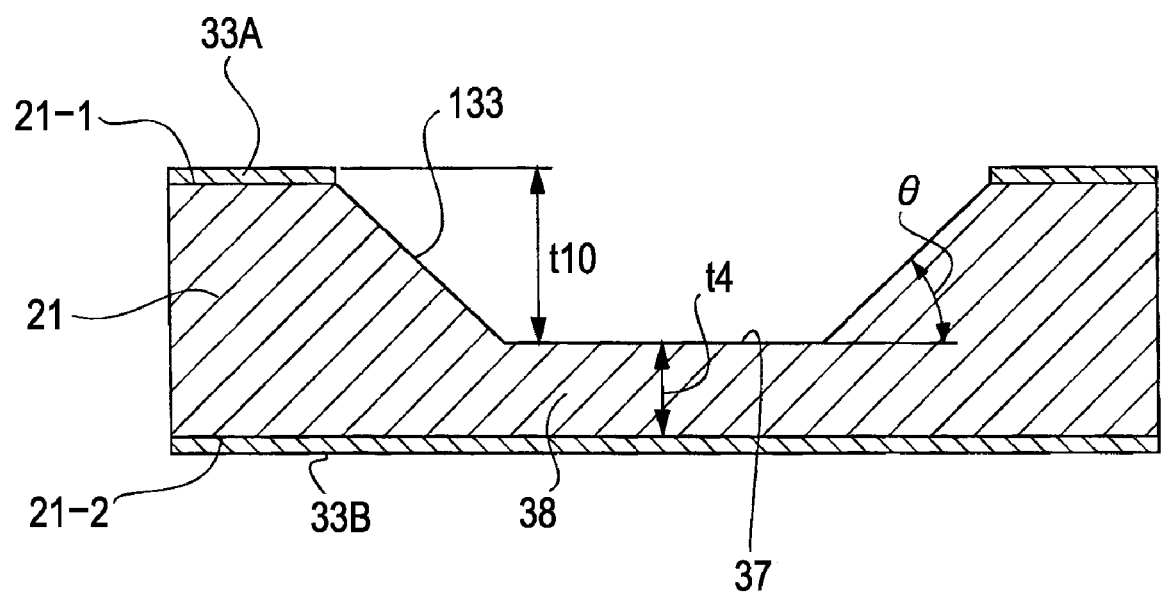
FIG. 19 is an enlarged cross-sectional view of one of the etched recesses.

Each etched recess 37 constitutes a diaphragm portion 38, which is to be formed into the vibrator portion 23 by an outline cutting step to be described below. Each etched recess 37 has an opening having a length t8 and a width t9, as shown in FIG. 17, and a depth t10, as shown in FIG. 19. Referring to FIG. 19, each etched recess 37 forms a trapezoidal space in cross section in which the opening dimensions gradually decrease from the first main surface 21-1 towards the second main surface 21-2.

As described above, the inner walls of each etched recess 37 are given an inclination angle θ of 55° towards the bottom. The diaphragm portion 38 is determined by the width t6 and the length t5 of the vibrator portion 23 and also by a width t7 of an outline groove 39 (see FIGS. 36 and 37) which is formed by cutting the silicon substrate 21 along the periphery of the vibrator portion 23. The width t7 of the outline groove 39 is determined from the expression, (depth t10×1/tan 55°).

Accordingly, in each etched recess 37, the opening width t9 that determines the width of the diaphragm portion 38 is determined from the expression, (depth t10×1/tan 55°)×2+t6 (width of the vibrator portion 23)+2×t7 (width of the outline groove 39). In each etched recess 37, when t10=200 μm, t6=100 μm, and t7=200 μm, the opening width t9=780 μm.

Similar to the width direction, the above-described second etching substep is performed for the length direction so that the inner walls of each etched recess 37 in the length direction are also inclined at an angle of 55°. Thus, in each etched recess 37, the length t8 that determines the length of the diaphragm portion 38 is determined from the expression (depth t10×1/tan 55°)×2+t5 (length of the vibrator portion 23)+t7 (width of the outline groove 39). In each etched recess 37, when t10=200 μm, t5=2.5 mm, and t7=200 μm, the length t8=2980 μm.

[Electrode Forming Step (Deposition)]

As a result of the above-described etched-recess forming step, the rectangular diaphragm portions 38 having a predetermined thickness are formed between the bottom of the etched recesses 37 and the second main surface 21-2 of the silicon substrate 21. The diaphragm portions 38 are to be formed into the vibrator portions 23 of the vibration elements 20. After the etched-recess forming step, an electrode forming step is performed on the diaphragm portions 38 with the second main surface 21-2 as a work surface.

Figure 20:
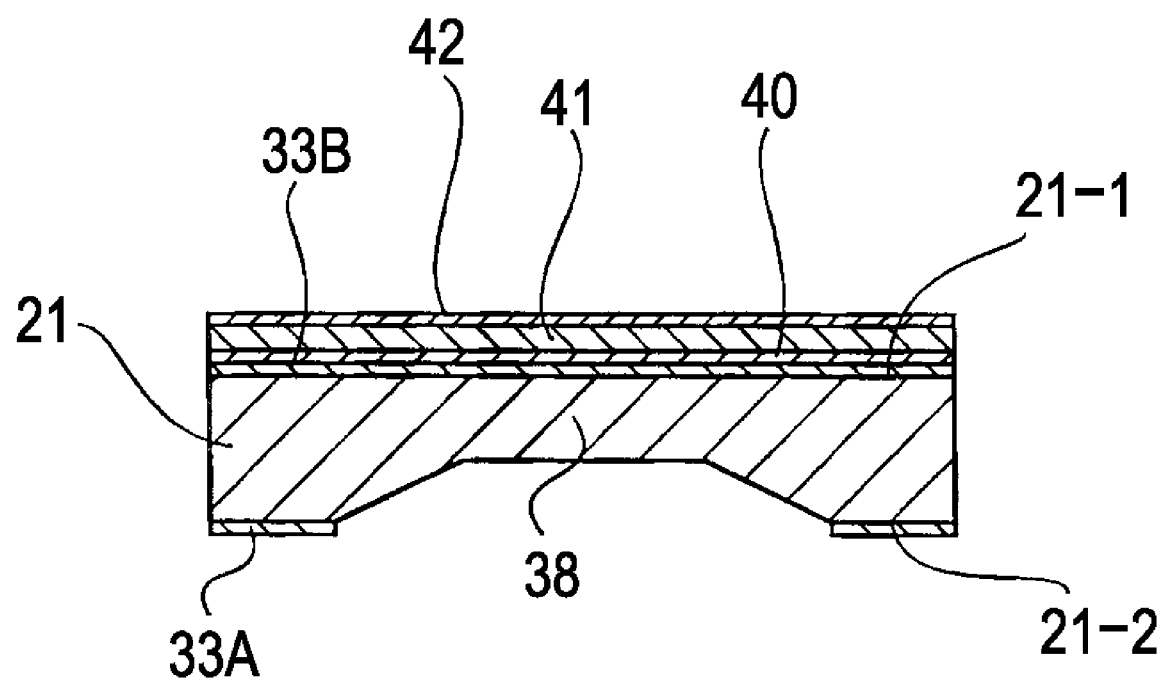
FIG. 20 is a partial cross-sectional view showing a state where one of the diaphragm portions has a first electrode layer, a piezoelectric layer, and a second electrode layer stacked thereon.

In the electrode forming step, a magnetron sputtering device, for example, is used to form electrode layers over the silicon oxide film 33B on the second main surface 21-2 at sections corresponding to the etched recesses 37. Referring to FIG. 20, the electrode forming step includes a first-electrode-layer forming substep for forming the first electrode layer 40, which will be formed into the reference electrode layer 27 on the silicon oxide film 33B, a piezoelectric-layer forming substep for forming a piezoelectric layer 41, which will be formed into the piezoelectric thin film layer 28, and a second-electrode-layer forming substep for forming a second electrode layer 42, which will be formed into the drive electrode layer 29 and the detection electrodes 30.

In the vibration-element forming process, a step for forming a conductor layer for forming the leads 31 and the terminals 25 in the sections in which the base portions 22 are to be formed is performed simultaneously with the substep for forming the first electrode layer 40 and the substep for forming the second electrode layer 42 for the vibrator portions 23.

Referring to FIG. 20, the first-electrode-layer forming substep includes forming a titanium thin film sublayer by sputtering titanium entirely over sections of the silicon oxide film 33B that correspond to the vibrator portions 23, and forming a platinum sublayer on the titanium thin film sublayer by sputtering platinum thereon. Thus, the first electrode layer 40 has a double-layer structure. When forming the titanium thin film sublayer, the titanium thin film sublayer is deposited to a thickness of 50 nm or less (for example, 5 nm to 20 nm) on the silicon oxide film 33B under sputtering conditions including, for example, a gas pressure of 0.5 Pa and an RF (radio frequency) power of 1 kW. When forming the platinum sublayer, the platinum sublayer is deposited to a thickness of about 200 nm on the titanium thin film sublayer under sputtering conditions including, for example, a gas pressure of 0.5 Pa and an RF power of 0.5 kW.

In the first electrode layer 40, the titanium thin film sublayer enhances the adhesiveness to the silicon oxide film 33B, and the platinum sublayer functions as a satisfactory electrode. In the first-electrode-layer forming substep, the conductor layer for forming the first lead 31A and the first terminal 25A extending from each diaphragm portion 38 towards the section in which each base portion 22 is to be formed is formed simultaneously with the first electrode layer 40.

In the piezoelectric-layer forming substep, the piezoelectric layer 41 is deposited to a predetermined thickness by sputtering, for example, lead zirconate titanate (PZT) entirely over the first electrode layer 40. In the piezoelectric-layer forming substep, the piezoelectric layer 41 defined by a PZT layer is deposited to a thickness of about 1 μm on the first electrode layer 40 using $Pb_{(1+x)}(Zr_{0.53}Ti_{0.47})O_{3-y}$ oxide as a target under sputtering conditions including, for example, a gas pressure of 0.7 Pa and an RF power of 0.5 kW. Moreover, in the piezoelectric-layer forming substep, the piezoelectric layer 41 is crystallized by baking in an electric oven. The baking treatment is performed at 700° C. in an oxygen atmosphere for 10 minutes. The piezoelectric layer 41 covers a portion of the electrode layer extending from the first electrode layer 40 towards the section in which each base portion 22 is to be formed.

In the second-electrode-layer forming substep, a platinum layer is formed by sputtering platinum entirely over the piezoelectric layer 41 so as to form the second electrode layer 42. In the second-electrode-layer forming substep, the platinum thin film layer is deposited to a thickness of about 200 nm on the piezoelectric layer 41 under sputtering conditions including a gas pressure of 0.5 Pa and an RF power of 0.5 kW.

[Electrode Forming Step (Patterning)]

Next, a second-electrode-layer patterning step for patterning the second electrode layer 42 serving as the topmost layer is performed. In the second-electrode-layer patterning step, the drive electrode layer 29 and the pair of detection electrodes 30R, 30L each having a predetermined shape are formed as shown in FIGS. 21 and 22.

As described above, the drive electrode layer 29 serves as an electrode for applying a predetermined drive voltage for driving the corresponding vibrator portion 23. In a central region of the vibrator portion 23 in the width direction thereof, the drive electrode layer 29 having a predetermined width extends in the longitudinal direction of the vibrator portion 23 so as to cover substantially the entire central lengthwise region. The detection electrodes 30 are electrodes for detecting a Coriolis force produced in the vibrator portion 23 and are disposed at opposite sides of the drive electrode layer 29. While being insulated from each other, the detection electrodes 30 extend parallel to each other so as to cover substantially the entire lengthwise region.

Figure 21:
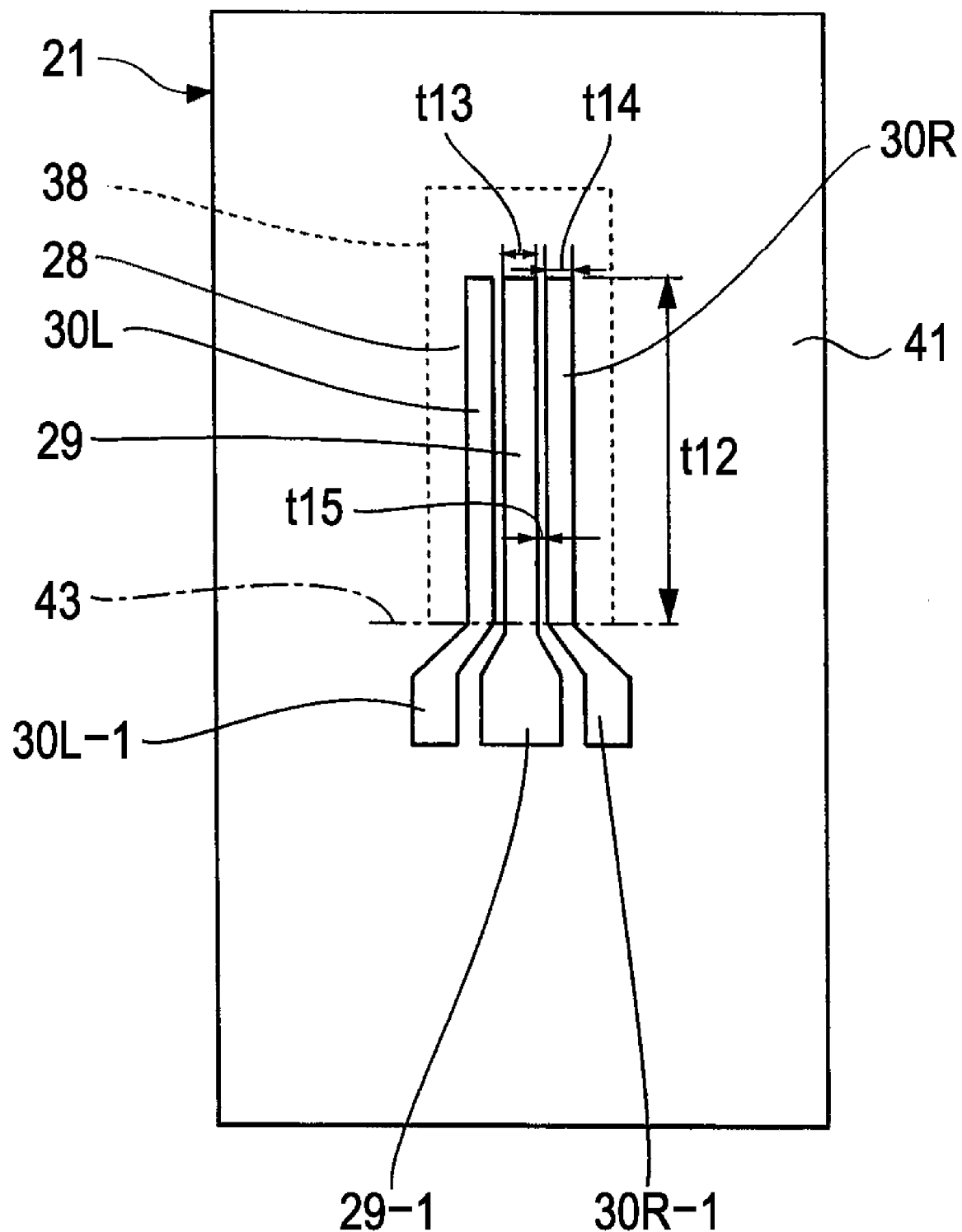
FIG. 21 is a partial plan view showing a state where a drive electrode layer and detection electrodes are patterned on the second electrode layer.
Figure 22:
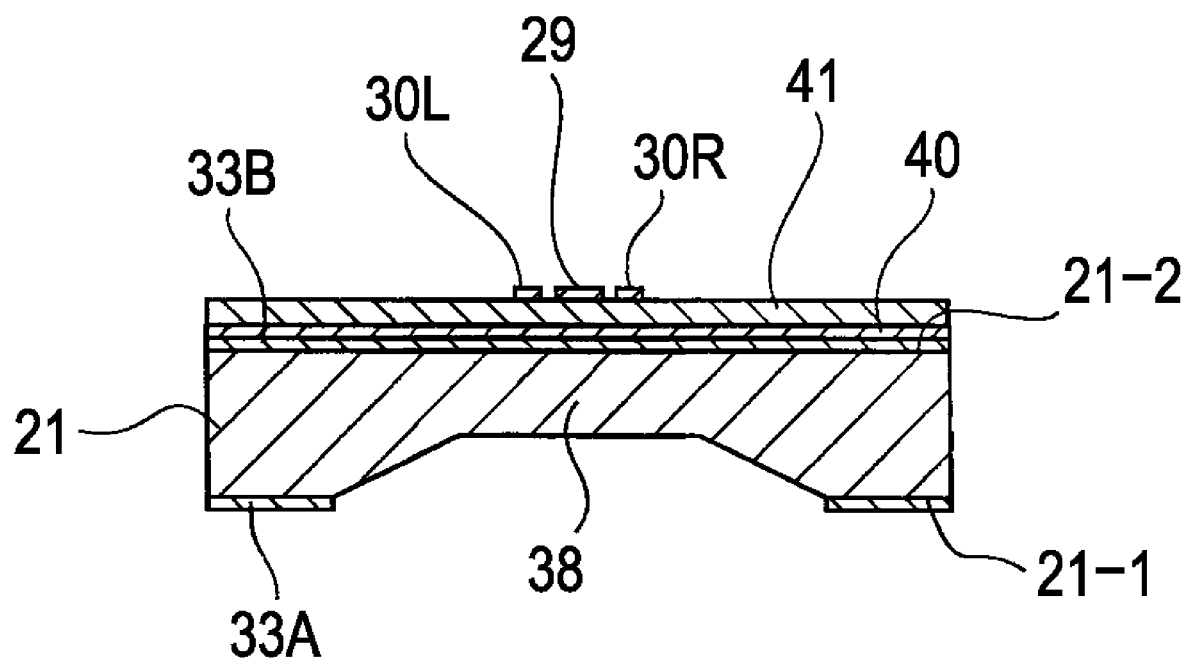
FIG. 22 is a partial cross-sectional view showing the state where the drive electrode layer and the detection electrodes are patterned on the second electrode layer.

In the second-electrode-layer patterning step, the second electrode layer 42 is given a photolithographic treatment so as to form the drive electrode layer 29 and the detection electrodes 30 on the piezoelectric layer 41, as shown in FIG. 21. In the second-electrode-layer patterning step, a resist layer is formed in sections corresponding to the drive electrode layer 29 and the detection electrodes 30, and unnecessary sections of the second electrode layer 42 are removed by, for example, ion etching. Subsequently, the resist layer is removed so that the drive electrode layer 29 and the detection electrodes 30 are patterned. The second-electrode-layer patterning step is not limited to the above. Alternatively, the drive electrode layer 29 and the detection electrodes 30 may be formed by applying an appropriate conductor-layer forming step performed in a semiconductor process.

Referring to FIG. 21, the drive electrode layer 29 and the detection electrodes 30 are formed such that the tip ends thereof are aligned and the base ends thereof are also aligned at a root section 43 of the vibrator portion 23. In the second-electrode-layer patterning step, wide lead connection segments 29-1, 30R-1, and 30L-1 are patterned integrally with the base ends of the drive electrode layer 29 and the detection electrodes 30 that are aligned at the root section 43.

In the second-electrode-layer patterning step, the second electrode layer 42 is patterned so as to form the drive electrode layer 29 having, for example, a length t12 of 2 mm and a width t13 of 50 μm. Furthermore, as shown in FIG. 21, the first detection electrode 30R and the second detection electrode 30L each having a width t14 of 10 μm are patterned on opposite sides of the drive electrode layer 29. Each of the detection electrodes 30R, 30L is separated from the drive electrode layer 29 by a distance t15 of 5 μm. Moreover, in the second-electrode-layer patterning step, the lead connection segments 29-1, 30R-1, and 30L-1 each having a length of 50 μm and a width of 50 μm are also formed by patterning. The dimensional values of the drive electrode layer 29 and the detection electrodes 30 are not limited to the above, and may be set within a range that allows them to be formed properly on the second main surface of the vibrator portion 23.

Subsequently, a piezoelectric-layer patterning step for patterning the piezoelectric layer 41 is performed so as to form the piezoelectric thin film layer 28 to a predetermined shape shown in FIGS. 23 and 24. The piezoelectric thin film layer 28 is formed by patterning the piezoelectric layer 41 in a manner such that a remaining area thereof is larger than the drive electrode layer 29 and the detection electrodes 30. The piezoelectric thin film layer 28 is made slightly narrower than the vibrator portion 23 and extends from the base end to a vicinity of the tip end thereof.

In the piezoelectric-layer patterning step, the piezoelectric layer 41 is given a photolithographic treatment so as to form a resist layer in a region corresponding to the piezoelectric thin film layer 28. Subsequently, unnecessary sections of the piezoelectric layer 41 are removed by wet etching and the like using, for example, a fluoronitric solution, and the resist layer is then removed, whereby the piezoelectric thin film layer 28 shown in FIGS. 23 and 24 is formed. Although the piezoelectric layer 41 is etched by using a wet etching technique in the above-described example, the etching technique is not limited to the above. For example, the piezoelectric thin film layer 28 may alternatively be formed by other alternative techniques, such as ion etching and reaction ion etching (RIE).

Figure 23:
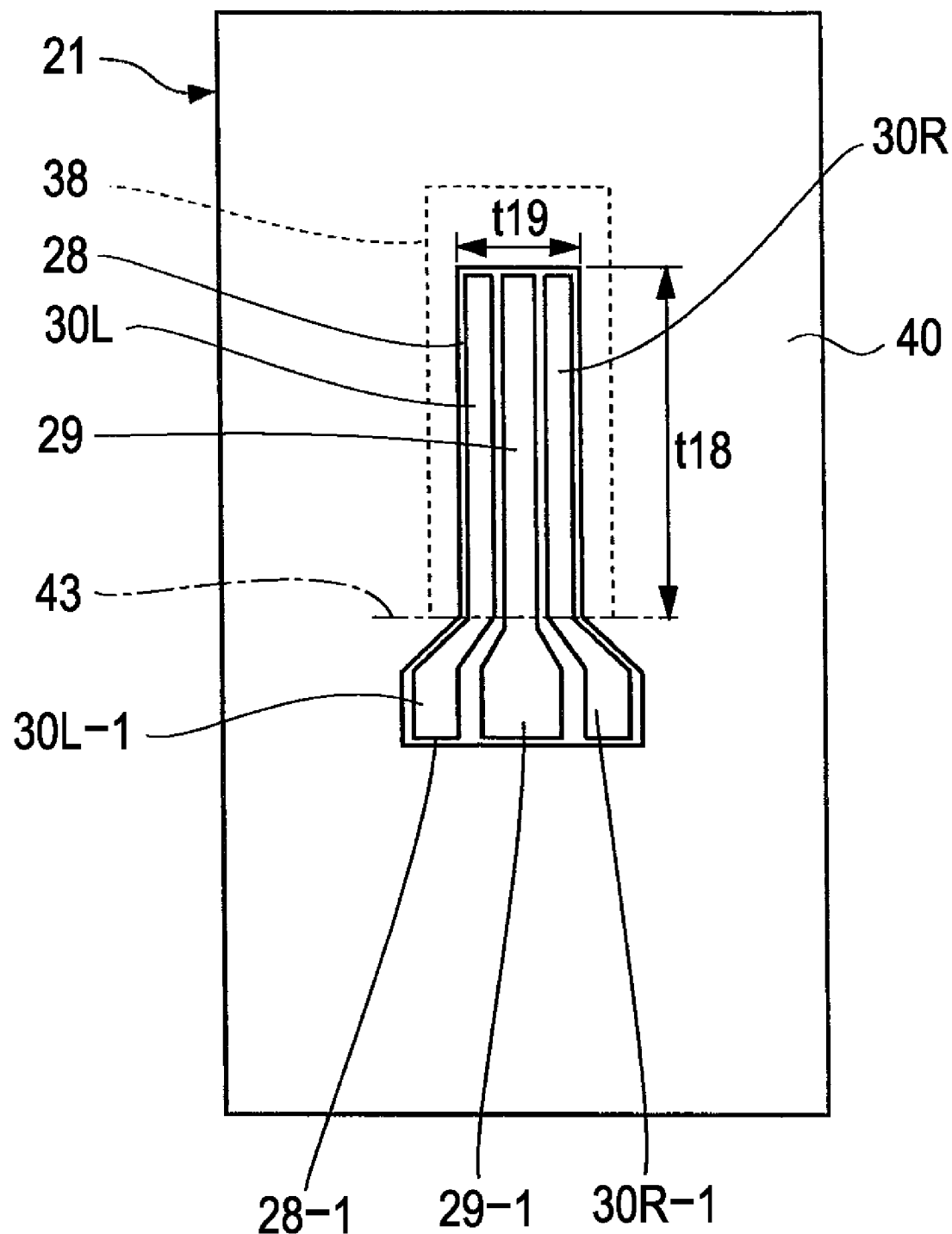
FIG. 23 is a partial plan view showing a state where a piezoelectric thin film layer is patterned on the piezoelectric layer.
Figure 24:
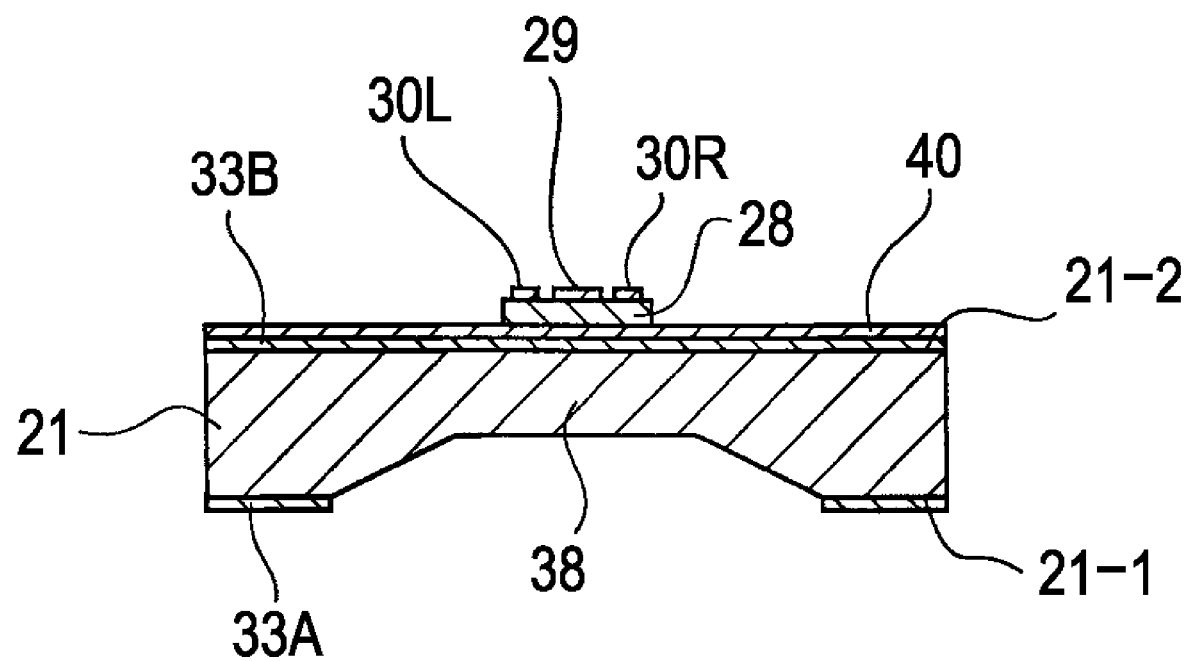
FIG. 24 is a partial cross-sectional view showing the state where the piezoelectric thin film layer is patterned on the piezoelectric layer.

In the piezoelectric-layer patterning step, the base end of the piezoelectric thin film layer 28 is substantially aligned with those of the drive electrode layer 29 and the detection electrodes 30 at the root section 43 of the vibrator portion 23, as shown in FIG. 23. Furthermore, a terminal receiving segment 28-1 is integrally patterned at the base end of the piezoelectric thin film layer 28 and has an area that is slightly larger than the total area of the lead connection segments 29-1, 30R-1, and 30L-1 of the drive electrode layer 29 and the detection electrodes 30.

In the piezoelectric-layer patterning step, the piezoelectric thin film layer 28 is patterned so as to be given a length t18 of 2.2 mm, which is slightly longer than that of the drive electrode layer 29 and the detection electrodes 30, and a width t19 of 90 μm. The terminal receiving segment 28-1 provided at the base end of the piezoelectric thin film layer 28 is patterned so as to be given a width of 5 μm around the periphery of the lead connection segments 29-1, 30R-1, and 30L-1 of the drive electrode layer 29 and the detection electrodes 30. The dimensional values of the piezoelectric thin film layer 28 are not limited to the above, and may be set within a range in which the piezoelectric thin film layer 28 can be formed on the second main surface 23-2 of the vibrator portion 23 with an area larger than the total area of the drive electrode layer 29 and the detection electrodes 30.

Figure 25:
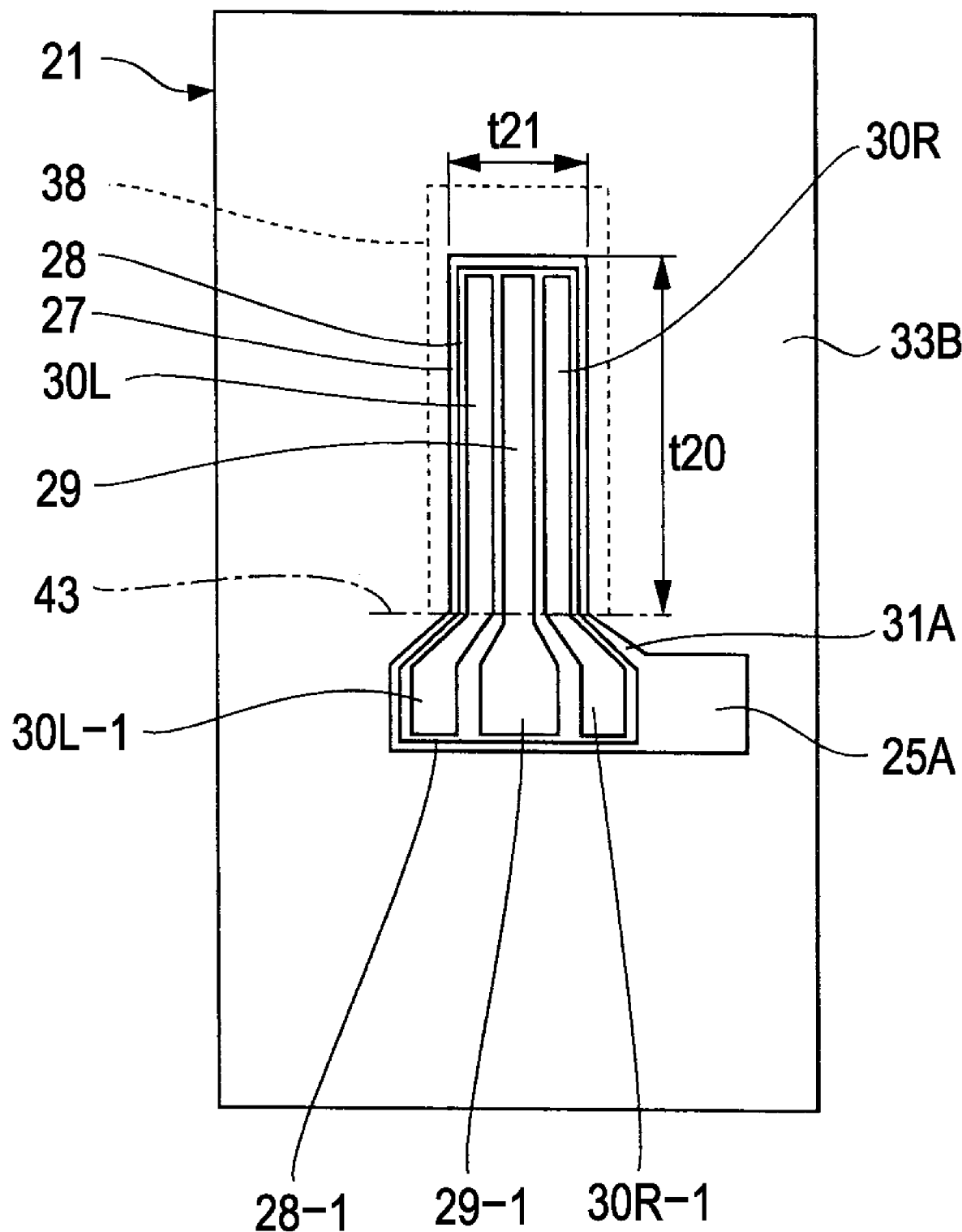
FIG. 25 is a partial plan view showing a state where a reference electrode layer is patterned on the first electrode layer.
Figure 26:
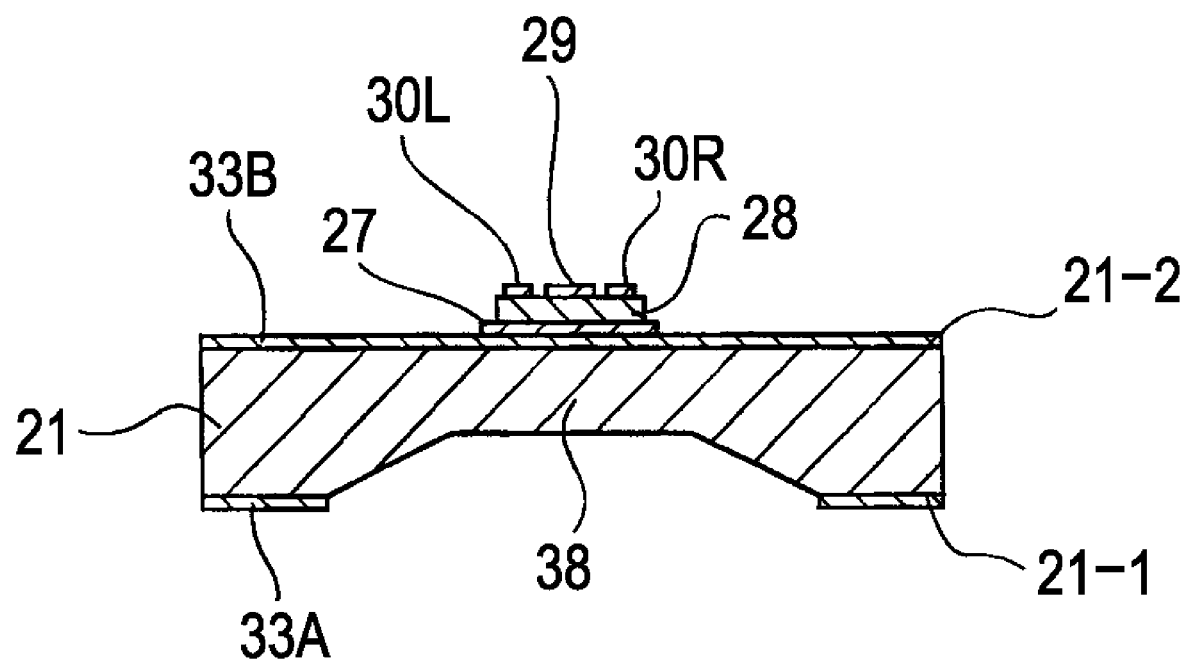
FIG. 26 is a partial cross-sectional view showing the state where the reference electrode layer is patterned on the first electrode layer.

Subsequently, a first-electrode-layer patterning step, which is similar to the above-described second-electrode-layer patterning step, is performed for patterning the first electrode layer 40 to form the reference electrode layer 27, as shown in FIGS. 25 and 26. In the first-electrode-layer patterning step, a resist layer is formed in a section corresponding to the reference electrode layer 27, and unnecessary sections of the first electrode layer 40 is removed by, for example, ion etching. Then, the resist layer is removed so as to form the reference electrode layer 27. The first-electrode-layer patterning step is not limited to the above. Alternatively, the reference electrode layer 27 may be formed by applying an appropriate conductor-layer forming step performed in a semiconductor process.

In the first-electrode-layer patterning step, the reference electrode layer 27 is formed on the second main surface of the vibrator portion 23, and is made slightly narrower than the second main surface of the vibrator portion 23 but wider than the piezoelectric thin film layer 28. As shown in FIG. 25, the base end of the reference electrode layer 27 is substantially aligned with those of the drive electrode layer 29, the detection electrodes 30, and the piezoelectric thin film layer 28 at the root section 43 of the vibrator portion 23. In the first-electrode-layer patterning step, the first lead 31A and the first terminal 25A disposed at an end of the first lead 31A are patterned simultaneously in the section in which the base portion 22 is to be formed so as to extend sideward integrally from the base end.

In the first-electrode-layer patterning step, the reference electrode layer 27 is formed so as to be given a length t20 of 2.3 mm and a width t21 of 94 μm, and a width of 5 μm around the periphery of the piezoelectric thin film layer 28. In the first-electrode-layer patterning step, the dimensional values of the reference electrode layer 27 are not limited to the above, and may be set within a range that allows the reference electrode layer 27 to be formed properly on the second main surface of the vibrator portion 23.

[Planarizing-Layer Forming Step]

Figure 27:
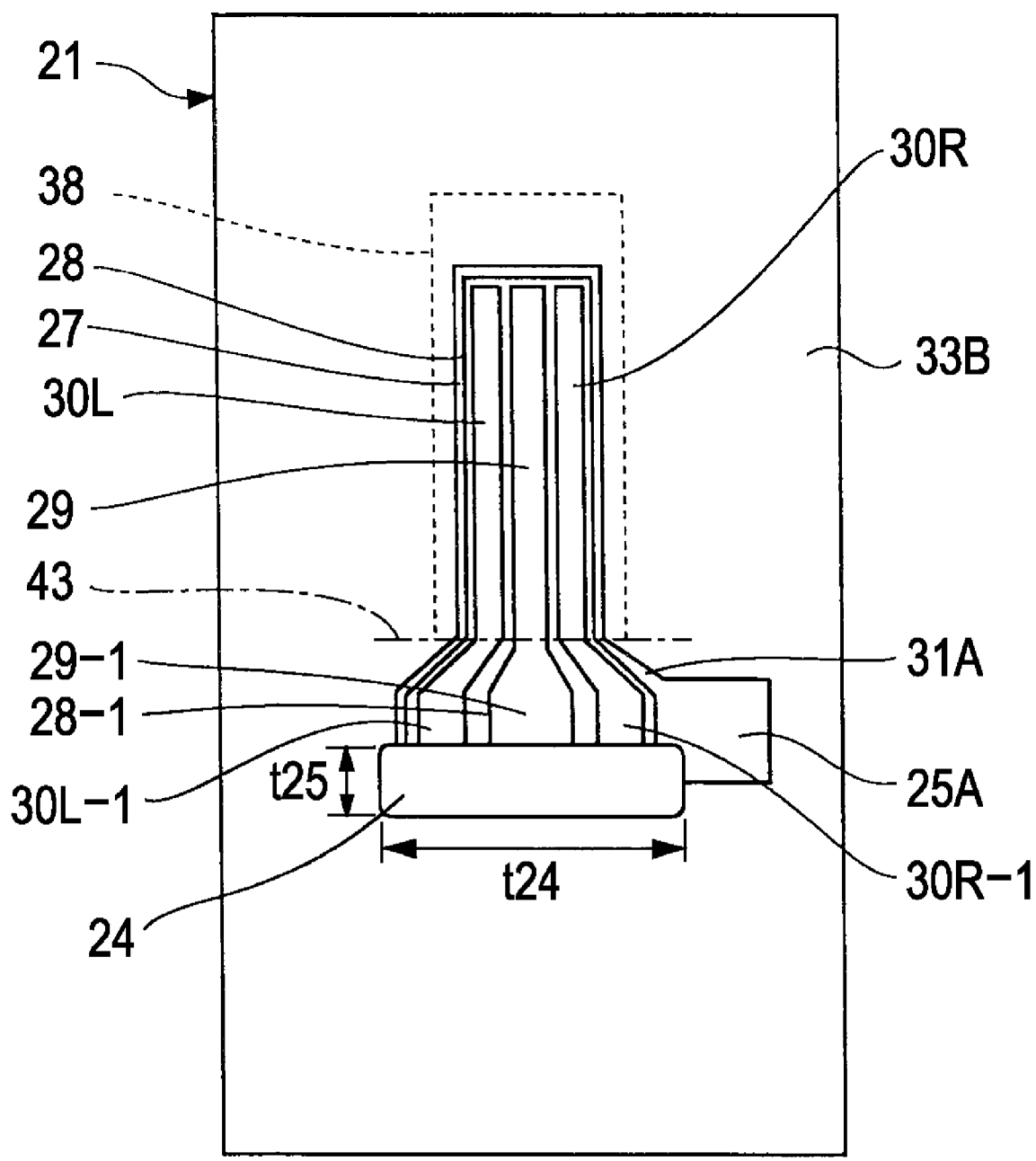
FIG. 27 is a partial plan view showing a state where a planarizing layer is formed.
Figure 28:
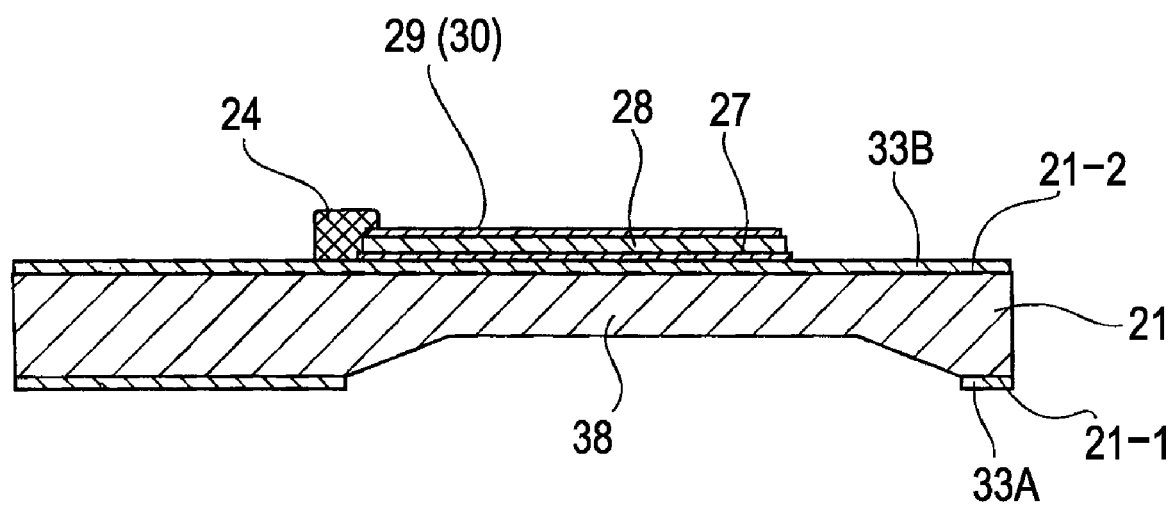
FIG. 28 is a partial cross-sectional view showing the state where the planarizing layer is formed.

In the vibration-element forming process, the lead connection segments 29-1, 30R-1, 30L-1 of the drive electrode layer 29 and the detection electrodes 30, the terminals 25B to 25D, and the leads 31B to 31D integrated with the terminals 25 are formed in correspondence to the section in which each base portion 22 is to be formed as a result of the above-described steps. In this case, in order to achieve smooth connection between the leads 31B to 31D and the lead connection segments 29-1, 30R-1, 30L-1, the planarizing layer 24 shown in FIGS. 27 and 28 is formed.

Figure 29:
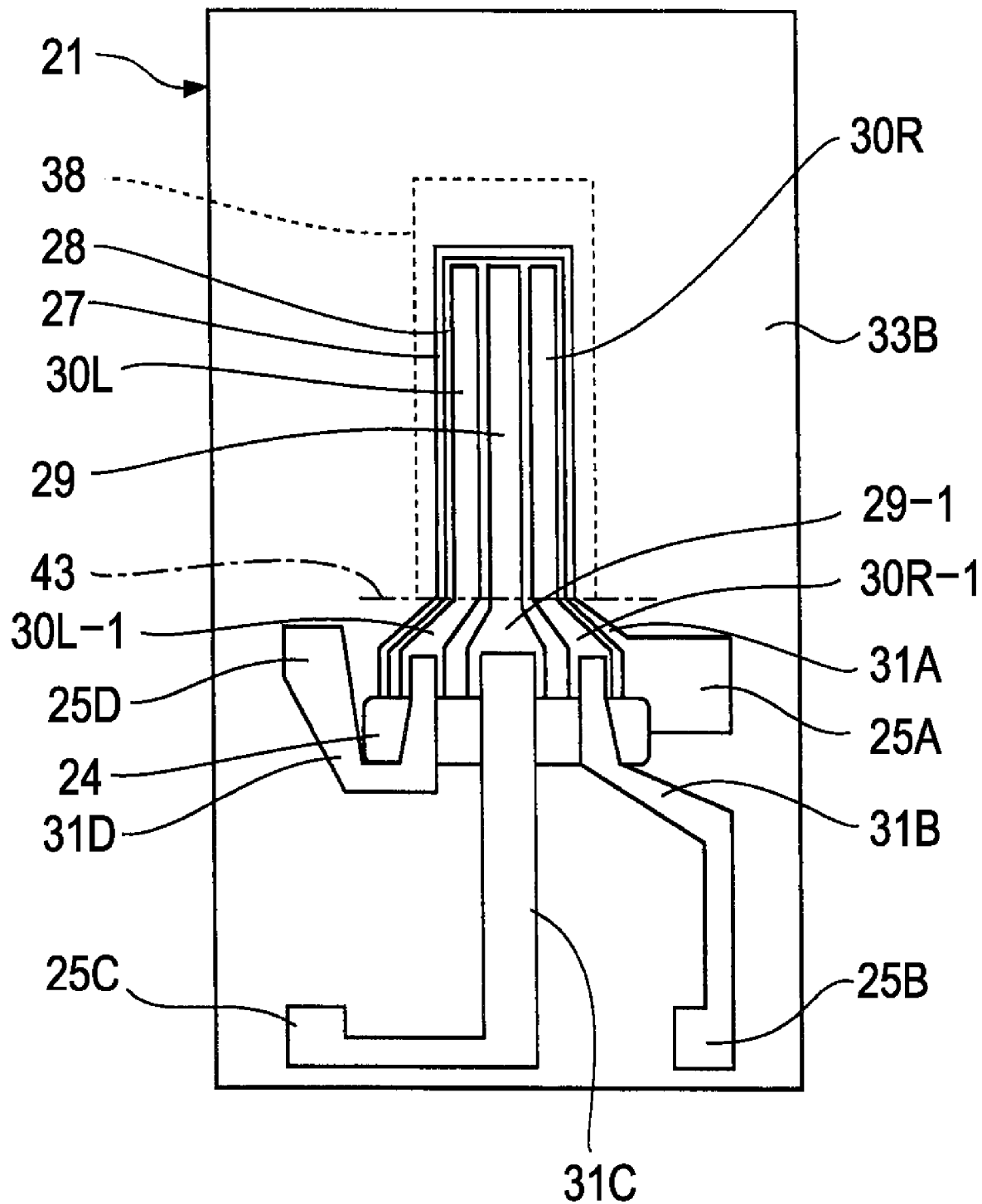
FIG. 29 is a partial plan view showing a state where leads are formed in a section in which the base portion is to be formed.
Figure 30:
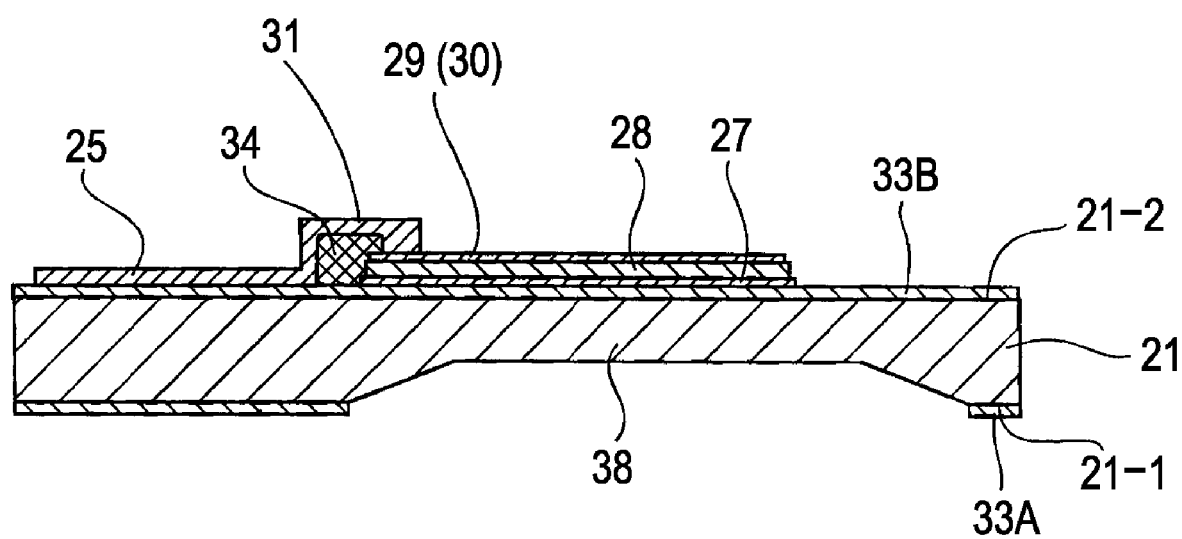
FIG. 30 is a partial cross-sectional view showing the state where the leads are formed in the section in which the base portion is to be formed.

Referring to FIGS. 29 and 30, the leads 31B to 31D that connect the lead connection segments 29-1, 30R-1, 30L-1 and the terminals 25B to 25D are formed so as to pass through the ends of the terminal receiving segment 28-1 of the piezoelectric thin film layer 28 and the reference electrode layer 27 and extend within the section in which the base portion 22 is to be formed. Since the piezoelectric thin film layer 28 is formed by patterning the piezoelectric layer 41 by wet etching, as described above, the edges of the etched sections are inversely tapered toward the second main surface 21-2 of the silicon substrate 21 or are vertically stepped. Thus, when the leads 31B to 31D are formed directly on the section in which the base portion 22 is to be formed, disconnection can occur at the stepped portion. Moreover, it may also be necessary to maintain insulation between the first lead 31A and the leads 31B to 31D extending within the section in which the base portion 22 is to be formed.

In the planarizing-layer forming step, a resist layer formed on the section in which the base portion 22 is to be formed is patterned by a photolithographic treatment such that the resist layer covers the lead connection segments 29-1, 30R-1, 30L-1 and the first lead 31A. The resist layer pattern is cured by heating at, for example, 160° C. to 300° C. so as to form the planarizing layer 24. In the planarizing-layer forming step, the planarizing layer 24 is given a width t24 of 200 μm, a length t25 of 50 μm, and a thickness of 2 μm (exaggeratedly shown in FIG. 28). The planarizing-layer forming step is not limited to the above. Alternatively, the planarizing layer 24 may be formed using an appropriate insulating material or by adopting an appropriate resist-layer forming step performed in a semiconductor process.

[Wiring-Layer Forming Step]

Next, a wiring-layer forming step is performed for forming the second terminal 25B to the fourth terminal 25D and the second lead 31B to the fourth lead 31D in the section in which the base portion 22 is to be formed. In the wiring-layer forming step, a photosensitive photoresist layer is formed entirely over the section in which the base portion 22 is to be formed. The photosensitive photoresist layer is then given a photolithographic treatment so as to form an opening pattern corresponding to the second terminal 25B to the fourth terminal 25D and the second lead 31B to the fourth lead 31D. Then, conductor layer components are formed in the openings by sputtering so as to form a wiring layer. In the wiring-layer forming step, after forming the predetermined conductor layer components, the photoresist layer is removed, whereby the second terminal 25B to the fourth terminal 25D and the second lead 31B to the fourth lead 31D are formed as shown in FIGS. 29 and 30.

In the wiring-layer forming step, a titanium layer and an alumina layer are formed as foundation layers for improving the adhesiveness to the silicon oxide film 33B. Subsequently, a low-cost copper layer having low electrical resistance is formed on the titanium layer. In this case, for example, the titanium layer is given a thickness of 20 nm and the copper layer is given a thickness of 300 nm. The wiring-layer forming step is not limited to the above. For example, the wiring layer may alternatively be formed by applying other types of wiring patterning techniques generally used in a semiconductor process.

[Insulative-Protective-Layer Forming Step]

Next, an insulative-protective-layer forming step is performed for forming an insulative-protective layer 45 having a triple-layer structure on the base portion 22, which has the terminals 25 and the leads 31 formed on the main surface thereof, and on the main surface of the vibrator portion 23, which has the electrode layers and the piezoelectric thin film layer 28 formed thereon, as a result of the above-described steps. The insulative-protective-layer forming step includes a resist-layer forming substep, a resist-layer patterning substep, a first-alumina-sublayer forming substep, a silicon-oxide-sublayer forming substep, a second-alumina-sublayer forming substep, and a resist-layer removing substep.

Figure 31:
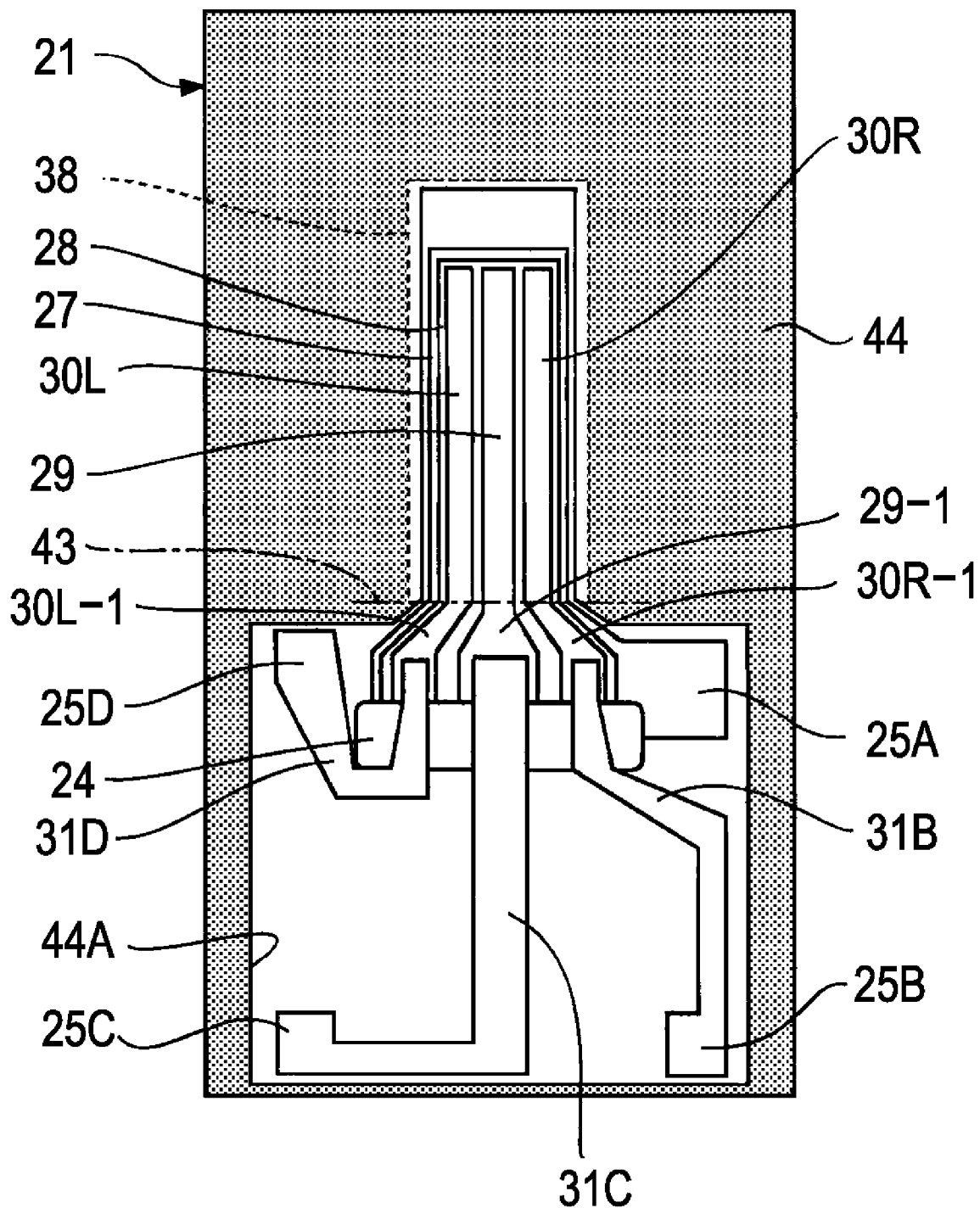
FIG. 31 is a partial plan view showing a state where a photoresist layer for forming an insulative-protective layer is formed.

In the insulative-protective-layer forming step, the resist-layer forming substep and the resist-layer patterning substep are performed in order to form a resist layer 44 on the second main surface of the silicon substrate 21. The resist layer 44 has an opening corresponding to a section in which the insulative-protective layer 45 is to be formed, as shown in FIG. 31. In the resist-layer forming substep, a photosensitive resist agent is applied entirely over the silicon substrate 21 so as to form the resist layer 44. In the resist-layer patterning substep, the resist layer 44 is given a photolithographic treatment so as to form an insulative-protective-layer formation opening 44A in a region corresponding to the section in which the insulative-protective layer 45 is to be formed. Although not shown in the drawing, circular portions of the resist layer 44 remain at sections corresponding to the terminals 25.

Figure 32:
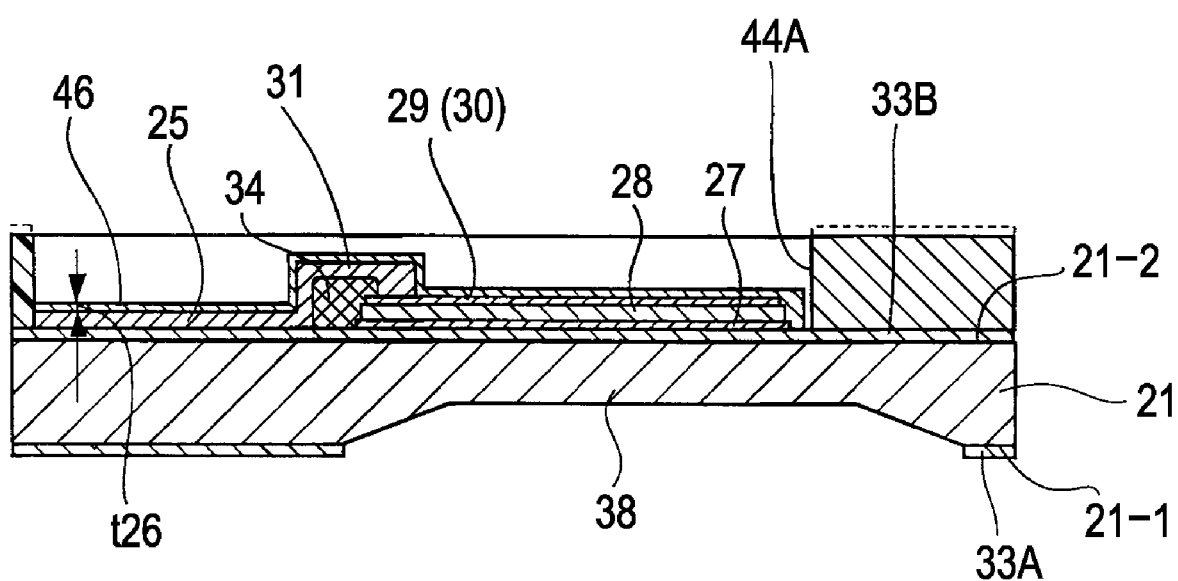
FIG. 32 is a partial cross-sectional view showing a state where a first alumina sublayer to be included in the insulative-protective layer is formed.
Figure 33:
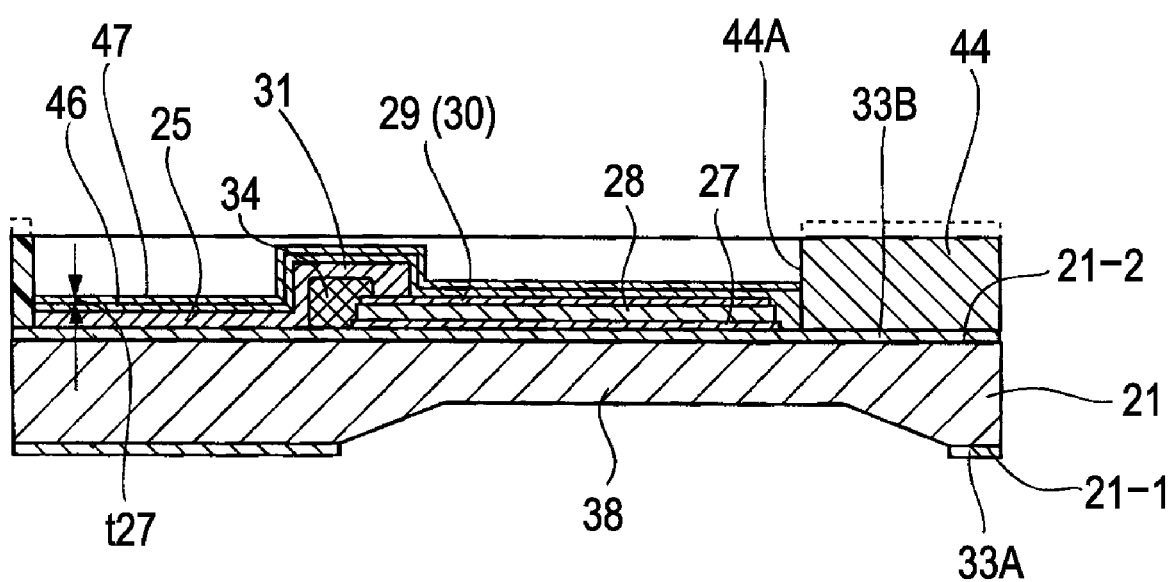
FIG. 33 is a partial cross-sectional view showing a state where a silicon oxide sublayer to be included in the insulative-protective layer is formed.
Figure 34:
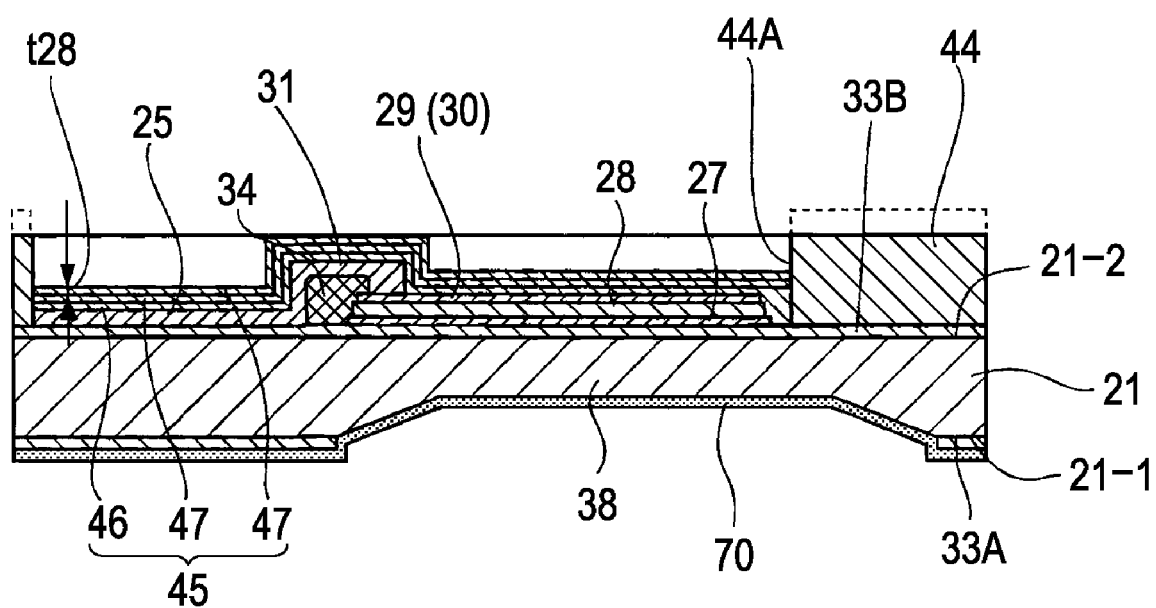
FIG. 34 is a partial cross-sectional view showing a state where a second alumina sublayer to be included in the insulative-protective layer and an etching stopper layer are formed.

In the insulative-protective-layer forming step, the first alumina sublayer 46, the silicon oxide sublayer 47, and the second alumina sublayer 48 are laminated by sputtering, and unnecessary portions of the sputtered films are removed together with the resist layer 44. Thus, a sputtered layer having a triple-layer structure is left in the insulative-protective-layer formation opening 44A of the resist layer 44, whereby a desired insulative-protective layer 45 is formed by a so-called liftoff technique. In FIGS. 32 to 34, only the sputtered films that are formed in the insulative-protective-layer formation opening 44A are shown, but it is needless to say that the sputtered films are also formed on the resist layer 44 having the insulative-protective-layer formation opening 44A. These sputtered films are removed together with the resist layer 44 in the resist-layer removing substep.

In the first-alumina-sublayer forming substep, the first alumina sublayer 46 is formed by sputtering alumina in the insulative-protective-layer formation opening 44A, as shown in FIG. 32. The first alumina sublayer 46 is formed to a thickness t26 of about 50 nm and functions as a foundation metal layer for improving the adhesiveness to the silicon substrate 21, the drive electrode layer 29, or the detection electrodes 30 within the insulative-protective-layer formation opening 44A.

In the silicon-oxide-sublayer forming substep, the silicon oxide sublayer 47 is formed by sputtering silicon oxide on the first alumina sublayer 46, as shown in FIG. 33. In the silicon-oxide-sublayer forming substep, since the lower limit of argon pressure for discharge in a sputtering vessel is 0.35 Pa, the silicon oxide layer 47 having high density is formed by sputtering silicon oxide at an argon pressure set at 0.4 Pa which slightly higher than the lower limit. In the silicon-oxide-sublayer forming substep, the silicon oxide sublayer 47 exhibits a sufficient insulative-protective function since the thickness thereof is at least twice the thickness of the drive electrode layer 29 and the detection electrodes 30, and has a thickness t27 of 1 μm or less which is within a range in which the occurrence rate of burr in the liftoff technique is low. Specifically, the silicon oxide sublayer 47 is formed to a thickness t27 of 750 nm.

In the second-alumina-sublayer forming substep, the second alumina sublayer 48 is formed entirely over the silicon oxide sublayer 47, as shown in FIG. 34, by sputtering alumina thereon. The second alumina sublayer 48 is formed to a thickness t28 of about 50 nm, and enhances the adhesiveness to a resist layer to be formed in an outline-groove forming step, which will be described below, thereby preventing the silicon oxide sublayer 47 from being damaged by an etching agent.

[Outline-Groove Forming Step]

Subsequently, referring to FIG. 34, an etching stopper layer 70 is formed on the first main surface 21-1 of the silicon substrate 21. The etching stopper layer 70 inhibits an occurrence of a defective edge shape, which may occur when a desired edge shape is failed to attain in an outline-groove forming step performed on the silicon substrate 21 due to plasma concentration on the first main surface 21-1. The etching stopper layer 70 is formed by sputtering silicon oxide entirely over the first main surface 21-1 of the silicon substrate 21 to a thickness of about 500 nm.

Figure 35:
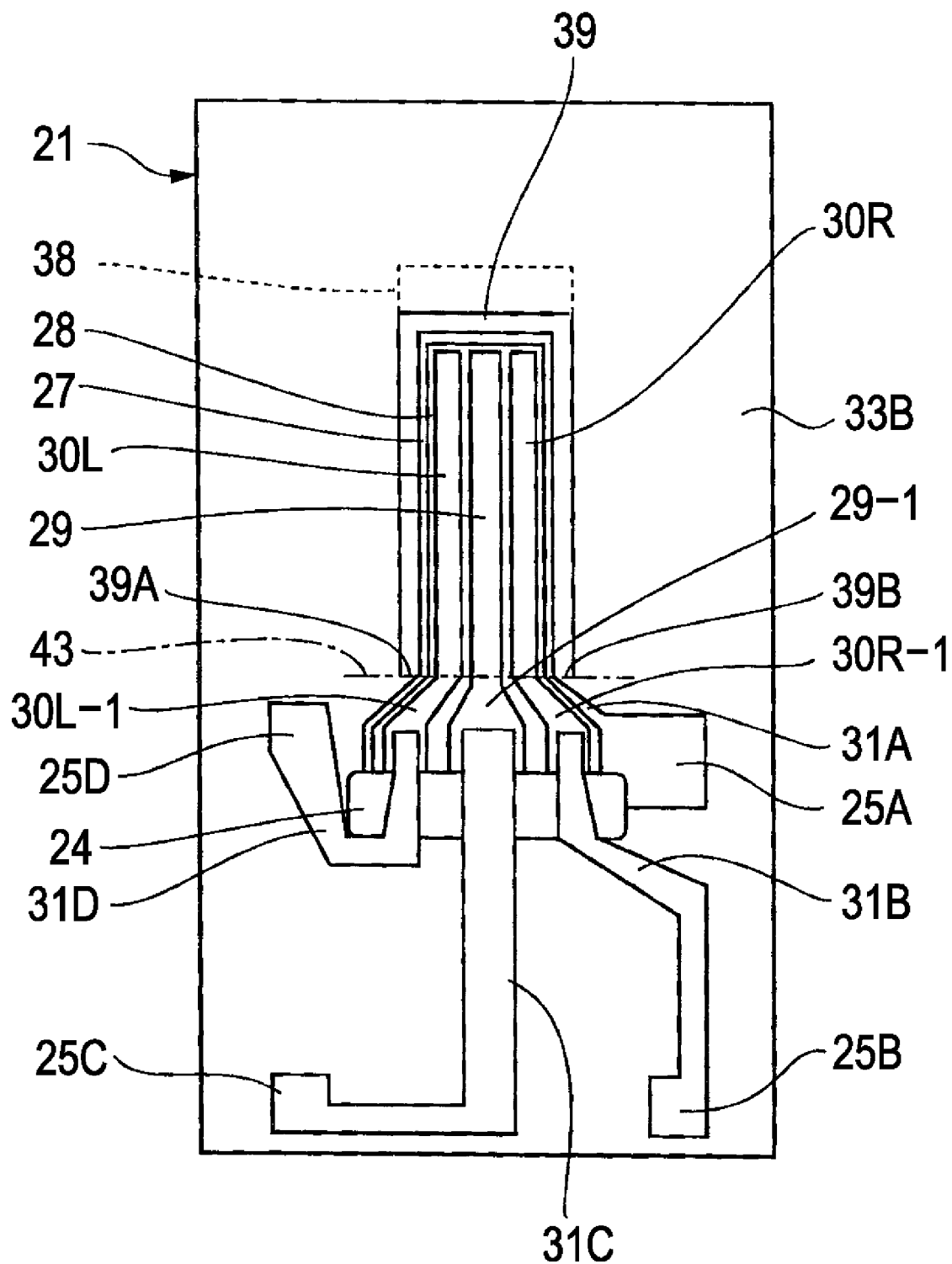
FIG. 35 is a partial plan view showing a state where an outline groove that determines the outline of the vibrator portion is formed.
Figure 36:
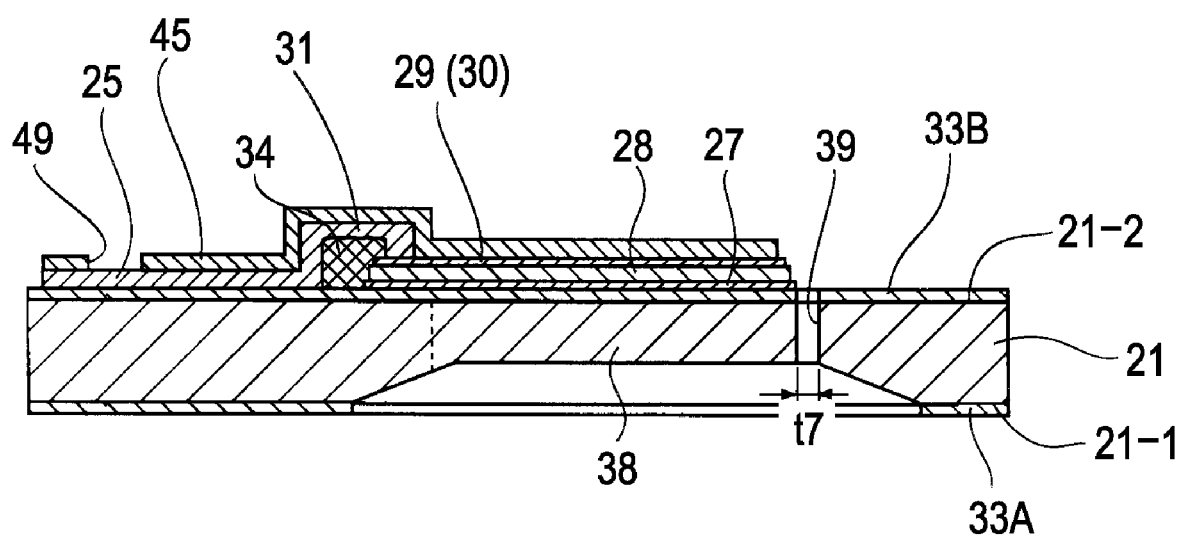
FIG. 36 is a partial cross-sectional view of the vibrator portion as viewed in a direction perpendicular to the longitudinal direction thereof.
Figure 37:
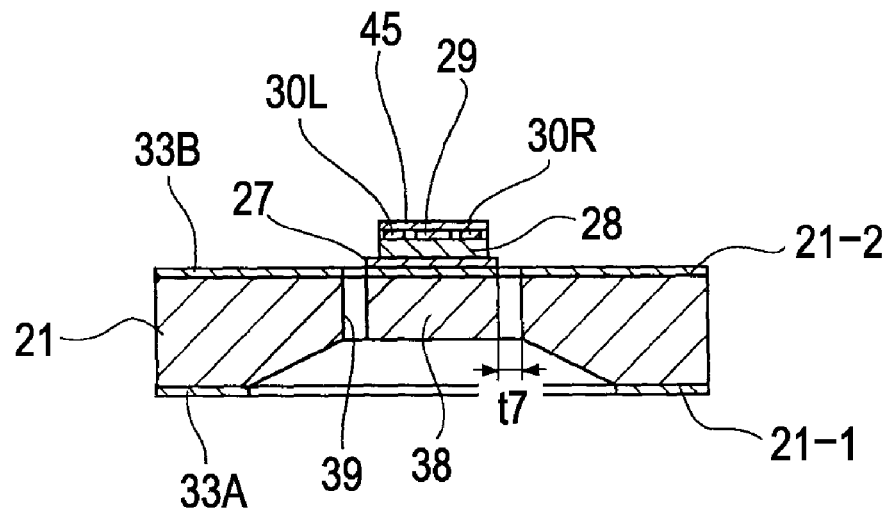
FIG. 37 is a partial cross-sectional view of the vibrator portion as viewed in the longitudinal direction thereof.

In the outline-groove forming step, the outline groove 39 is formed around the periphery of each vibrator portion 23 so as to extend through the corresponding diaphragm portion 38. Referring to FIGS. 35 to 37, in the outline-groove forming step, the outline groove 39 is formed into a substantially U-shaped through-groove provided in a section of the second main surface 21-2 of the silicon substrate 21 that corresponds to the diaphragm portion 38. The U-shaped outline groove 39 surrounds the vibrator portion 23, and has a first end 39A at one side of the root section 43 of the vibrator portion 23 in the silicon substrate 21 having the laminated electrode layers, and a second end 39B at the other side of the root section 43. As described above, the outline groove 39 is given a width t7 of 200 μm.

Specifically, the outline-groove forming step includes a first etching substep for removing a predetermined U-shaped portion of the silicon oxide film 33B to expose the second main surface 21-2 of the silicon substrate 21, and a second etching substep for forming the outline groove 39 in the exposed portion of the silicon substrate 21.

In the first etching substep, a photosensitive photoresist layer is formed entirely over the silicon oxide film 33B. Moreover, the photoresist layer is given a photolithographic treatment so as to form a U-shaped opening pattern surrounding the region in which the electrode layers are formed. The opening pattern has opening dimensions that are the same as the outer dimensions of the vibrator portion 23. In the first etching substep, the portion of the silicon oxide film 33B exposed through the opening pattern is removed by ion etching. It is possible to remove the U-shaped portion of the silicon oxide film 33B by, for example, wet etching in the first etching substep, but in view of a possibility of dimensional error caused by side etching, ion etching is preferred.

In the second etching substep, the remaining portion of the silicon oxide film 33B is used as a resist film (etching protective film). In the second etching substep, the silicon substrate 21 undergoes, for example, reactive ion etching in order to achieve a proper selection ratio with respect to the resist film (silicon oxide film 33B) and to form high-precision vertical surfaces for the periphery of the vibrator portion 23.

In the second etching substep, a reactive ion etching (RIE) device having a function for producing inductively coupled plasma (ICP) is used in order to produce high-density plasma. In the second etching substep, a Bosch (Bosch Corp.) process is performed, which includes etching by introducing $SF_6$ gas to an etching section and forming a protective film for protecting the periphery wall of the etched section by introducing $C_4F_8$ gas. In the Bosch process, the etching and the protective-film forming processes are repeated. Consequently, the outline groove 39 having vertical inner walls is formed in the silicon substrate 21 at a rate of about 10 μm per minute.

After the second etching substep, the etching stopper layer 70 on the first main surface 21-1 of the silicon substrate 21 is removed. When removing the etching stopper layer 70, the etching stopper layer 70 composed of silicon oxide is removed by, for example, wet etching using ammonium fluoride. When removing the etching stopper layer 70, if the photoresist layer formed in the above-described outline-groove forming step is removed, the insulative-protective layer 45 will also be removed, which is undesirable. Therefore, the photoresist layer is removed after the removal of the etching stopper layer 70.

[Polarization Step]

Next, a polarization step for simultaneously polarizing the piezoelectric thin film layers 28 of the vibration elements 20 on the silicon substrate 21 is performed. The polarization step is performed using Cu wiring as polarization wiring. After the polarization step is performed, the Cu wiring is easily dissolved by wet etching and can thus be removed without damaging the vibration elements 20. The polarization wiring is not limited to Cu wiring, and an appropriate conductor that exhibits the above-described function may be used alternatively.

The Cu wiring is formed by a liftoff technique in which a resist layer having an opening with a predetermined shape is pattern-formed on the second main surface 21-2 of the silicon substrate 21 by, for example, a photolithographic treatment, and a Cu layer is then deposited by sputtering, and a portion of the Cu layer adhered to an unnecessary section is finally removed together with the resist layer. For example, the Cu wiring is given a width of 30 μm or more and a thickness of about 400 nm in order to attain conduction during the polarization step.

The polarization step can be performed efficiently by simultaneously connecting the vibration elements 20 to an external power source via ground-side pads and application-side pads provided in the Cu wiring. In the polarization step, each of the pads is connected to the external power source by, for example, wire bonding, and the polarization is performed conductively at 20 V for 20 minutes. The conditions for the polarization step are not limited to the above. The polarization step may be performed by means of other alternative connection techniques or under other appropriate polarization conditions.

[Gold-Bump Forming Step]

Subsequently, a gold-bump forming step is performed. As described above, since each vibration element 20 is surface-mounted on the supporting substrate 2, the gold bumps 26 are formed on the corresponding terminals 25. In the gold-bump forming step, a stud bump having a predetermined shape is formed by pressing a gold-wire bonding tool against each terminal 25. Where necessary, in the gold-bump forming step, dummy bumps may be formed in each base portion 22. The gold bumps 26 may be formed by an alternative technique called a plated bump forming technique, which will be described below.

Figure 38A:
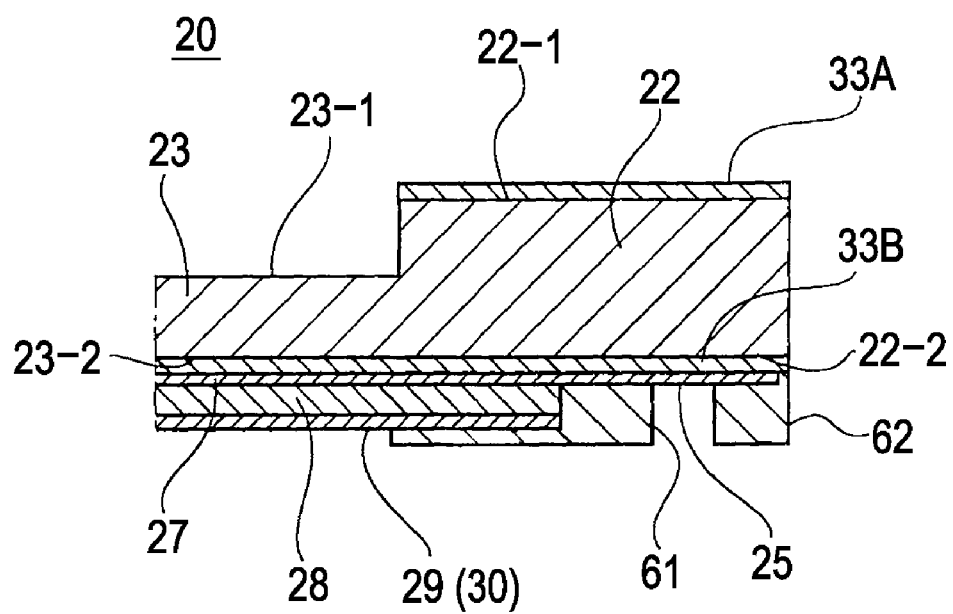
FIG. 38A is a cross-sectional view illustrating a plated bump forming technique performed on each vibration element.
Figure 38B:
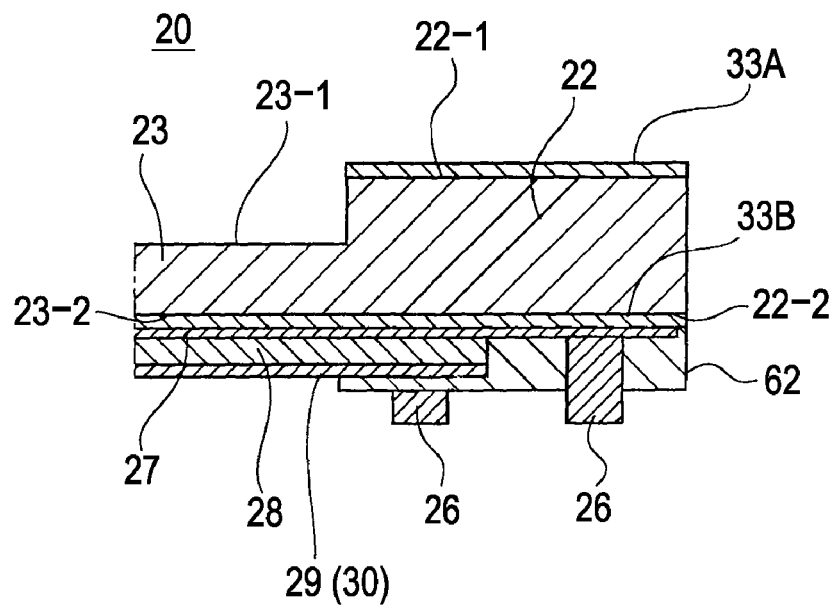
FIG. 38B is a cross-sectional view illustrating the plated bump forming technique performed on the vibration element.

A plated bump forming technique includes forming a plating resist layer 62 having predetermined openings 61 above the terminals 25, as shown in FIG. 38A, forming a gold plated layer 26 to a predetermined height within each opening 61 by gold plating, as shown in FIG. 38B, and removing the plating resist layer 62. In the gold-bump forming step, the thickness (height) of the gold bumps 26 is limited depending on plating conditions, and there may be cases where the gold bumps 26 cannot be formed to a predetermined height. In the gold-bump forming step, if desired gold bumps 26 are not formed in one plating process, a second plating process may be performed using the first gold plated layer as an electrode so as to form so-called stepped gold bumps 26.

The bump forming step is not limited to the above. Alternatively, the bumps may be formed by, for example, vapor deposition or transfer printing performed in a semiconductor process. Furthermore, although not described in detail, in the vibration-element forming process, a so-called bump foundation metal layer composed of, for example, TiW or TiN may be formed in order to improve the adhesiveness between the gold bumps 26 and the terminals 25.

[Cutting Step]

Subsequently, a cutting step for cutting the silicon substrate 21 into the vibration elements 20 is performed. In the cutting step, the sections corresponding to the base portions 22 are cut out using, for example, a diamond cutter so as to cut out the vibration elements 20. In the cutting step, cutting grooves are formed using the diamond cutter, and the silicon substrate 21 is subsequently cut by bending. Alternatively, the cutting step may be implemented using a grindstone or by grinding by means of utilizing the surface orientations of the silicon substrate 21.

The vibration-element forming process described above allows for a significant increase in the number of vibration elements obtained from the silicon substrate (wafer) 21 in comparison to an example of a two-axis integrated vibration element that obtains detection signals of two axes, in which the vibrator portions are integrally formed on adjacent side surfaces of a common base portion 22.

[Mounting Step]

Each of the vibration elements 20 formed as a result of the above-described steps is mounted on the first main surface 2-1 of the supporting substrate 2 by surface mounting with the second main surface 21-2 of the silicon substrate 21 serving as a mounting surface. In each vibration element 20, the gold bumps 26 provided on the terminals 25 are positionally aligned with the corresponding lands 4 on the supporting substrate 2. In this case, as described above, the positioning marks 32 of the vibration element 20 are read, and the vibration element 20 is positioned and oriented with high precision using a mounting device.

While the vibration element 20 is pressed against the supporting substrate 2, the vibration element 20 is mounted onto the first main surface 2-1 of the supporting substrate 2 by ultrasonically welding the gold bumps 26 to the corresponding lands 4. The IC circuit element 7 and the electronic components 8 are mounted onto the first main surface 2-1 of the supporting substrate 2, and the vibration element 20 is then subject to an adjustment step, which will be described below. Subsequently, the cover 15 is attached, whereby the manufacturing process of the vibratory gyrosensor 1 is completed.

Accordingly, in this embodiment, a plurality of the vibration elements 20 having the vibrator portions 23 integrated with the base portions 22 is formed simultaneously on the silicon substrate 21, and are cut out individually from the silicon substrate 21. Then, the first vibration element 20X and the second vibration element 20Y having the same shape are mounted on two respective axes having a 90° relationship with each other on the first main surface 2-1 of the supporting substrate 2, whereby a vibratory gyrosensor 1 for obtaining detection signals of two axes is manufactured.

[Adjustment Step]

In the vibration-element forming process, the vibrator portion 23 of each vibration element 20 is cut out precisely from the silicon substrate 21 by etching using inductively coupled plasma, as described above. However, it may be difficult to form every one of the vibrator portions 23 symmetrically with respect to an emission center line of the plasma depending on conditions, such as a material yield rate. In that case, the shape of the vibrator portions 23 may vary due to, for example, positional misalignment of the vibration elements 20 or other process conditions. For example, if a vibrator portion 23 of a vibration element 20 is trapezoid shaped or parallelogram shaped in cross section unlike a proper vibrator portion 23 having a normal rectangular shape in cross section, the vibrator portion 23 will not vibrate vertically, but will instead vibrate in a state where the vibrator portion 23 is inclined towards its side with the smaller mass with respect to its central axis line.

Thus, an adjustment step is performed in which a predetermined section of each vibrator portion 23 is laser-machined to grind the side thereof with the larger mass so as to correct the vibrational state. In the adjustment step, since it is difficult to directly visually inspect the cross-sectional shape of each vibrator portion 23 having small dimensions, the vibrator portion 23 of each of the cut vibration elements 20 is vibrated at a predetermined vertical resonant frequency to compare the magnitudes of left and right detection signals, thereby checking for unbalance in the cross-sectional shape of the vibrator portion 23. In the adjustment step, if there is a difference between the left and right detection signals, the side of the vibrator portion 23 that outputs a detection signal with a smaller magnitude is partially ground.

Figure 39A:
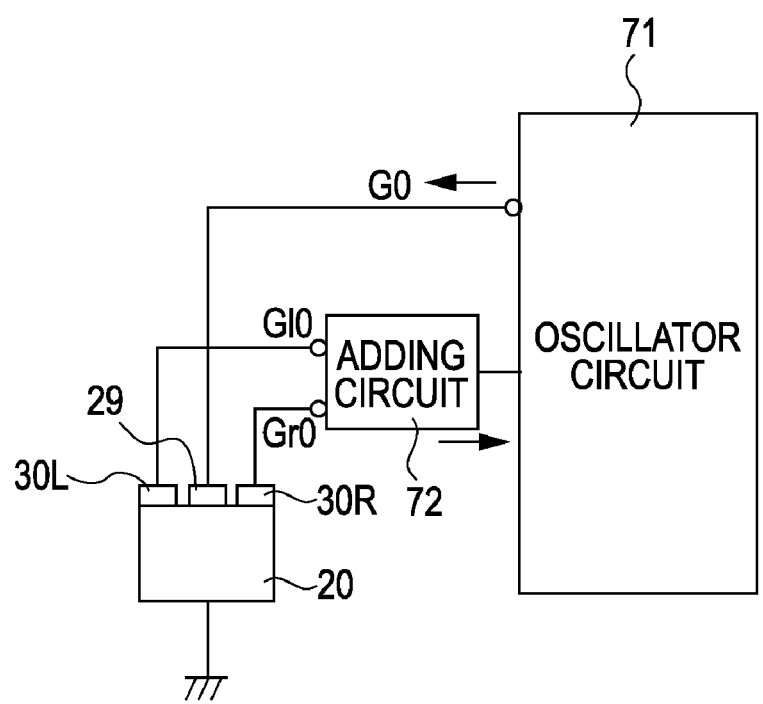
FIG. 39A illustrates an adjustment step performed on the vibration element.

Referring to FIG. 39A, when the adjustment step is to be performed on the subject vibration element 20, for example, an oscillation output G0 from an oscillator circuit 71 is applied to the drive electrode layer 29 before the adjustment so as to drive the vibration element 20 in a vertical resonance mode. In the adjustment step, detection signals Gl0, Gr0 output from the pair of detection electrodes 30L, 30R are combined by an adding circuit 72, and the combined signal is sent back to the oscillator circuit 71. Based on the detection signals Gl0, Gr0 from the pair of detection electrodes 30L, 30R, the oscillation frequency of the oscillator circuit 71 is measured as a vertical resonant frequency f0, and a difference between the detection signals Gl0, Gr0 is measured as a differential signal.

Figure 39B:
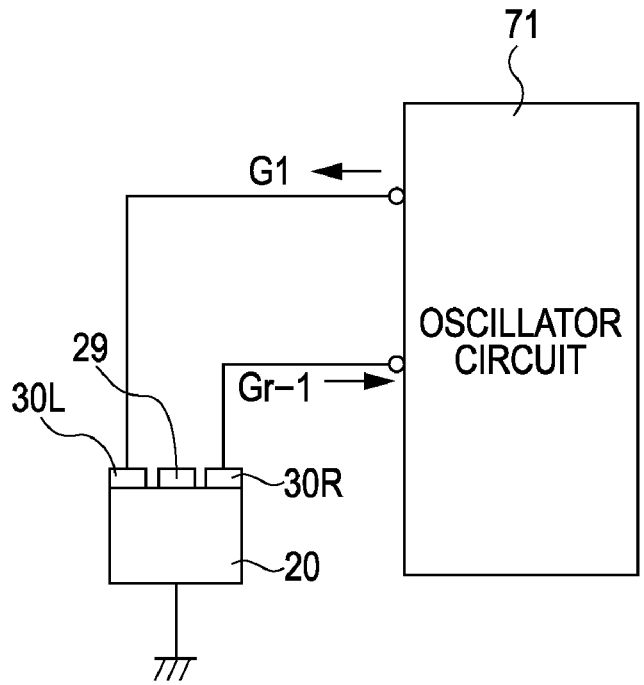
FIG. 39B illustrates the adjustment step performed on the vibration element.

Referring to FIG. 39B, in the adjustment step, an oscillation output G1 from the oscillator circuit 71 is applied to the detection electrode 30L so as to drive the vibration element 20 in a horizontal resonance mode. In the adjustment step, a detection signal Gr-1 from the detection electrode 30R is sent back to the oscillator circuit 71, and the oscillation frequency of the oscillator circuit 71 is measured as a horizontal resonant frequency f1 based on the detection signal Gr-1. Since the horizontal resonant frequency f1 obtained from the detection signal Gr-1 is equal to a horizontal resonant frequency f2 obtained from a detection signal Gl-1, the horizontal resonant frequency may be measured by connecting to either one of the detection electrodes 30L, 30R.

Figure 39C:
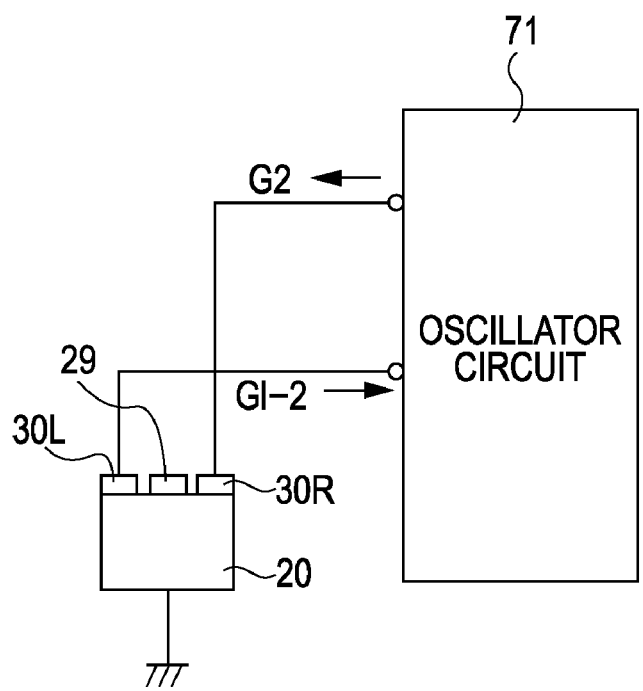
FIG. 39C illustrates the adjustment step performed on the vibration element.

Furthermore, referring to FIG. 39C, in the adjustment step, an oscillation output G2 from the oscillator circuit is applied to the detection electrode 30R so as to drive the vibration element 20 in a horizontal resonant mode. In the adjustment step, a detection signal Gl-2 output from the detection electrode 30L is sent back to the oscillator circuit 71, and the oscillation frequency of the oscillator circuit 71 is measured as a horizontal resonant frequency f2 based on the detection signal Gl-2. In the adjustment step, the differences between the vertical resonant frequency f0 and the horizontal resonant frequencies f1, f2 obtained from the above-described measurements are used as degrees of detuning, and it is determined whether the degrees of detuning are within a predetermined range. Moreover, in the adjustment step, it is also determined whether the differential signal detected from the detection electrodes 30L, 30R is within a predetermined range.

In the adjustment step, based on the determination results of the degrees of detuning and the differential signal, an adjustment machining position on the vibrator portion 23 is determined from the magnitudes thereof, and the vibrator portion 23 is partially ground by means of laser irradiation. The adjustment step is performed by means of the same measurements and laser machining as above until the degrees of detuning and the differential signal reach the target values.

In the adjustment step, a laser device with a controllable spot diameter that emits laser at a wavelength of 532 nm is used. In the adjustment step, for example, the edges between the side surfaces and the first main surface 23-1 of the vibrator portion 23 of each vibration element 20 are adjusted by emitting laser towards appropriate positions in the longitudinal direction thereof. In each vibration element 20, the amount of change in both frequency difference and detection signal balance due to laser irradiation adjustment decreases from the base end towards the tip end of the vibrator portion 23. Consequently, the base end side of the vibrator portion 23 may be roughly adjusted, whereas the tip end side thereof may be finely adjusted.

Since the adjustment step is implemented in a state where the vibration elements 20 are mounted on the supporting substrate 2, it is not necessary to perform a readjustment step after the mounting step if the adjustment is performed in a pre-mounted state. Consequently, the productivity of the vibratory gyrosensor 1 can be increased. In this case, a region to be irradiated with the adjustment laser is on the top surface 23-2 of each vibrator portion 23, whereby excellent adjustment workability is achieved after the mounting step. Since a piezoelectric layer and electrode layers are not formed on the top surface 23-2 of the vibrator portion 23, adverse effects thereon can be prevented to a maximum extent, such adverse effects including, for example, a change in the polarization state and a change in the characteristics of the piezoelectric thin film layer 28 caused by heat generated due to laser machining.

In the vibratory gyrosensor 1, when an alternating voltage at a predetermined frequency is applied to the drive electrode layer 29 of each vibration element 20 from the corresponding driving detection circuit unit 50, the vibrator portion 23 vibrates at a natural frequency. The vibrator portion 23 resonates at a vertical resonant frequency in the vertical direction, which is the thickness direction thereof, and also resonates at a horizontal resonant frequency in the horizontal direction, which is the width direction thereof. The sensitivity characteristics of the vibration element 20 increase as a difference between the vertical resonant frequency and the horizontal resonant frequency, which corresponds to the degree of detuning, decreases. As described above, by forming the periphery of the vibrator portion 23 precisely by crystal anisotropic etching or reactive ion etching, a satisfactory degree of detuning is attained in the vibratory gyrosensor 1.

In each vibration element 20, the vertical resonant frequency characteristics are significantly affected by the degree of precision in the length t5 of the vibrator portion 23. At the root section 43 that determines the length t5 of the vibrator portion 23 in each vibration element 20, if misalignment occurs among the (100) surface of the diaphragm portion 38 formed by crystal anisotropic etching, the (111) surfaces corresponding to the etched slopes 133 inclined at an angle of 55°, and the boundary line corresponding to the flat surface, the degree of detuning will unfavorably increase in accordance with the amount of misalignment.

In other words, in each vibration element 20, the amount of misalignment is caused by a positional misalignment between the resist film pattern formed on the silicon oxide film 33B by crystal anisotropic etching and the resist film pattern formed by reactive ion etching. Thus, each vibration element 20 may be positioned using, for example, a dual-side aligner that allows both the first and second main surfaces 21-1, 21-2 of the silicon substrate 21 to be observed simultaneously in the course of the abovementioned steps. Alternatively, appropriate positioning patterns or marks may be formed on the first main surface 21-1 or the second main surface 21-2 of the silicon substrate 21 so that each vibration element 20 can be positioned using an alignment device that positionally aligns the other main surface on the basis of these patterns or marks. This positioning technique may also be adopted to the mounting step for mounting the vibration elements 20 to the supporting substrate 2.

If the amount of misalignment in each vibration element is smaller than about 30 μm, the vertical resonant frequency and the horizontal resonant frequency are substantially equal to each other. Accordingly, performing the etching processes with substantially high precision for each vibration element 20 can substantially lower the degree-of-detuning characteristics, which are due to the amount of misalignment, whereby the vibration element 20 can be formed without requiring the abovementioned alignment device.

[Effect of Bump Junction]

For each vibration element 20, a Q value is determined on the basis of its securing technique with respect to the supporting substrate 2 and the material used. As described above, in the vibratory gyrosensor 1, each vibration element is mounted on the supporting substrate 2 by means of the plurality of gold bumps 26 having a predetermined height provided in the base portion 22. Thus, the vibrator portion vibrates stably with high sensitivity while a high Q value is attained.

An effect of Q-value characteristics according to the securing technique for securing the vibration elements 20 to the supporting substrate 2 in the vibratory gyrosensor 1 is analyzed using a finite-element method (FEM). In this analysis, each of the vibrator portions 23 is formed of a silicon material and a gold bonding layer (gold bumps 26) is used for securing to the supporting substrate 2. In this case, changes in characteristics due to different securing techniques were analyzed by calculating the amount of displacement at the tip end of the vibrator portion 23, which is dependent upon a damping effect of the secured portion (in this example, an amount of displacement (μmpp) between an upper amplitude peak and a lower amplitude peak). Reference values of silicon material-damping β=3.54×10$^{-8}$ and gold-bonding-layer material-damping β=3.54×10$^{-8}$ were used as parameters for substitution.

Figure 40:
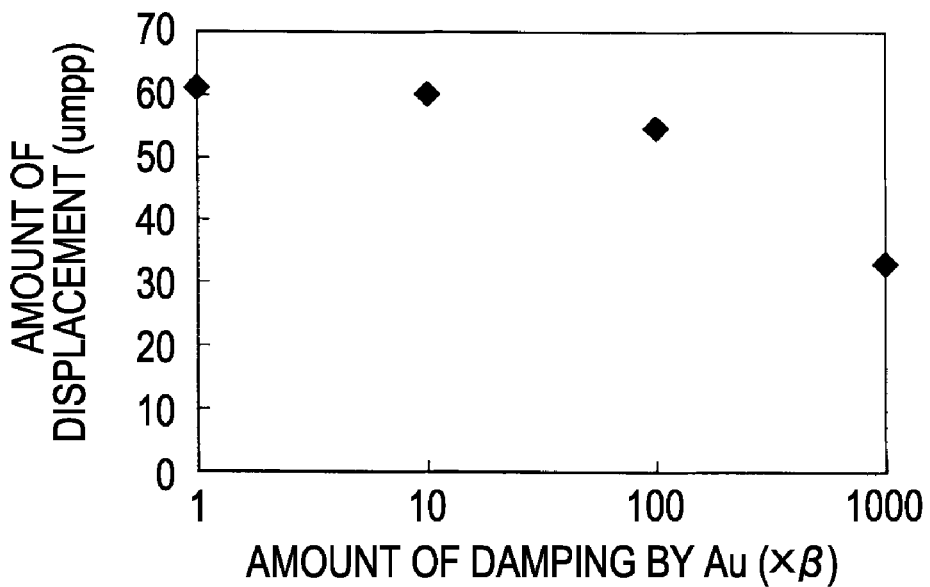
FIG. 40 is an FEM analysis diagram of securing techniques for each vibration element on the supporting substrate, and is also a characteristic diagram illustrating the relationship between the amount of damping by gold bumps and the amount of displacement of the vibrator portion.

A first analysis was implemented in a state where the entire surface of the base portion 22 of the vibration element 20 is joined to the supporting substrate 2 with the gold bonding layer therebetween. From the first analysis, fluctuation results of the amount of displacement of the vibrator portion 23 were obtained as shown in FIG. 40. It is evident from the drawing that, in each vibration element 20, the displacement at the tip end of the vibrator portion 23 is gradually dampened as the amount of damping by Au increases.

Figure 41A:
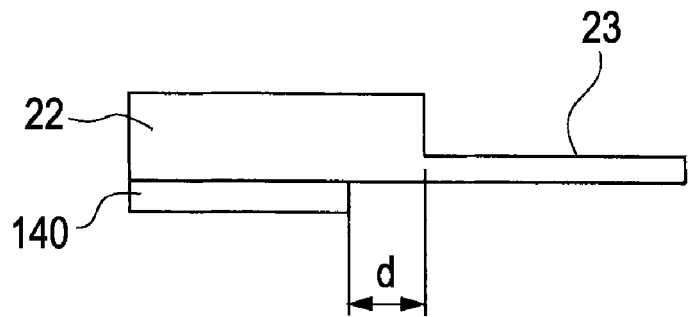
FIG. 41A is an analysis model diagram and a characteristic diagram illustrating the relationship between the width of a non-junction section and the displacement-damping rate of the vibrator portion.
Figure 41B:
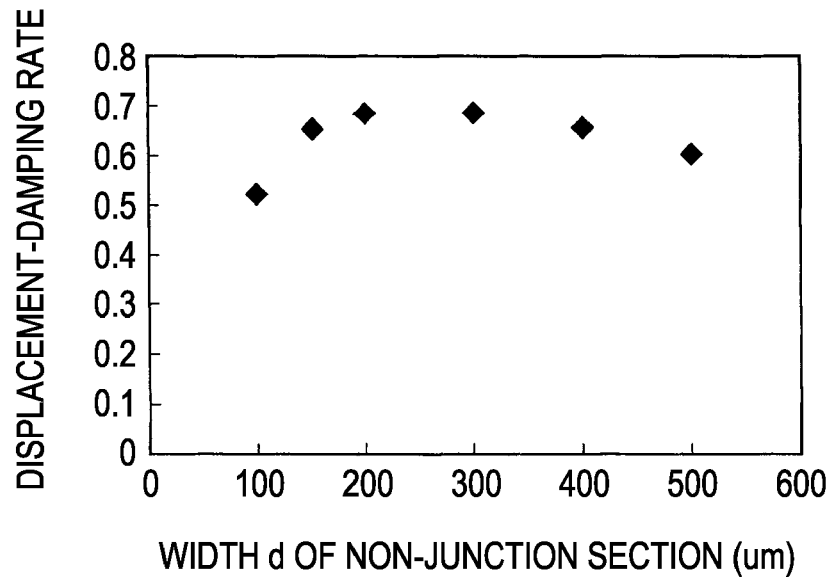
FIG. 41B is an analysis model diagram and a characteristic diagram illustrating the relationship between the width of the non-junction section and the displacement-damping rate of the vibrator portion.

Furthermore, a second analysis was implemented in a state where the base portion 22 of the vibration element 20 is joined to the supporting substrate 2 with a gold bonding layer 140 therebetween. Specifically, referring to FIG. 41A, in the second analysis, changes in the displacement-damping rate of the vibrator portion 23 were analyzed in accordance with different widths d of a non-junction section located at the base end of the vibrator portion 23. The results obtained are shown in FIG. 41B. It is evident from FIG. 41B that, in each vibration element 20, the displacement-damping rate increases within a range in which the width of the non-junction section of the gold bonding layer 140 is between 200 μm and 300 μm. The term "displacement-damping rate" refers to a value corresponding to a mechanical quality coefficient Q value of the vibrator portion. The rate increases with increasing numerical value, and the vibrator portion vibrates with high intensity at a specific frequency. The term is used below with the same meaning.

Figure 42A:
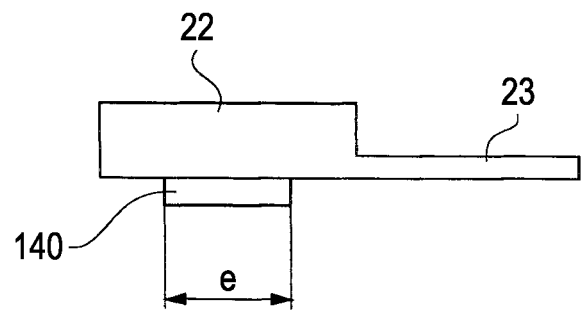
FIG. 42A is an analysis model diagram and a characteristic diagram illustrating the relationship between the width of a gold bonding layer and the displacement-damping rate of the vibrator portion.
Figure 42B:
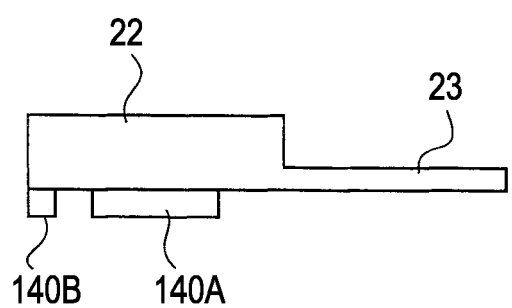
FIG. 42B is an analysis model diagram and a characteristic diagram illustrating the relationship between the width of the gold bonding layer and the displacement-damping rate of the vibrator portion.
Figure 42C:
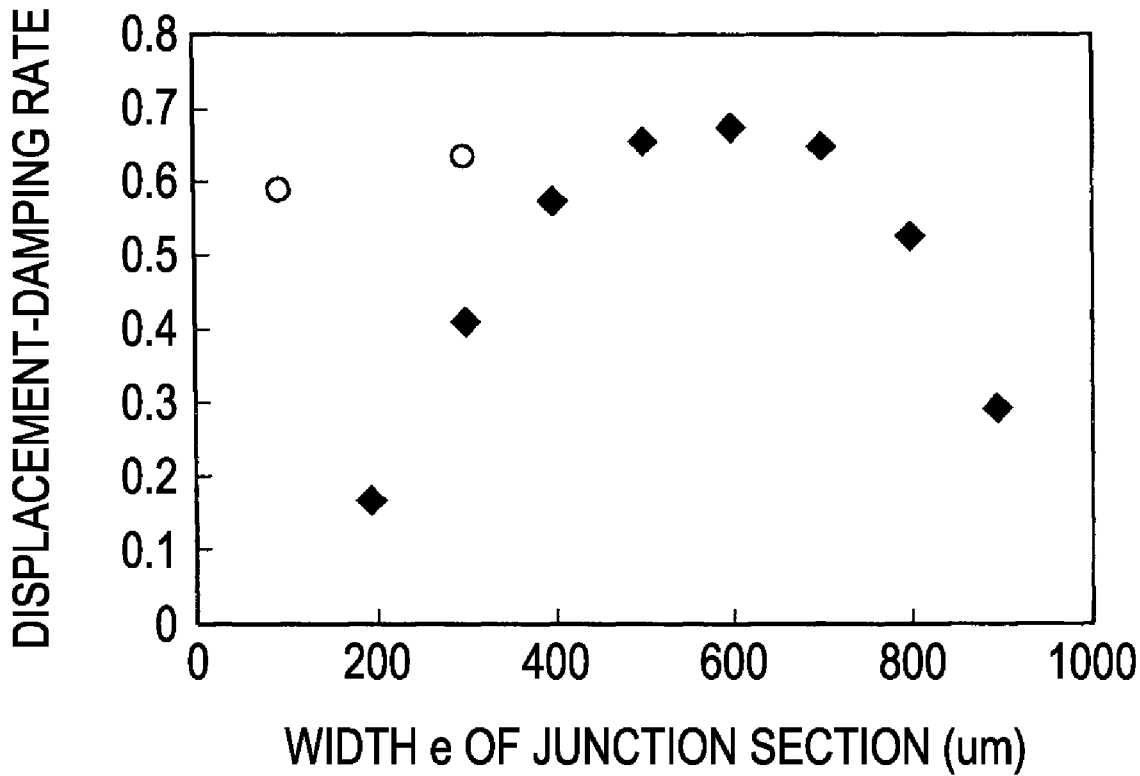
FIG. 42C is an analysis model diagram and a characteristic diagram illustrating the relationship between the width of the gold bonding layer and the displacement-damping rate of the vibrator portion.

Furthermore, a third analysis was implemented in a state where the base portion 22 of the vibration element 20 is joined to the supporting substrate 2 with the gold bonding layer 140 therebetween. Specifically, referring to FIG. 42A, in the third analysis, changes in the displacement-damping rate of the vibrator portion 23 were analyzed in accordance with different widths e of the gold bonding layer 140. The results obtained are shown in FIG. 42C. Moreover, in the third analysis, another analysis was implemented in a state where the base portion 22 of the vibration element 20 is joined to the supporting substrate 2 with a first gold bonding-layer component 140A and a second gold bonding-layer component 140B therebetween, as shown in FIG. 42B.

In FIG. 42C, the analysis results of the displacement-damping rate of the vibrator portion 23, which is dependent upon the width e of one gold bonding layer 140, are indicated by black square dots, whereas the analysis results corresponding to a case where the second gold bonding-layer component 140B is additionally provided are indicated by white circle dots. In each vibration element 20, the damping rate increases within a range in which the width e of the gold bonding layer 140 is between 500 μm to 700 μm. Furthermore, by securing the vibration element 20 at two sections, a large damping rate can be attained even when the width e of the gold bonding layer 140 is small.

Figure 43A:
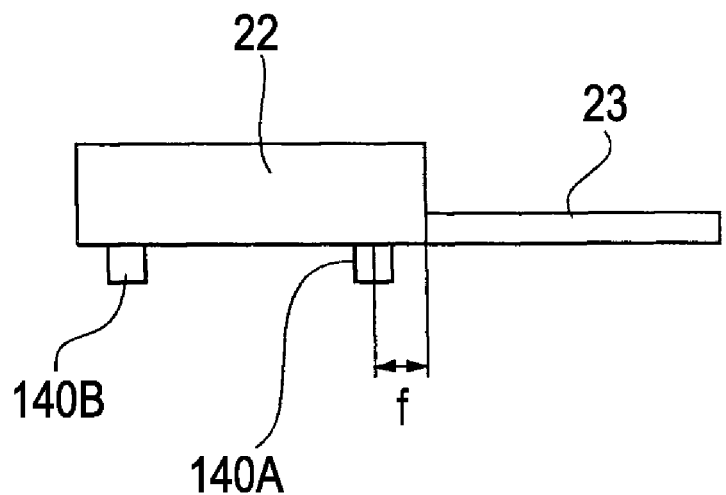
FIG. 43A is an analysis model diagram and a characteristic diagram illustrating the relationship between the securing position of a gold bonding layer component disposed proximate to the vibrator portion and the displacement-damping rate of the vibrator portion.
Figure 43B:
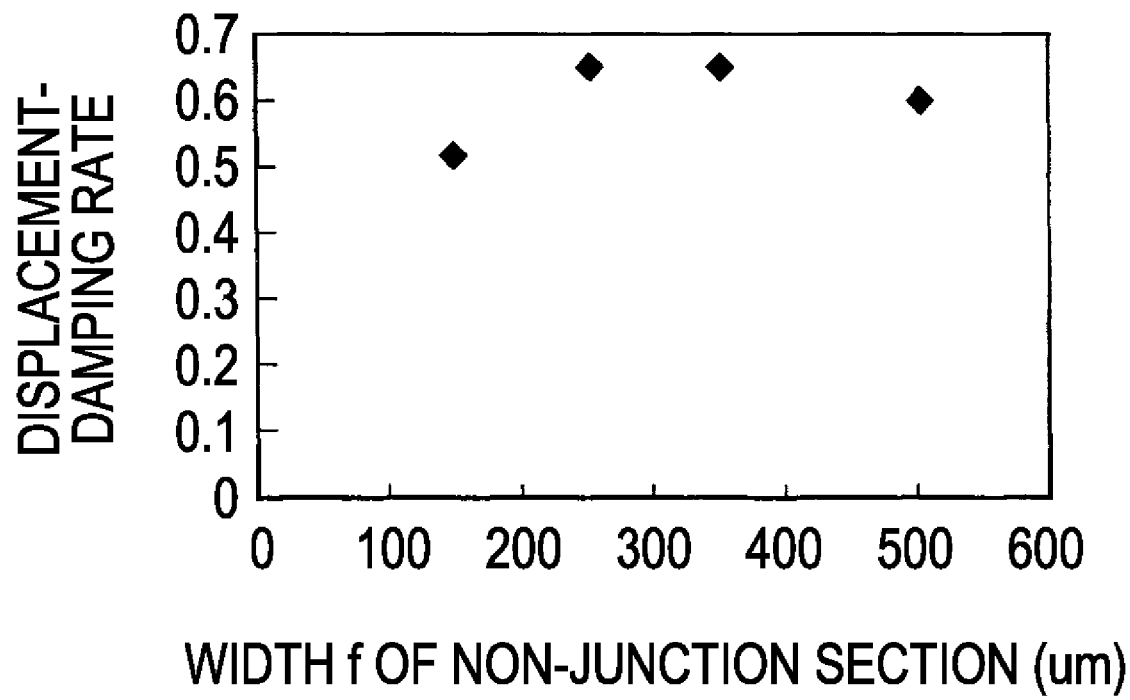
FIG. 43B is an analysis model diagram and a characteristic diagram illustrating the relationship between the securing position of the gold bonding layer component disposed proximate to the vibrator portion and the displacement-damping rate of the vibrator portion.

According to the results of the first to third analyses, in each vibration element 20, the base portion 22 has better characteristics when the base portion 22 is jointed at two sections by means of the first gold bonding-layer component 140A and the second gold bonding-layer component 140B rather than when the base portion 22 is entirely joined to the supporting substrate 2 with the gold bonding layer 140 therebetween. Based on these analysis results, a fourth analysis was implemented in a state where the base portion 22 is joined to the supporting substrate 2 at two sections by means of the first gold bonding-layer component 140A and the second gold bonding-layer component 140B, as shown in FIG. 43A. Similar to the second analysis, a width f of the non-junction section located at the base end of the vibrator portion 23 is used as a parameter for analyzing changes in the displacement-damping rate of the vibrator portion 23 so as to determine an optimal position of the first gold bonding-layer component 140A. FIG. 43B shows analysis results for each vibration element 20, which show that the optimal position of the first gold bonding-layer component 140A from the root section of the vibrator portion 23 is attained by securing the base portion 22 while setting the width f of the non-junction section to substantially 250 μm.

Figure 44A:
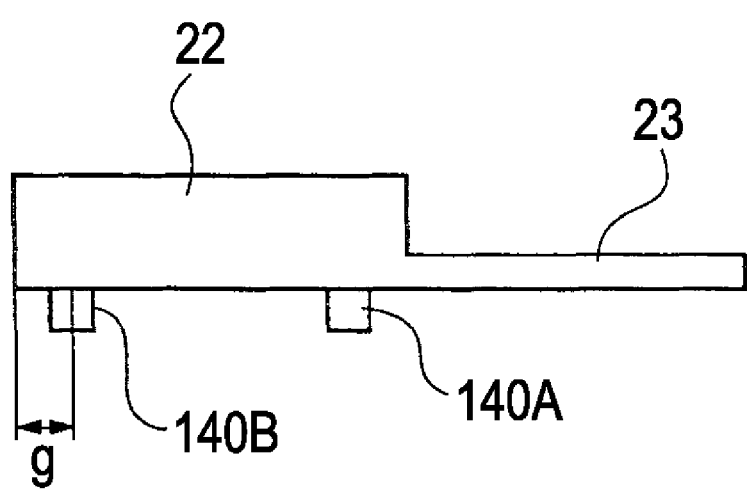
FIG. 44A is an analysis model diagram and a characteristic diagram illustrating the relationship between the securing position of a gold bonding layer component disposed proximate to a rear end of the base portion and the displacement-damping rate of the vibrator portion.
Figure 44B:
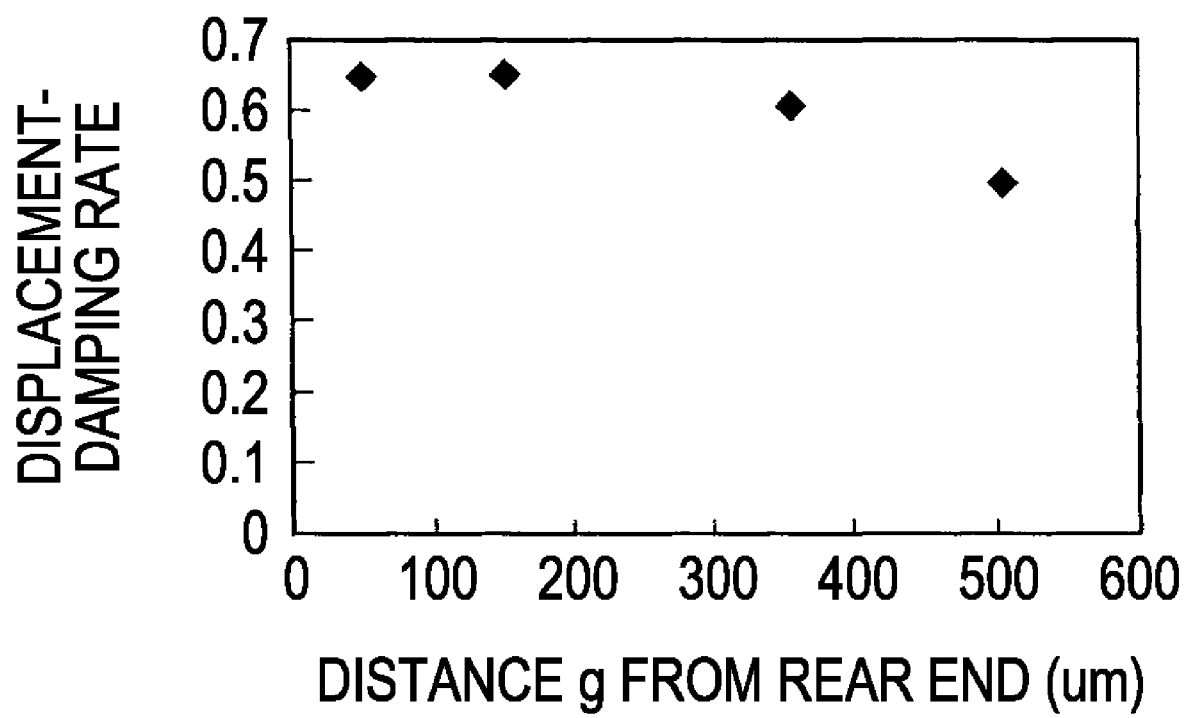
FIG. 44B is an analysis model diagram and a characteristic diagram illustrating the relationship between the securing position of the gold bonding layer component disposed proximate to the rear end of the base portion and the displacement-damping rate of the vibrator portion.

In contrast to the fourth analysis, a fifth analysis is for analyzing an optimal position of the second gold bonding-layer component 140B while the base portion 22 is joined to the supporting substrate 2 at two sections by means of the first gold bonding-layer component 140A and the second gold bonding-layer component 140B, as shown in FIG. 44A. In each vibration element 20, the first gold bonding-layer component 140A is secured to the base portion 22 at an optimal position of 250 μm from the root section of the vibrator portion 23. For the second gold bonding-layer component 140B, an optimal position is determined by analyzing changes in the displacement-damping rate of the vibrator portion 23 with a distance g from the rear end of the base portion 22 as a parameter. As shown in FIG. 44B, in the vibration element 20, the displacement-damping rate of the vibrator portion 23 decreases as the second gold bonding-layer component 140B gradually approaches the vibrator portion 23 from the rear end of the base portion 22 opposed to the root section of the vibrator portion 23. Consequently, the analysis results show that in a case where the base portion 22 of each vibration element 20 is secured to the supporting substrate 2 at two sections with the first gold bonding-layer component 140A and the second gold bonding-layer component 140B, optimization is achieved by setting the two at a position corresponding to 250 μm from the root section of the vibrator portion 23 and at a position closer to the rear end.

Figure 45:
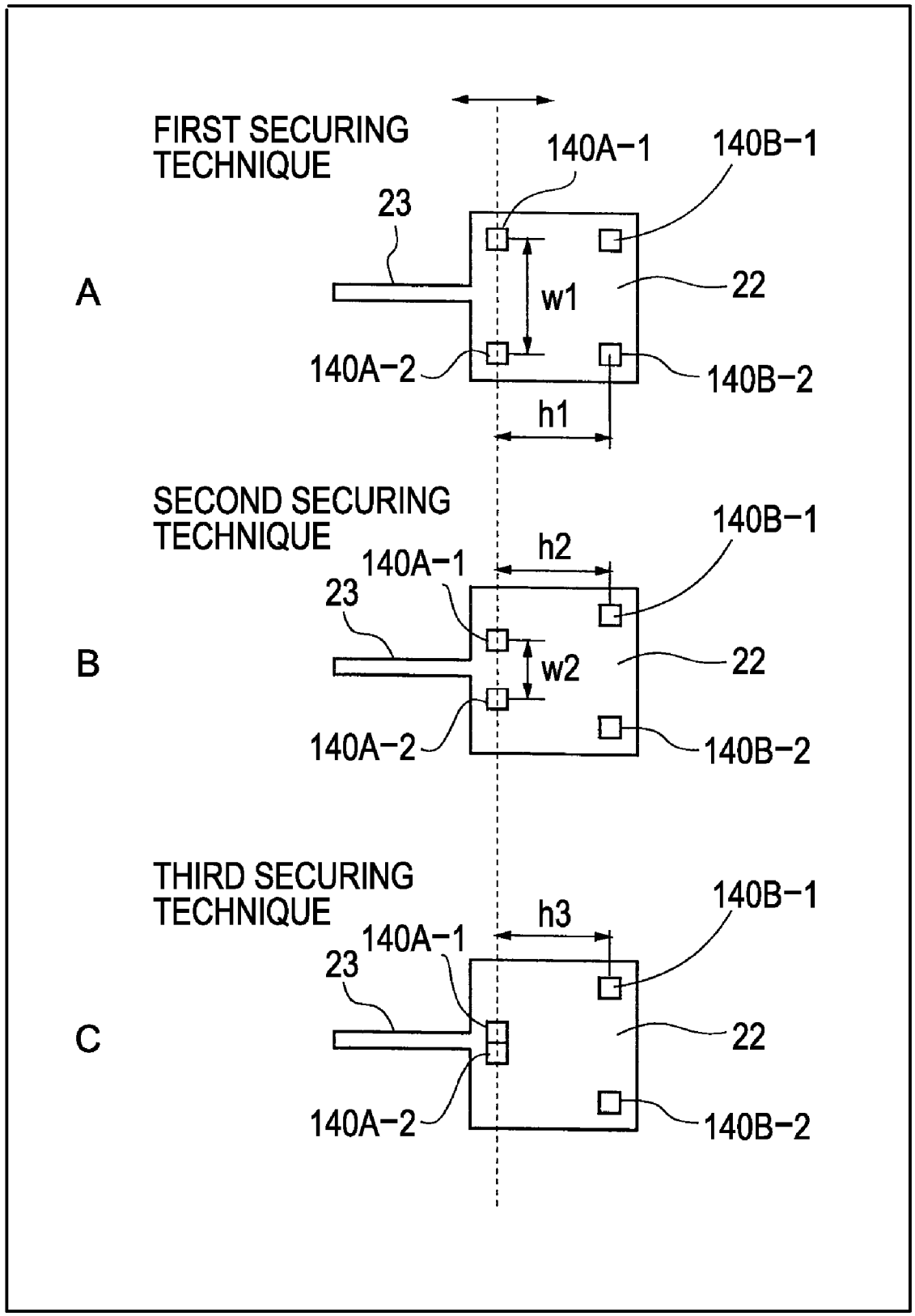
FIG. 45 includes analysis model diagrams showing arrangement examples of the gold bonding layer components in a four-point securing structure.

According to the first to fifth analyses, better Q-value characteristics are attained when the base portion 22 of each vibration element 20 is partially secured to the supporting substrate 2 rather than having its entire surface secured thereto, or more specifically, when the base portion 22 is secured at multiple sections rather than at one section. A sixth analysis was implemented in a state where the base portion 22 is secured to the supporting substrate 2 as shown in FIG. 45A. In detail, the analysis is implemented on a four-point securing structure in which the root section side of the vibrator portion 23 is secured by means of a pair of first gold bonding-layer components 140A-1, 140A-2 separated from each other in the width direction, and the rear end side of the base portion 22 is secured by means of a pair of second gold bonding-layer components 140B-1, 140B-2 separated from each other in the width direction. In the sixth analysis, the second gold bonding-layer component 140B-1, 140B-2 are secured, and a distance w between the opposing first gold bonding-layer components 140A-1, 140A-2 and a distance h between the first gold bonding-layer components 140A and the second gold bonding-layer components 140B are used as parameters for analyzing changes in the displacement-damping rate of the vibrator portion 23. Accordingly, an analysis for optimal securing positions was implemented.

With regard to the sixth analysis, FIG. 45A shows a first securing technique in which the base portion 22 is secured to the supporting substrate 2 with the opposing first gold bonding-layer components 140A-1, 140A-2 provided at opposite sides of the base portion 22 in the width direction thereof and separated from each other by a distance w1; FIG. 45B shows a second securing technique in which the base portion 22 is secured to the supporting substrate 2 with the opposing first gold bonding-layer components 140A-1, 140A-2 that are disposed close to the central position and are separated from each other by a distance w2; and FIG. 45C shows a third securing technique in which the base portion 22 is secured to the supporting substrate 2 with the opposing first gold bonding-layer components 140A-1, 140A-2 that have a distance w3=0 therebetween and are integrated at the central position, which corresponds to the vibrator portion.

Figure 46:
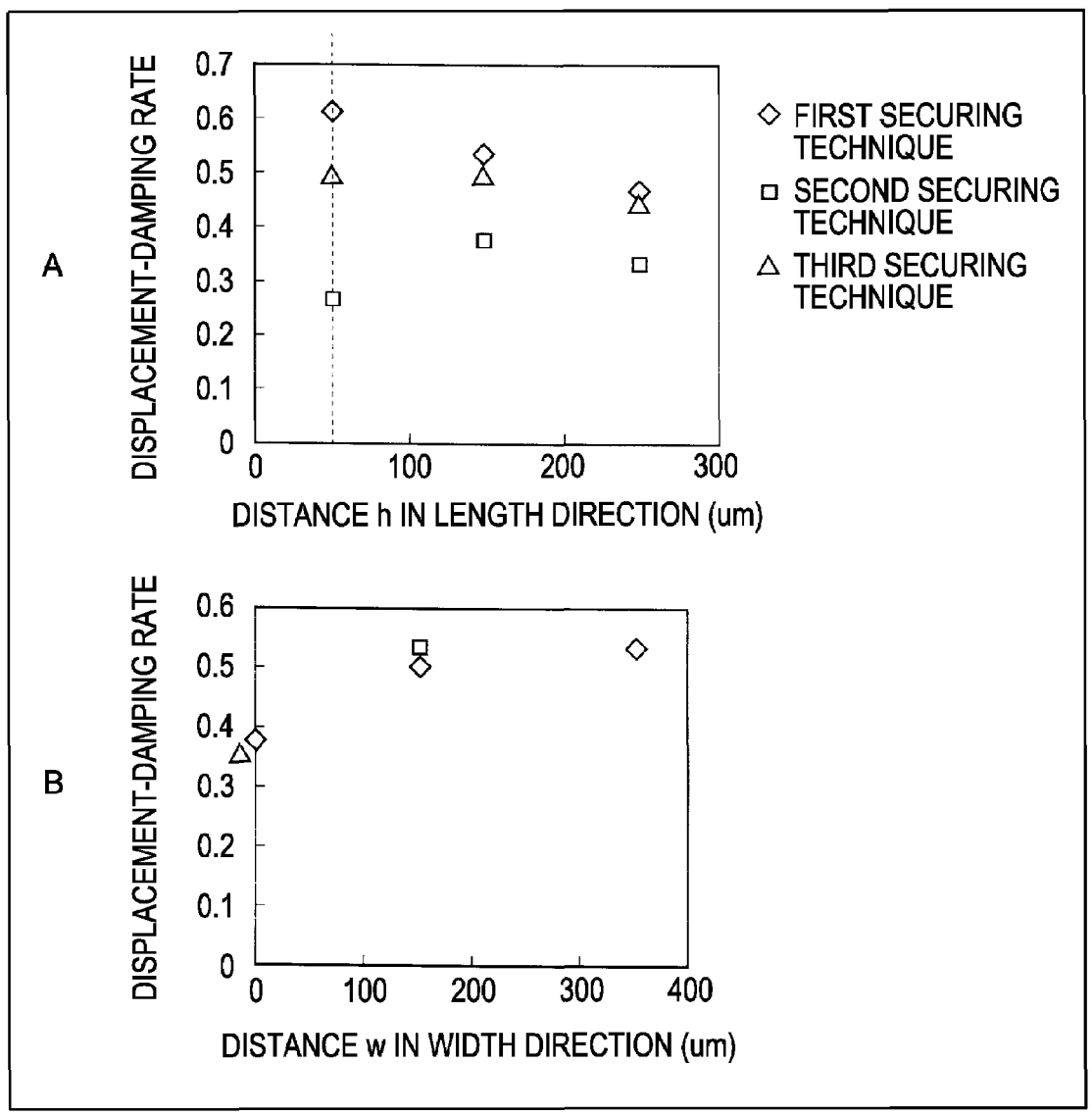
FIG. 46 includes characteristic diagrams corresponding to the model diagrams shown in FIG. 45.

FIGS. 46A and 46B show analysis results obtained, which show that optimization is achieved by adopting the securing techniques in which the base portion 22 of each vibration element 20 is secured to the supporting substrate 2 by means of the first gold bonding-layer components 140A-1, 140A-2 disposed at opposite sides of the base portion 22 in the width direction thereof at positions close to the root section of the vibrator portion 23. The vibration element 20 has maximum characteristics when the base portion 22 is secured to the supporting substrate 2 on the basis of the third securing technique.

Figure 47A:
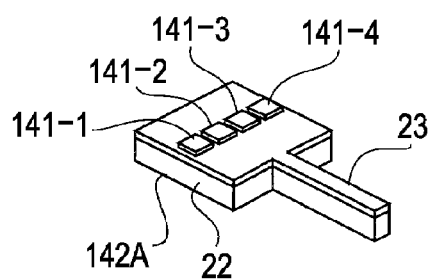
FIG. 47A is an analysis model diagram illustrating an arrangement example of gold bonding layer components in a sample vibration element that adopts a four-point securing structure.
Figure 47B:
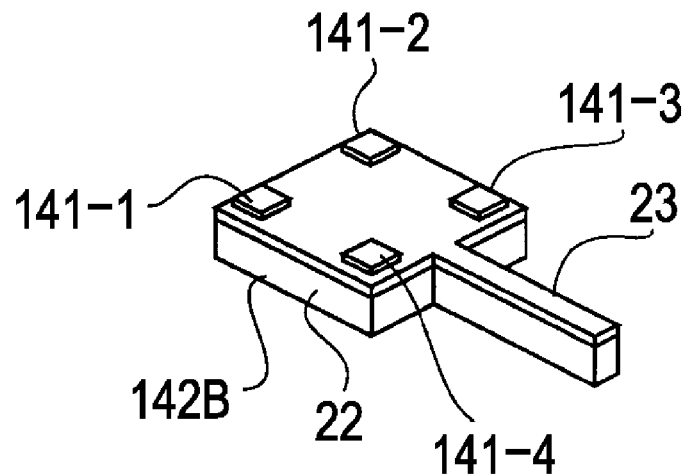
FIG. 47B is an analysis model diagram illustrating another arrangement example of gold bonding layer components in a sample vibration element that adopts a four-point securing structure.
Figure 47C:
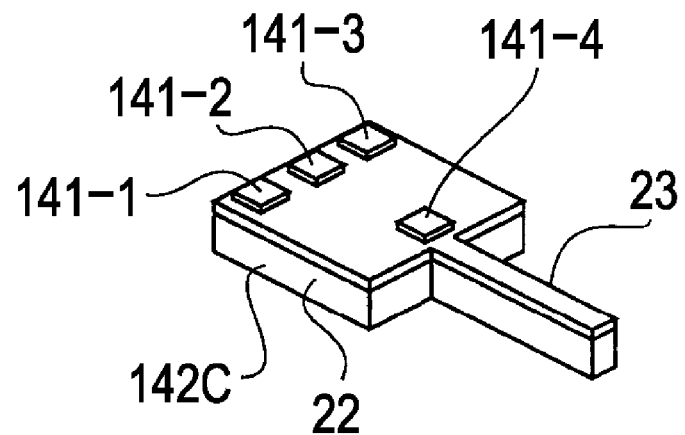
FIG. 47C is an analysis model diagram illustrating another arrangement example of gold bonding layer components in a sample vibration element that adopts a four-point securing structure.

Referring to FIG. 47A, a seventh analysis was implemented in a state where the base portion 22 is secured to the supporting substrate 2 with four gold bumps 141-1 to 141-4. In this state, FEM calculation results and measurement results were analyzed. FIG. 47A shows a first securing technique in which the four gold bumps 141-1 to 141-4 are laterally arranged in a single line extending through substantially the center of the base portion 22. FIG. 47B shows a second securing technique in which the four gold bumps 141-1 to 141-4 are respectively disposed at four corners of the base portion 22. FIG. 47C shows a third securing technique in which three gold bumps 141-1 to 141-3 are laterally arranged along the rear end side of the base portion 22 and the remaining one gold bump 141-4 is disposed at the middle of the root section of the vibrator portion 23 in the width direction thereof.

Figure 48:
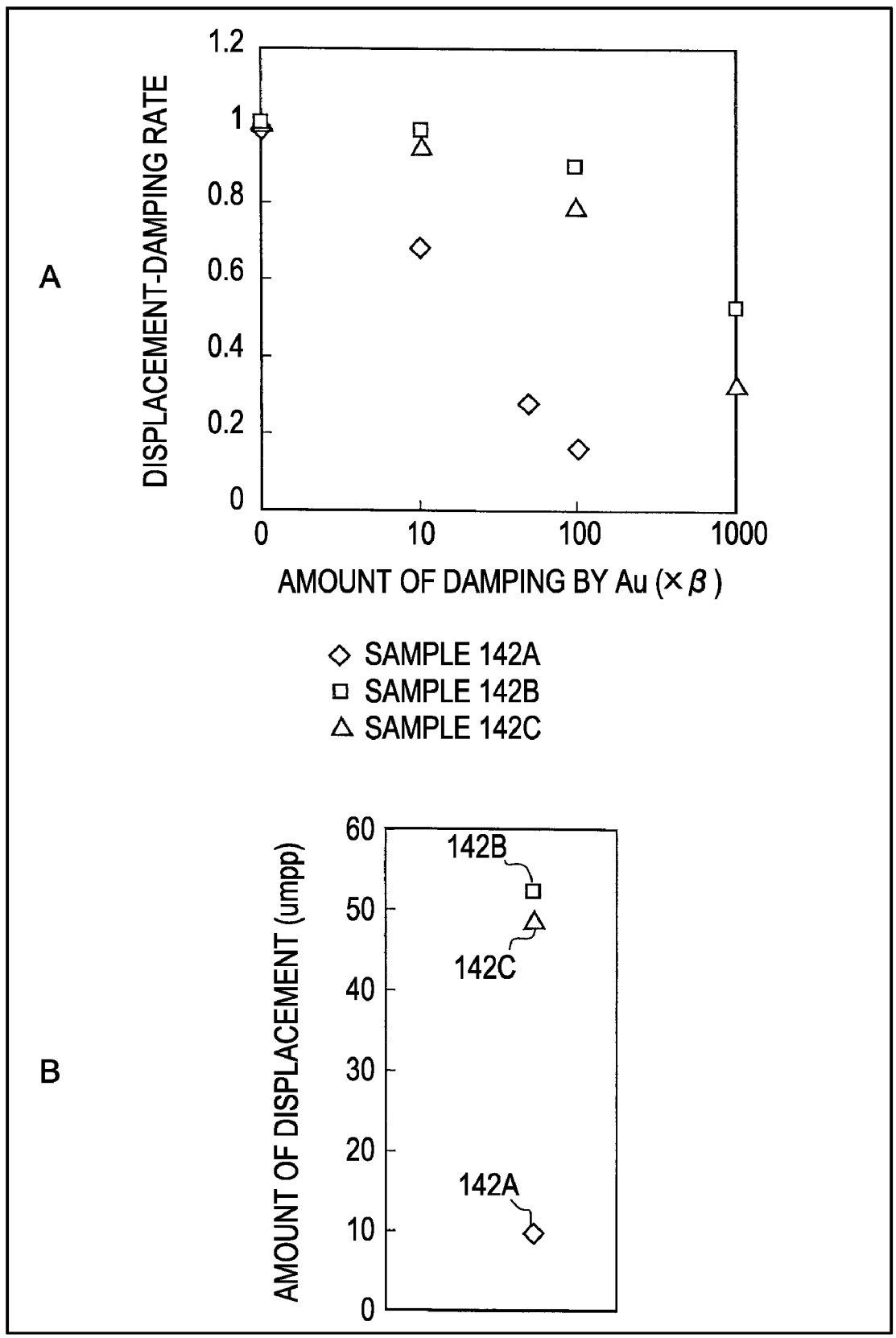
FIG. 48 includes characteristic diagrams corresponding to the model diagrams shown in FIGS. 47A to 47C.
Figure 49A:
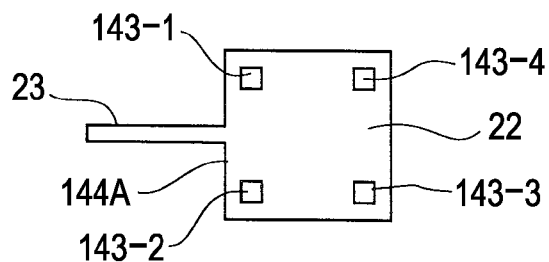
FIG. 49A is an analysis model diagram illustrating an arrangement example of gold bonding layer components in a multipoint securing structure.
Figure 49B:
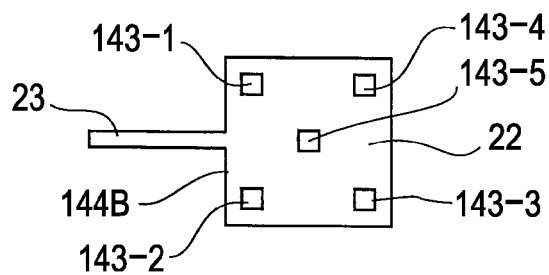
FIG. 49B is an analysis model diagram illustrating another arrangement example of gold bonding layer components in a multipoint securing structure.
Figure 49C:
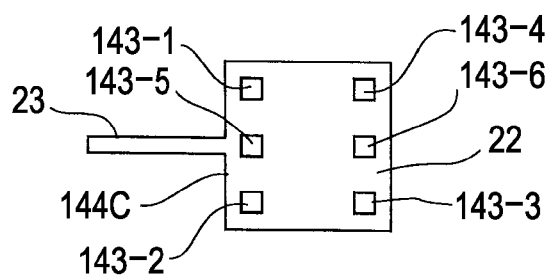
FIG. 49C is an analysis model diagram illustrating another arrangement example of gold bonding layer components in a multipoint securing structure.
Figure 49D:
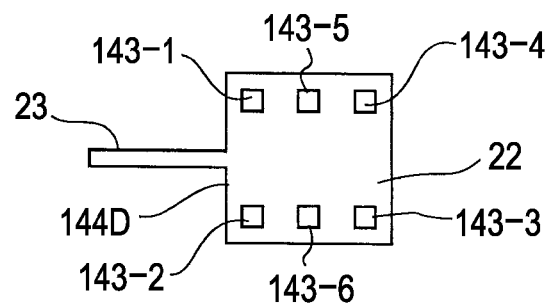
FIG. 49D is an analysis model diagram illustrating another arrangement example of gold bonding layer components in a multipoint securing structure.

FIG. 48A shows FEM calculation results in which the horizontal axis represents the amount of damping by Au, and the vertical axis represents the displacement-damping rate of the vibrator portion 23. FIG. 48B shows measurement results of displacement amounts (μmpp) of vibration elements 142A to 142C based on the various securing techniques. It is evident from FIGS. 48A and 48B that even when the Au material damping is large at the secured sections of the vibration element 20, the sample 142B in which the four corners are secured by means of the gold bumps 141-1 to 141-4 has strong damping characteristics.

Figure 50:
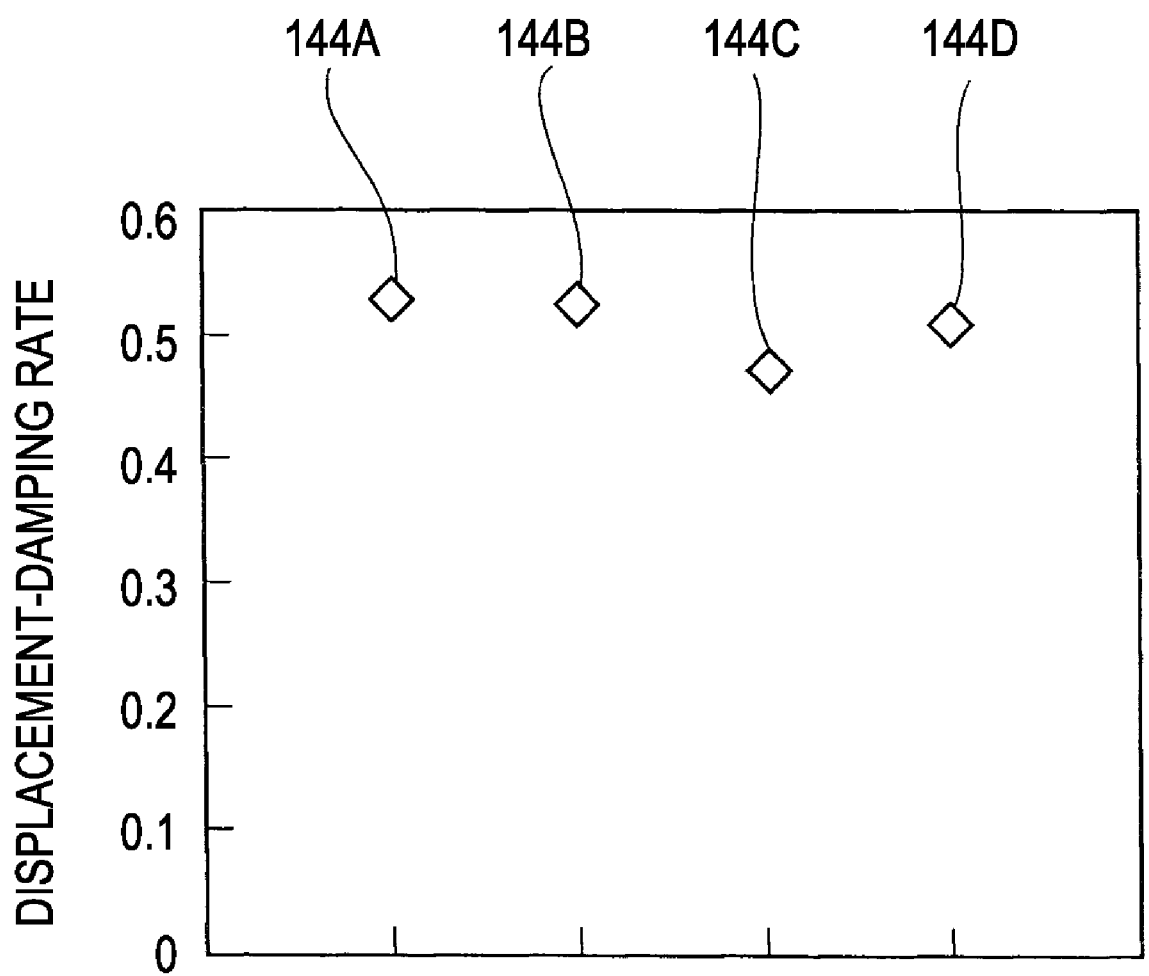
FIG. 50 is a characteristic diagram corresponding to the model diagrams shown in FIGS. 49A to 49D.

Based on the first to seventh analyses, an eighth analysis was implemented to study the advantages of securing each vibration element 20 to the supporting substrate 2 at an increased number of sections. Referring to FIG. 49A to 49D, in the eighth analysis, the displacement-damping rate of the vibrator portion 23 was analyzed for each of first sample vibration element 144A to fourth sample vibration element 144D, each having a different number of gold bumps 143 in the base portion 22. FIG. 50 shows the results obtained.

The first sample vibration element 144A has four gold bumps 143-1 to 143-4 disposed at the four corners of the base portion 22. The second sample vibration element 144B has a total of five gold bumps 143-1 to 143-5, four of the gold bumps 143-1 to 143-4 being disposed at the four corners of the base portion 22 and one gold bump 143-5 being disposed in the center. The third sample vibration element 144C has a total of six gold bumps 143-1 to 143-6, four of the gold bumps 143-1 to 143-4 being disposed at the four corners of the base portion 22 and two being disposed on the extension of the vibrator portion 23 and in the middle between the gold bumps 143 on the opposite sides. Thus, three gold bumps are arranged laterally on each side of the base portion 22. The fourth sample vibration element 144D has a total of six gold bumps 143-1 to 143-6, three of which being arranged longitudinally on each side of the base portion 22 in the width direction thereof.

As shown in FIG. 50, there are no significant differences in the displacement-damping rate of the vibrator portion 23 among the first sample vibration element 144A to fourth sample vibration element 144D described above. Consequently, the analysis results show that securing the base portion 22 of the vibration element 20 to the supporting substrate 2 at many sections will not contribute to a significant improvement in the characteristics.

[Effect of Load Buffering Grooves]

As described above, in the vibratory gyrosensor 1, 170, an external-load buffering structure defined by the first load buffering grooves 12, 172 and the second load buffering grooves 14 is provided in the supporting substrate 2, 171 so that the vibration elements 20 can perform a stable detecting operation for angular velocity. In the vibratory gyrosensor 1, since an angular direction of vibration indicates whether an output signal is greater or smaller than a reference value, an offset voltage is preliminarily applied to the output signal.

Figure 51:
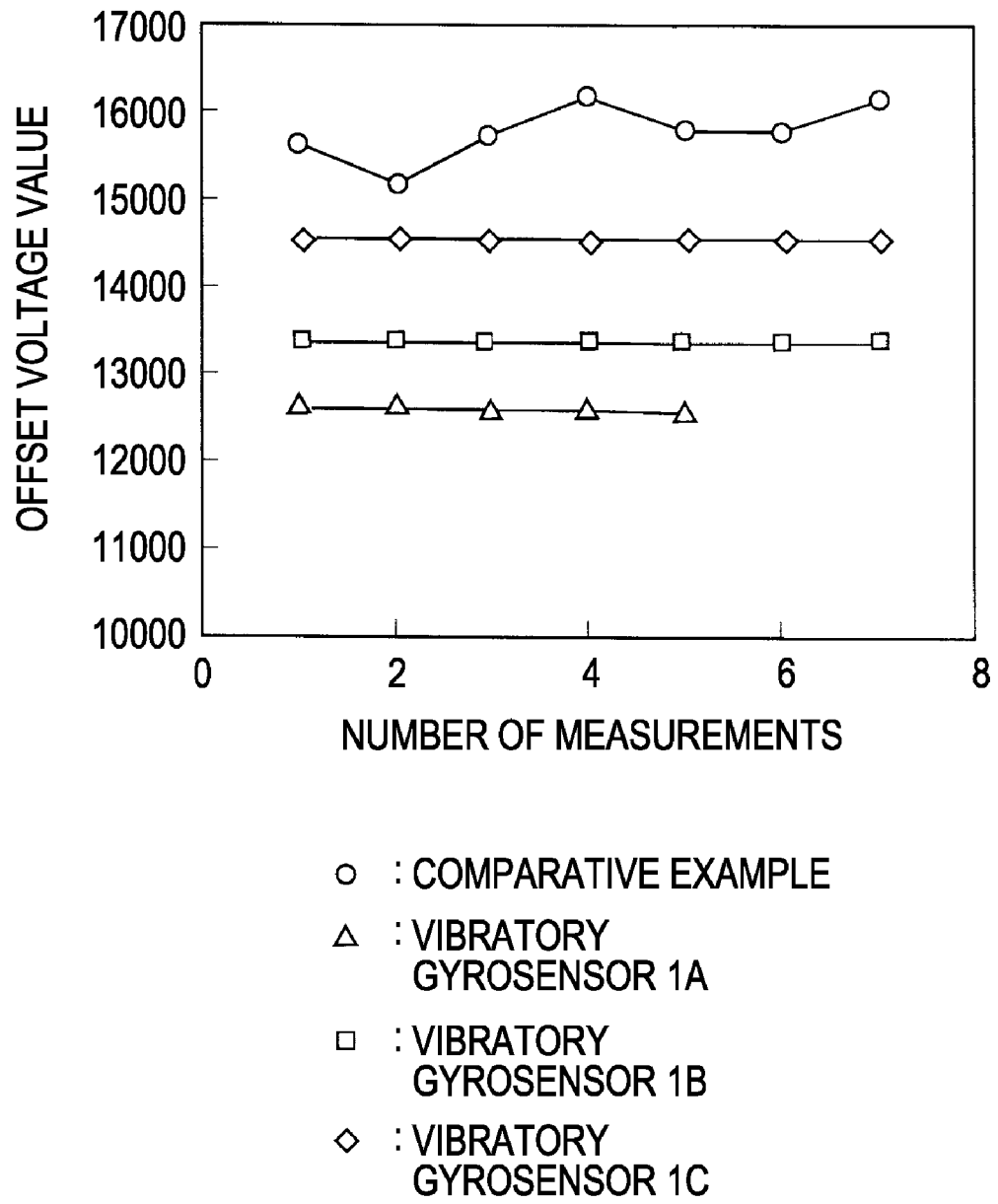
FIG. 51 is a characteristic diagram illustrating the effect of the load buffering grooves for suppressing fluctuation in offset voltage values.

FIG. 51 is a graph illustrating measurement results of fluctuation of output voltage with regard to the effects of the buffering structure described above. The graph proves that the smaller the fluctuation, the more stable the vibratory gyrosensor 1 can perform a detecting operation. In the graph, the vertical axis represents offset voltage values (×10E−4V), and the horizontal axis represents the number of measurements. A fluctuation state indicated by circle dots corresponds to a comparison example in which a vibratory gyrosensor has vibration elements 20 mounted on a supporting substrate 2 without the first load buffering grooves 12 and the second load buffering grooves 14.

On the other hand, triangular dots are results corresponding to a vibratory gyrosensor 1A having only the frame-like first load buffering grooves 12 in the supporting substrate 2. Square dots are results corresponding to a vibratory gyrosensor 1B having the terminals 25 mounted to the separate mounting subsections 174 defined by the first load buffering grooves 172 and the partitioning grooves 173. Diamond dots are results corresponding to a vibratory gyrosensor 1C having the second load buffering grooves 14 provided in the second main surface 2-2 of the supporting substrate 2.

As is evident from FIG. 51, in the vibratory gyrosensor of the comparative example, the offset voltage value fluctuates significantly with every measurement. The external load has an adverse effect on the detecting operation of the vibration elements 20 and thus deteriorates the detection accuracy. On the other hand, in the vibratory gyrosensor 1A to 1C having the first load buffering grooves 12 or the second load buffering grooves 14 in the supporting substrate 2, there is substantially no fluctuation in the offset voltage value, which implies that stable characteristics are attained. Similarly, in a vibratory gyrosensor having the first load buffering grooves 12 and the second load buffering grooves 14, there is substantially no fluctuation in the offset voltage value, which obviously means that stable characteristics are attained.

Figure 52:
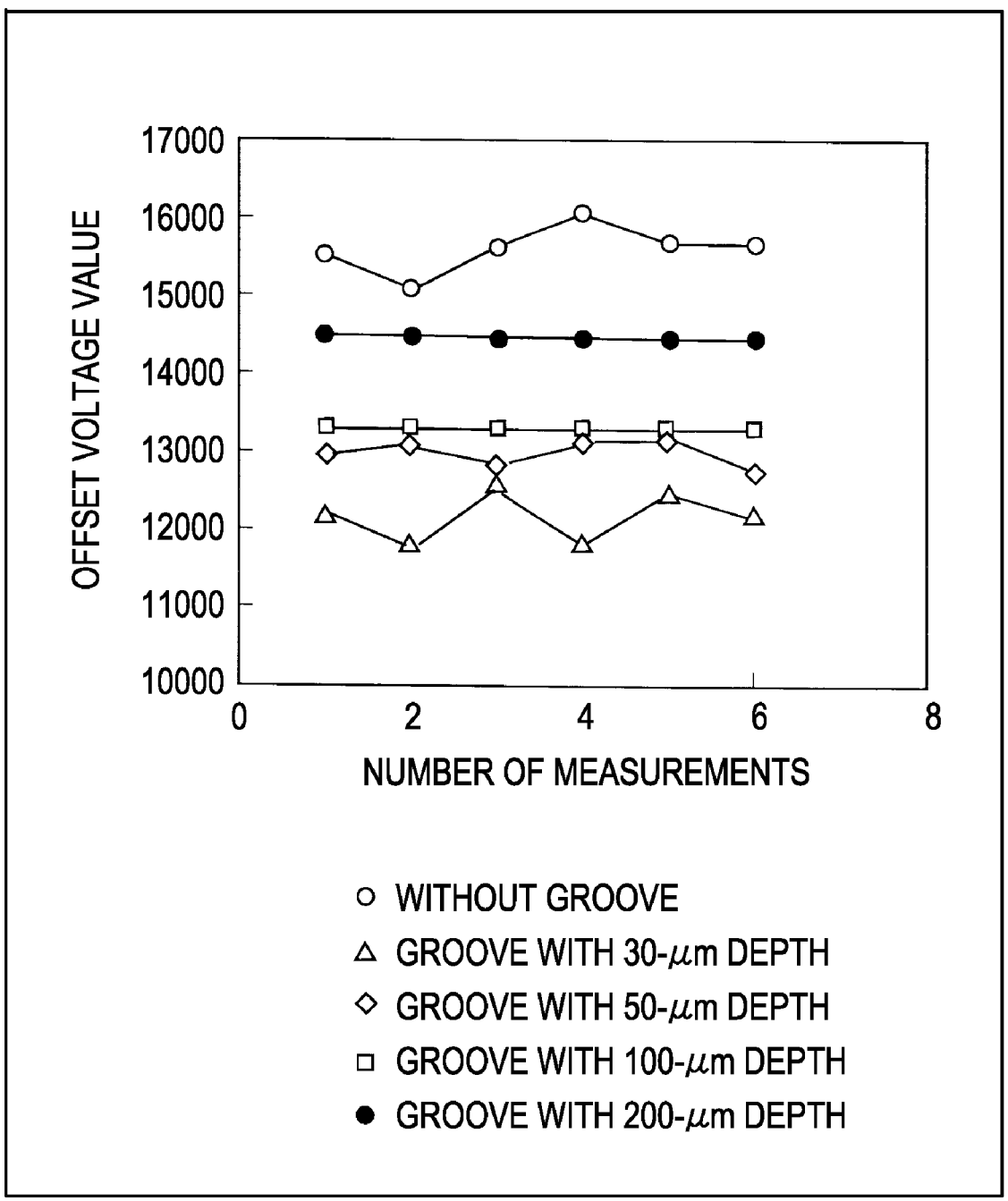
FIG. 52 is a characteristic diagram illustrating the suppression effect against fluctuation of offset voltage values in accordance with the depth of the load buffering grooves.

FIG. 52 is a graph illustrating measurement results of changes in the offset voltage value in accordance with different depths of each of the frame-like first load buffering grooves 12 in the supporting substrate 2. In the graph, circle blank dots are measurement results corresponding to a case where the grooves are given a depth of 0 μm, which means that the vibratory gyrosensor is not provided with the first load buffering grooves 12. In the same graph, triangle dots are measurement results of a vibratory gyrosensor corresponding to a case where the first load buffering grooves 12 are given a depth of 30 μm. In the same graph, diamond dots are measurement results of a vibratory gyrosensor corresponding to a case where the first load buffering grooves 12 are given a depth of 50 μm. Square dots are measurement results of a vibratory gyrosensor corresponding to a case where the first load buffering grooves 12 are given a depth of 100 μm. Circle dark dots are measurement results of a vibratory gyrosensor corresponding to a case where the first load buffering grooves 12 are given a depth of 200 μm.

As is evident from FIG. 52, when the first load buffering grooves 12 have a depth of 50 μm or smaller, a vibratory gyrosensor does not have stable characteristics since there is fluctuation in the offset voltage value. On the other hand, there is substantially no fluctuation in the offset voltage value when the first load buffering grooves 12 have a depth of 100 μm or greater, which obviously means that the vibratory gyrosensor has stable characteristics.

[Effect of Clearance Recesses]

As described above, in the vibratory gyrosensor 1, each of the clearance recesses 11 having a depth k is formed in the main surface 2-1 of the supporting substrate 2 in correspondence to the vibrator portion 23 of the corresponding vibration element 20 so that a vibration space of a height m (see FIG. 2) is formed between the vibrator portion 23 and the supporting substrate 2. As described above, in the vibratory gyrosensor 1, when a drive voltage is applied to each vibration element 20, the vibrator portion 23 thereof is vibrated. In response to the vibration of the vibration element 20 in the vertical direction and the horizontal direction, vertical and horizontal airflows are created in the vibration space. The vertical airflow hits against the bottom of the clearance recess 11 and is reflected towards the vibrator portion 23 of the vibration element 20. The vertical airflow is resistive against the vertical vibrational motion of the vibration element 20 so as to exhibit a damping effect on the vibrator portion 23.

In the vibratory gyrosensor 1, each vibrator portion 23 vibrates within the vibration space having the height m, which is the sum of the height of the gold bumps 26 and the depth k of the clearance recess 11. Thus, the influence of the damping effect is reduced so that the vibrator portion can vibrate with a high Q value. Accordingly, in the vibratory gyrosensor 1, stable motion-blur detection can be performed with high sensitivity by means of the vibration elements having a high Q value.

Figure 53:
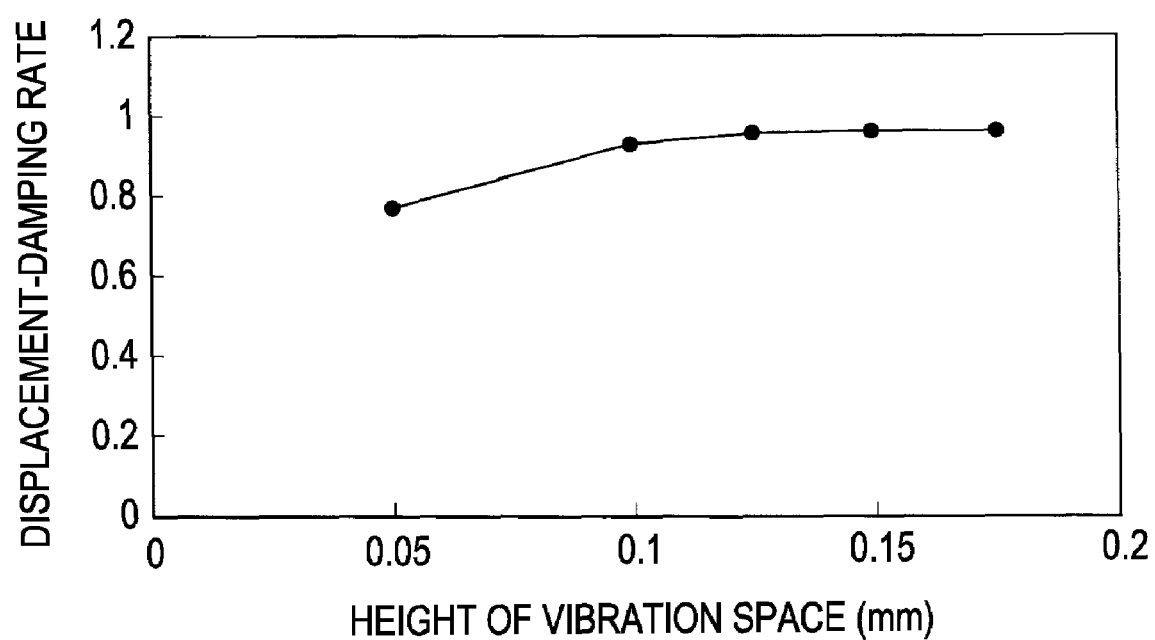
FIG. 53 is a characteristic diagram illustrating the relationship between the height of a vibration space defined by each clearance recess and the displacement-damping rate of the vibrator portion.

FIG. 53 is a characteristic diagram showing a variety of heights m of the vibration space and changes in the displacement-damping rate of the vibrator portion 23 in a case where, in each of the vibration elements 20 of the vibratory gyrosensor 1, the base portion 22 has a thickness of 0.3 mm, the vibrator portion 23 has a thickness of 0.1 mm, the supporting substrate 2 has opening dimensions of 2.1 mm×0.32 mm, and the clearance recess 11 has a variable depth k. It is evident from the drawing that if the height m of the vibration space for the vibration element 20 is 0.05 mm and is thus extremely small, the vibrator portion 23 is subject to a significant damping effect, whereby the displacement-damping rate becomes about 0.8. In this case, the vibration element 20 cannot achieve a predetermined Q value, thus resulting in lower characteristics.

In each vibration element 20, the damping effect on the vibrator portion 23 decreases as the height m of the vibration space increases, whereby the displacement-damping rate of the vibrator portion 23 gradually increases. In the vibration element 20, when the height m of the vibration space is about 0.1 mm, the vibrator portion 23 is substantially uninfluenced by the damping effect, whereby the predetermined Q value can be attained.

It is needless to say that the vibration space must have a height k greater than the maximum vibrational amplitude of the vibration element 20, or in other words, greater than half the maximum amount of displacement at the tip end of the vibrator portion 23, so as to allow the vibration element 20 to vibrate freely. Based on the characteristic diagram described above, when the vibrator portion 23 has a maximum vibrational amplitude p, the vibration space satisfies the condition $k \geq p/2 + 0.05$ (mm) so that the vibration element 20 can be driven with a predetermined Q value.

In the above embodiment, the main surface 2-1 of the supporting substrate 2 is provided with clearance recesses 11 having a depth k so as to provide the vibration spaces of an overall height m between the main surface 2-1 and the second main surfaces (substrate-facing surface) 23-2 of the vibrator portions 23. However, the present invention is not limited to this structure. In the vibratory gyrosensor 1, for example, the clearance recesses 11 may be defined by rectangular grooves that extend through the supporting substrate 2. According to this structure, the vibratory gyrosensor 1 allows the gold bumps 26 to have a common size, whereby a low-profile structure can be achieved as a whole.

[Effect of Pair of Vibration Elements]

In the vibration-element forming process, a plurality of vibration elements 20 each having the vibrator portion 23 integrated with the base portion 22 is formed simultaneously on the silicon substrate 21, and the silicon substrate 21 is subsequently cut into the vibration elements 20. In the vibration-element forming process, the first vibration element 20X and the second vibration element 20Y having the same shape are formed such that the two vibration elements are disposed on two axes above a main surface of the supporting substrate 2, thereby producing the vibratory gyrosensor 1 that can obtain detection signals of two axes.

The vibration-element forming process allows for a significant increase in the number of vibration elements obtained from the silicon substrate (wafer) 21 in comparison to an example of a two-axis integrated vibration element that obtains detection signals of two axes, in which the vibrator portions are integrally formed on adjacent side surfaces of a common base portion 22. FIG. 54 shows a comparison between the obtained number of vibration elements 20, in which each of the portions has the above-described dimensional values, and the obtained number of two-axis integrated vibration elements having the same function as the vibration elements 20.

Referring to FIG. 54, a total of 60 vibration elements 20 (corresponding to 30 vibratory gyrosensors 1 each including two vibration elements) are produced when a 3-cm square silicon substrate is used. A total of 1200 vibration elements 20 (corresponding to 600 vibratory gyrosensors 1) are produced by using a 4-inch diameter wafer, which is generally used in mass production in a semiconductor process. Furthermore, a total of 4000 vibration elements 20 (corresponding to 2000 vibratory gyrosensors 1) are produced when a 5-inch diameter wafer is used. On the other hand, a total of 20 two-axis integrated vibration elements are produced when a 3-cm square silicon substrate is used. A total of 300 two-axis integrated vibration elements are produced when a 4-inch diameter wafer is used. A total of 800 two-axis integrated vibration elements are produced when a 5-inch diameter wafer is used. With the vibration elements 20, the material yield rate is significantly increased so as to contribute to cost reduction.

As described above, in the vibratory gyrosensor, the first vibration element 20X and the second vibration element 20Y for obtaining detection signals of two axes are mounted on the supporting substrate 2 and are disposed on two axes that extend perpendicular to each other. In the vibratory gyrosensor 1, it is taken into consideration that the vibration of one of the vibration elements may affect the other vibration element, thus generating interference between the two axes. FIG. 55 shows measurement results of crosstalk in a case where the first vibration element 20X and the second vibration element 20Y are mounted on the basis of various orientations on the supporting substrate 2.

In FIG. 55, type 1 is an example in which a first vibration element 20X-1 and a second vibration element 20Y-1 are mounted in a manner such that respective base portions 22X-1, 22Y-1 thereof are secured at diagonal corners of the supporting substrate 2 and that respective vibrator portions 23X-1, 23Y-1 thereof face each other. Type 2 is an example in which a first vibration element 20X-2 and a second vibration element 20Y-2 are mounted in a manner such that respective base portions 22X-2, 22Y-2 thereof are secured at the same corner of the supporting substrate 2 and that respective vibrator portions 23X-2, 23Y-2 thereof extend along sides that are perpendicular to each other. Type 3 is an example in which a first vibration element 20X-3 is mounted on the supporting substrate 2 such that a base portion 22X-3 thereof is secured at a first corner, and a vibrator portion 23X-3 thereof extends toward a second corner adjacent to the first corner, and a second vibration element 20Y-3 is mounted on the supporting substrate 2 such that a base portion 22Y-3 thereof is secured at a third corner adjacent to the first corner, and a vibrator portion 23Y-3 thereof extends toward the first vibration element 20X-3. As a comparative example, the drawing also shows a crosstalk value of a two-axis integrated vibration element (type 0) 60. The unit of crosstalk is dbm (decibel effective value).

As shown in FIG. 55, a crosstalk value of the vibration element 60 of type 0 is −50 dbm, a crosstalk value of the vibration elements 20X-1, 20Y-1 of type 1 is −70 dbm, a crosstalk value of the vibration elements 20X-2, 20Y-2 of type 2 is −60 dbm, and a crosstalk value of the vibration elements 20X-3, 20Y-3 of type 3 is −72 dbm.

In the vibratory gyrosensor of each of types 1 to 3 according to the present invention, an improvement of at least about −10 dbm is achieved regardless of the mounting state, as compared with the two-axis integrated vibration element 60 of type 0. Since the vibratory gyrosensor 1 is provided with the two independent vibration elements 20, an interference signal between the detections signals of the two axes is reduced to about 1 mV. In contrast, in a vibratory gyrosensor including the two-axis integrated vibration element, an interference signal between the detections signals of the two axes is about 10 mV, thus deteriorating the detection characteristics.

In the vibratory gyrosensor 1 according to this embodiment, the interference between the two axes is at minimum when the first vibration element 20X and the second vibration element 20Y are arranged on the supporting substrate 2 based on type 1. In the vibratory gyrosensor 1, the first vibration element 20X and the second vibration element 20Y may be disposed at any positions on the supporting substrate 2, but in view of the mounting of the small IC circuit element 7 and the plurality of electronic components 8 and the extension of the wiring pattern 5, the mounting efficiency is most improved when the base portions 22 are mounted at the corners of the supporting substrate 2 as in the above-described types.

Figure 56A:
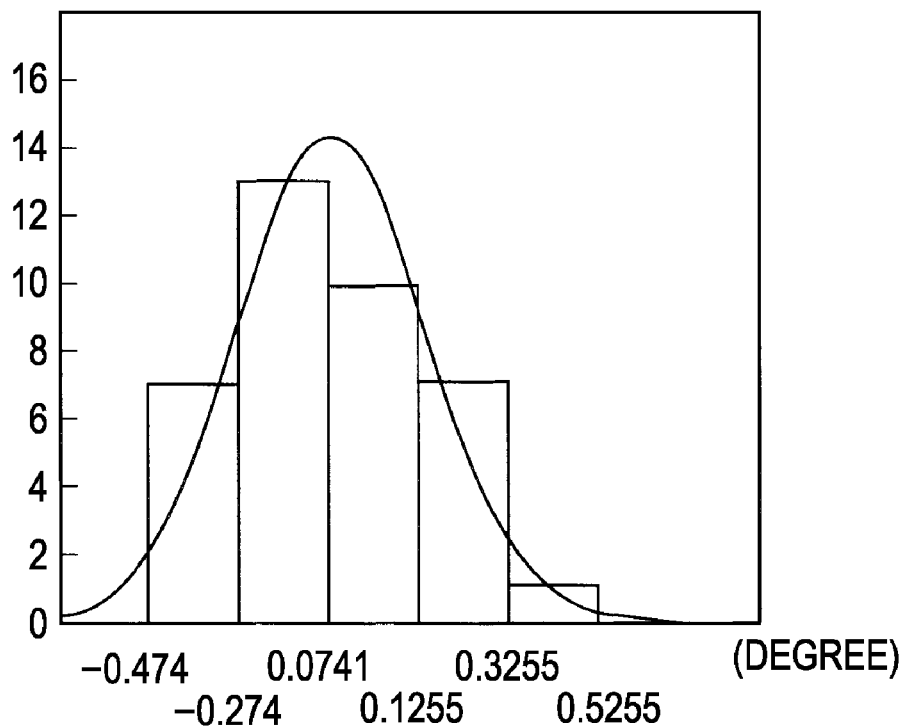
FIG. 56A is a histogram of angular displacement of the vibration elements in a mounting step, and corresponds to a case where the mounting is implemented by recognizing positioning marks.
Figure 56B:
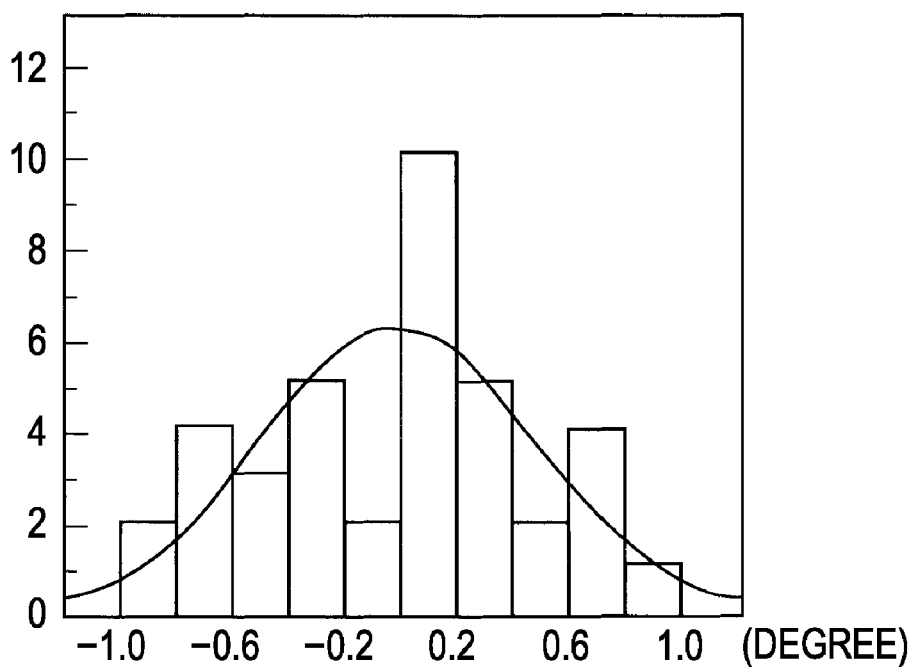
FIG. 56B is a histogram of angular displacement of the vibration elements in a mounting step, and corresponds to a case where the mounting is implemented by recognizing the outline of each vibration element.

In the vibratory gyrosensor 1, the positioning marks 32 are provided in each vibration element 20. The positioning marks 32 are recognized so that the first vibration element 20X and the second vibration element 20Y are mounted facing each other on two perpendicular axes above the supporting substrate 2 by using a mounting device. In the vibratory gyrosensor 1, each vibration element 20 must be mounted on the supporting substrate 2 so as not to cause positional displacement of the vibrator portion 23 thereof. FIGS. 56A and 56B are histograms showing positional displacement (displacement-angle distribution from the center axis) of the vibration elements 20. The horizontal axis represents the displacement angle (degree) and the vertical axis represents the quantity. FIG. 56A corresponds to a case where the mounting is implemented by recognizing the positioning marks 32, and FIG. 56B corresponds to a case where the mounting is implemented by recognizing the outer shape of each vibration element 20. Referring to the drawings, in the vibratory gyrosensor 1, when high-level recognition is implemented using the positioning marks 32, the vibration elements 20 are precisely mounted on the supporting substrate 2 within a range in which variations in the occurrences of angular displacement is low and the displacement angle is low. Accordingly, in the vibratory gyrosensor 1, a motion-blur detecting operation can be performed precisely and stably with the vibration elements 20.

[Crosstalk]

Figure 57:
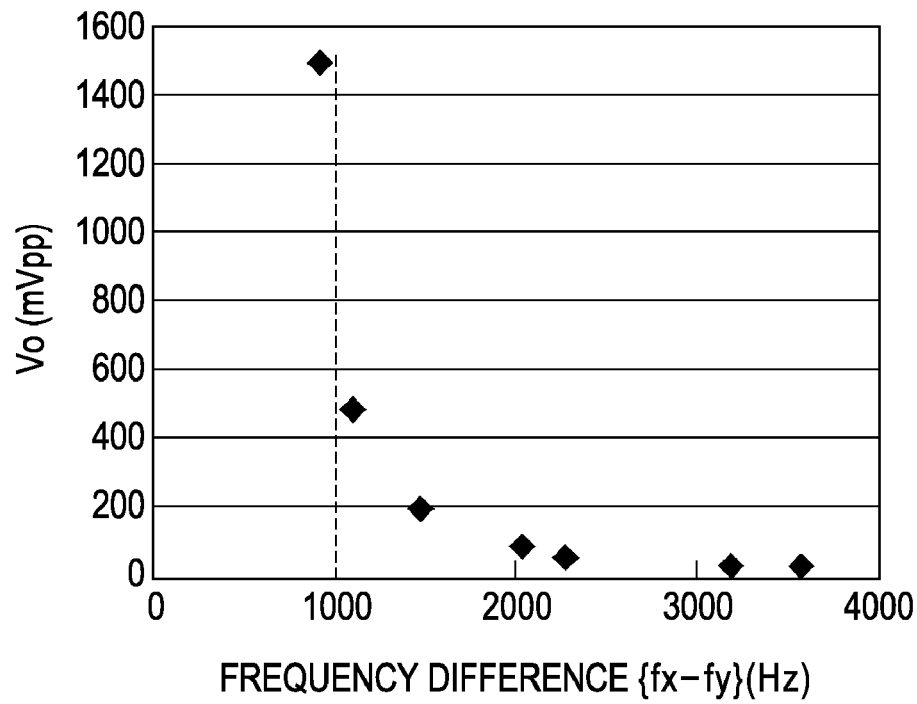
FIG. 57 is a characteristic diagram showing measurement results of the magnitude of an interference signal caused by a frequency difference, which is induced by changing operating frequencies of two vibration elements.

The operating frequency of each vibration element 20 may be set within a range of several kHz to several hundreds of kHz. In the two-axis angular-velocity sensor (vibratory gyrosensor 1), the magnitude of an interference signal caused by a frequency difference (fx−fy) was measured by changing the operating frequencies (fx, fy) of the two vibration elements 20X, 20Y. The results obtained are shown in FIG. 57. In FIG. 57, the horizontal axis represents the operating frequency difference (fx−fy) between the vibration elements 20X, 20Y, and the vertical axis represents an AC noise component Vo (magnitude between an upper amplitude peak and a lower amplitude peak of an AC waveform that indicates noise) superposed on the sensor output (DC). Here, the noise component is referred to as "crosstalk between axes".

If the frequency difference (fx−fy) is 1 kHz or less, the crosstalk value will reach 1500 mVpp or more, which means that an angular-velocity detecting operation cannot be performed stably. In contrast, as the frequency difference approaches near 1 kHz, the crosstalk value starts to decrease significantly to 500 mVpp. When the frequency difference is 1.4 kHz, the crosstalk value is 200 mVpp, and when the frequency difference is 2 kHz or more, the crosstalk value is decreased to 100 mVpp or less. The results shown in FIG. 57 indicate that the crosstalk between the axes is decreased significantly by setting the frequency difference (fx−fy) to 1 kHz or more. As a result of preparing two types of samples of vibration elements 20X, 20Y having a difference of 1 kHz between the operating frequencies (fx, fy) thereof, a two-axis angular-velocity sensor that allows for an extremely stable operation was obtained.

Sample 1

First vibration element 20X having an operating frequency of 37 kHz

Second vibrating element 20Y having an operating frequency of 36 kHz

Sample 2

First vibrating element 20X having an operating frequency of 40 kHz

Second vibrating element 20Y having an operating frequency of 39 kHz

Furthermore, FIG. 57 shows that, by setting the frequency difference (fx−fy) between 2 kHz to 3 kHz, the effect of crosstalk between the pair of vibration elements 20X, 20Y can be avoided. Accordingly, the precision of the sensor output can be enhanced by driving the vibration elements 20X, 20Y with a frequency difference of 2 kHz or more.

Furthermore, the vibratory gyrosensor according to this embodiment may be affected by crosstalk between the vibration elements 20 and other electronic components (such as a sensor) incorporated in the main apparatus. Therefore, it is preferable that a plurality of vibration elements having difference drive frequencies be prepared so that a vibration element having a drive frequency that is not affected by the crosstalk can be selected. In detail, a plurality of vibration elements having drive frequencies within a range between 35 kHz and 60 kHz may be prepared, and two vibration elements having an operating frequency difference of 1 kHz or more (preferably, 2 kHz or more) may be selected so as to avoid crosstalk between the pair of vibration elements and between the vibration elements and other electronic components incorporated in the main apparatus.

Other embodiments according to the present invention will now be described.

Figure 58:
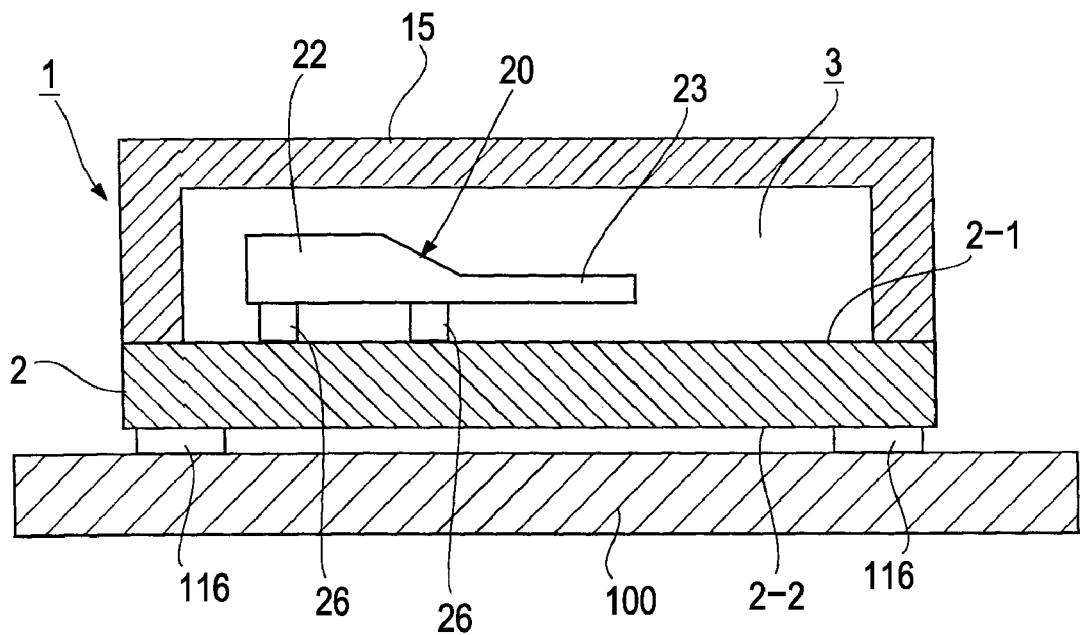
FIG. 58 is a schematic cross-sectional view illustrating a state where the vibratory gyrosensor is mounted on the control substrate.

FIG. 58 schematically shows the vibratory gyrosensor 1 according to the present invention, in which each of the vibration elements 20 is mounted on the first main surface 2-1 of the supporting substrate 2 with the gold bumps 26 disposed therebetween, and the cover 15 is disposed above the first main surface 2-1 of the supporting substrate 2 so that the component-installation space 3 is shielded from the outside. The vibratory gyrosensor 1 formed in this manner is mounted on the control substrate 100 of the main apparatus with the mounting terminals 116 disposed therebetween, which is disposed on the second main surface 2-2 of the supporting substrate 2 to serve as external connection terminals.

Figure 59:
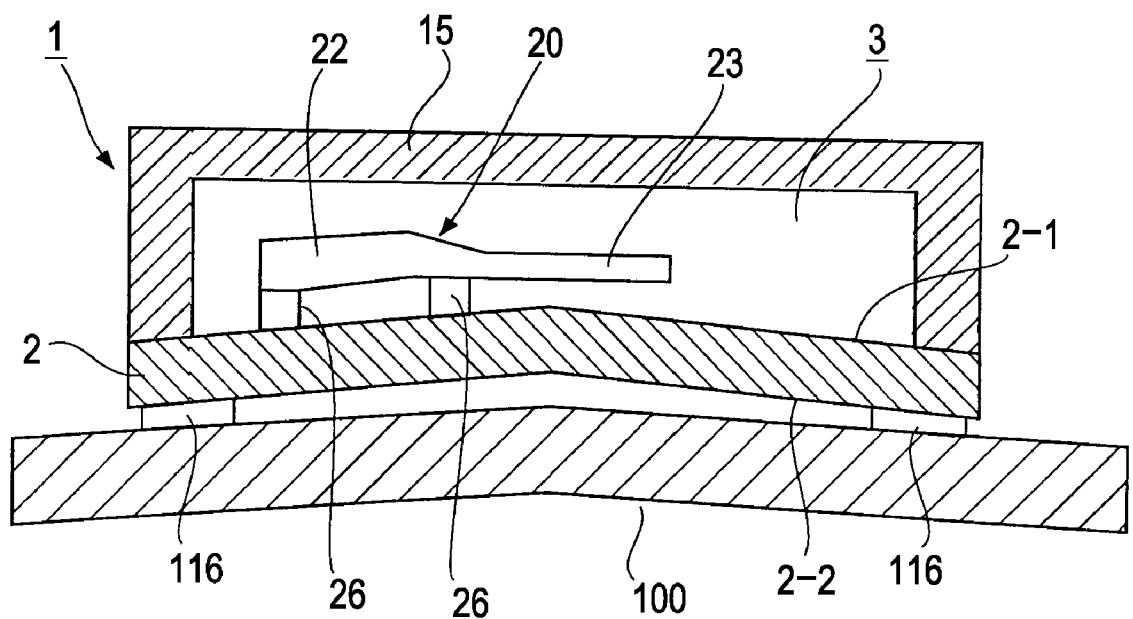
FIG. 59 is a schematic cross-sectional view illustrating a condition of the vibratory gyrosensor when the control substrate in FIG. 58 is under external strain.

Generally, the structure and the properties of the control substrate 100, for example, vary depending on the type of the main apparatus. In the vibratory gyrosensor, predetermined characteristics must constantly be attained regardless of the type of the control substrate 100. Moreover, since other various electronic components are to be disposed on the control substrate 100, the vibratory gyrosensor 1 is subject to strain or stress to some extent when the electronic components mounted onto the control substrate 100. In particular, if the electronic components are mounted onto the control substrate 100 by reflow soldering, a load is applied to the vibratory gyrosensor 1 from the control substrate 100, as exaggeratedly shown in FIG. 59, due to thermal stress applied to the control substrate 100. This increases the possibility of strain or stress applied to the junction between each vibration element 20 and the supporting substrate 2. In this case, since a desired connection structure of the vibration element 20 will not be attained, the vibration characteristics and detection sensitivity become unstable, which implies that it will become difficult to perform a stable angular-velocity detecting operation. A similar problem may be induced by external stress, such as shock, applied to the main apparatus.

In embodiments below, several structural examples of vibratory gyrosensors will be described, in which the vibration characteristics of the vibration elements 20 are less affected by, for example, external shock or by the reflow mounting process of the other electronic components on the control substrate 100. The dimensions of each of the portions in the vibration elements 20 are the same as those described in the first embodiment.

Second Embodiment

Multi-tiered Bumps

Figure 60A:
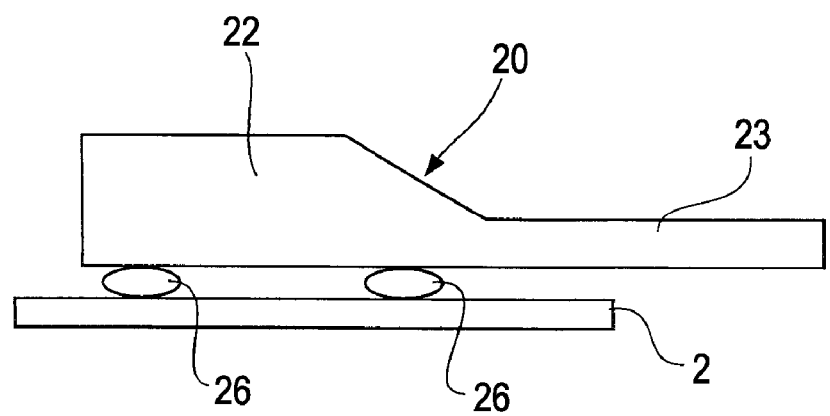
FIG. 60A is a schematic side view of a typical vibration element used for describing vibration elements according to a second embodiment of the present invention.

In the first embodiment described above, each of the vibration elements 20 is mounted on the supporting substrate 2 with the gold bumps 26 disposed therebetween in a single-tiered fashion, as shown in FIG. 60A. In this embodiment, referring to FIG. 60B and FIGS. 61A, 61B, the gold bumps are given a multi-tiered bump structure so that the stress applied to the vibration elements can be reduced while maintaining a proper junction strength, thereby attaining stable vibration characteristics and highly reliable detection accuracy.

Figure 60B:
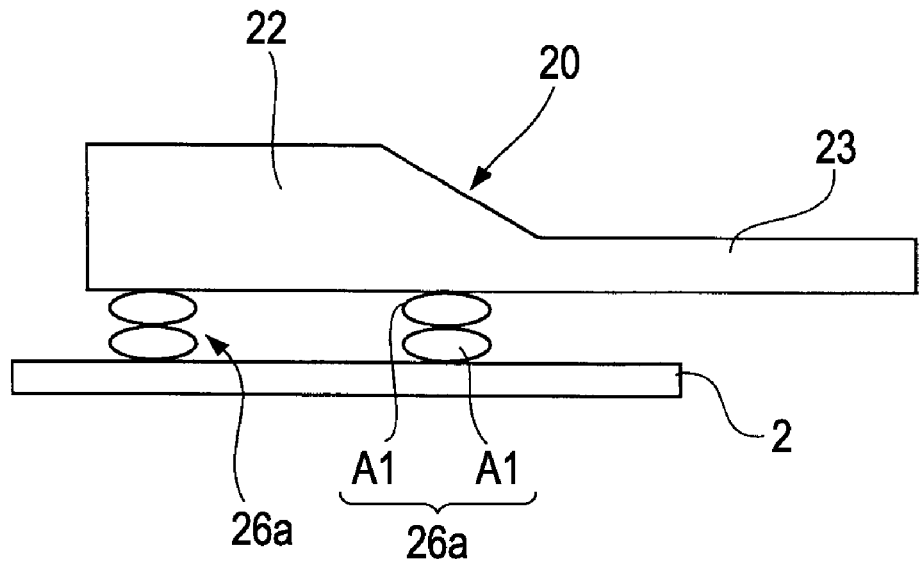
FIG. 60B is a schematic side view of one of the vibration elements according to the second embodiment of the present invention.

FIG. 60B shows an example in which each of gold bumps 26a includes double-tiered bump components A1 having the same diameter. In comparison to the single-tiered gold bumps 26, the gold bumps 26a having the double-tiered structure can support the vibration elements 20 at a higher position from the supporting substrate 2. Thus, when external stress is transmitted to the supporting substrate, the stress is dampened by the multi-tiered gold bumps 26a before being transmitted to the vibration elements 20. Therefore, the vibration elements 20 are less affected by external stress, whereby stable vibration characteristics and highly reliable detection accuracy can be attained.

Figure 61A:
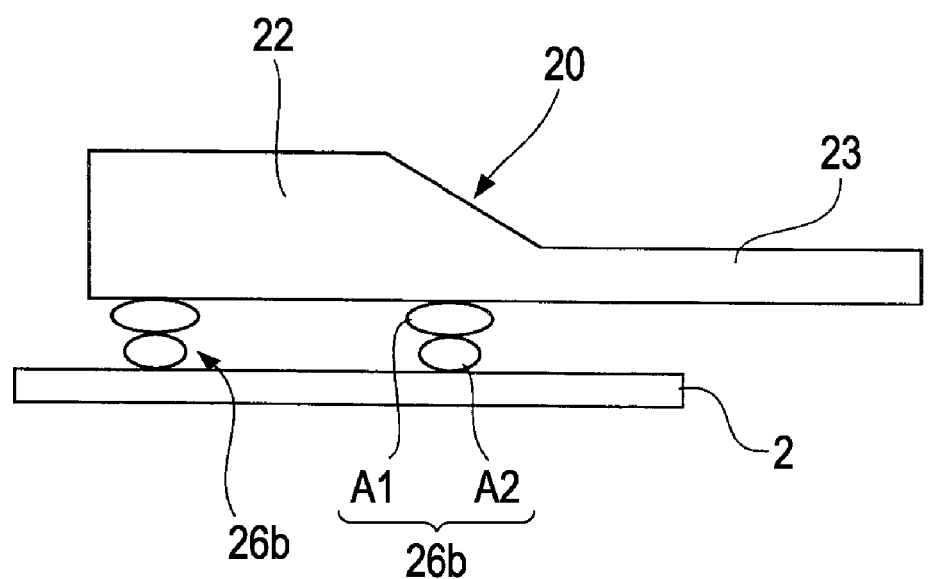
FIG. 61A illustrates a modified example of the gold bumps.
Figures 61B, 62A:
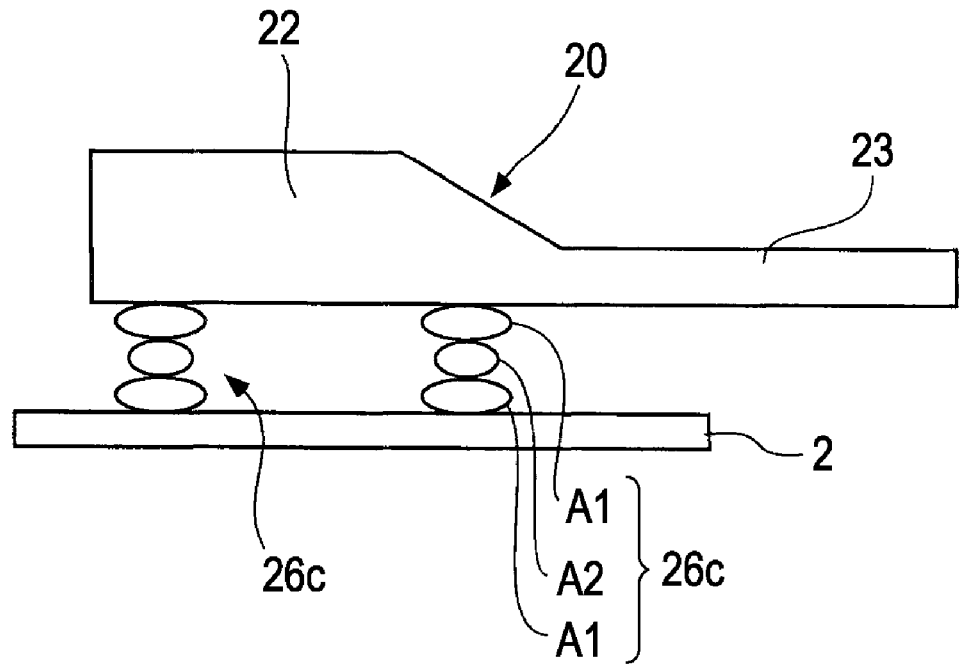
FIG. 61B illustrates another modified example of the gold bumps.
FIG. 62A is a measurement principle diagram of a practical example corresponding to the second embodiment of the present invention.

The multi-tiered bump components included in each bump do not necessarily need to have the same diameter. FIG. 61A shows gold bumps 26b each including double-tiered bump components A1, A2 having different diameters. In this example, the bump components A2 having a smaller diameter than the bump components A1 are disposed proximate to the supporting substrate 2. The bump diameter for each tier is determined in accordance with, for example, required vibration characteristics and junction strength. Furthermore, the bumps including the multi-tiered bump components are not limited to a double-tiered structure. FIG. 61B shows gold bumps 26c each having a triple-tiered structure. In this example, a small-diameter bump component A2 is sandwiched between a pair of large-diameter bump components A1.

Models of the supporting substrate having the vibration elements mounted thereon with the gold bumps having the structures shown in FIGS. 60, 61A, and 61B were fabricated. The stress affecting a change in the behavior of the vibration elements in response to a certain load applied to the supporting substrate was calculated by simulation.

Figure 62B:
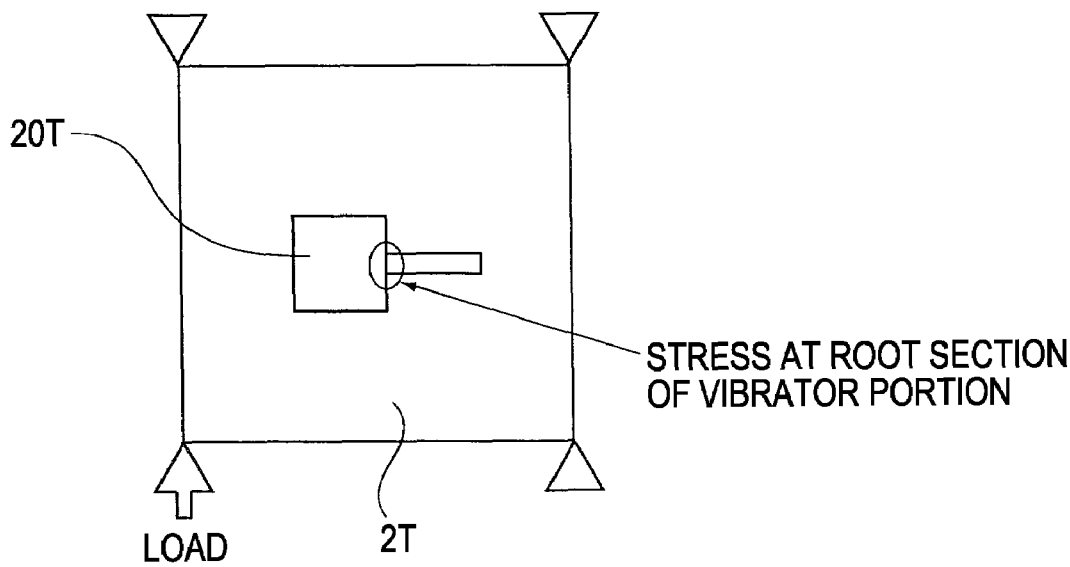
FIG. 62B is a measurement principle diagram of the practical example corresponding to the second embodiment of the present invention.

Each of the bump components A1, A2 is fabricated using a common wire bonding tool. A diameter of each of the bump components A1, A2 is determined on the basis of the diameter (wire width) of a wire (gold wire) used, as shown in FIG. 62A. With a gold wire having a wire width of 38 µm, a bump component A1 with a diameter of 130 µm is obtained, and with a gold wire having a wire width of 25 µm, a bump component A2 with a diameter of 90 µm is obtained. The testing condition is shown in FIG. 62B in which a vibration element 20T is mounted in the center of a square supporting substrate 2T having 7-mm sides and a thickness of 0.5 mm. The supporting substrate 2T is fixed at three corners thereof, and the remaining corner thereof is displaced by a certain distance (in this case, 10 µm) in the substrate-thickness direction. Under this condition, the stress applied to the root section of the vibrator portion was calculated. Stress analyzing software "ANSYS 5.7" was used.

Figure 63A:
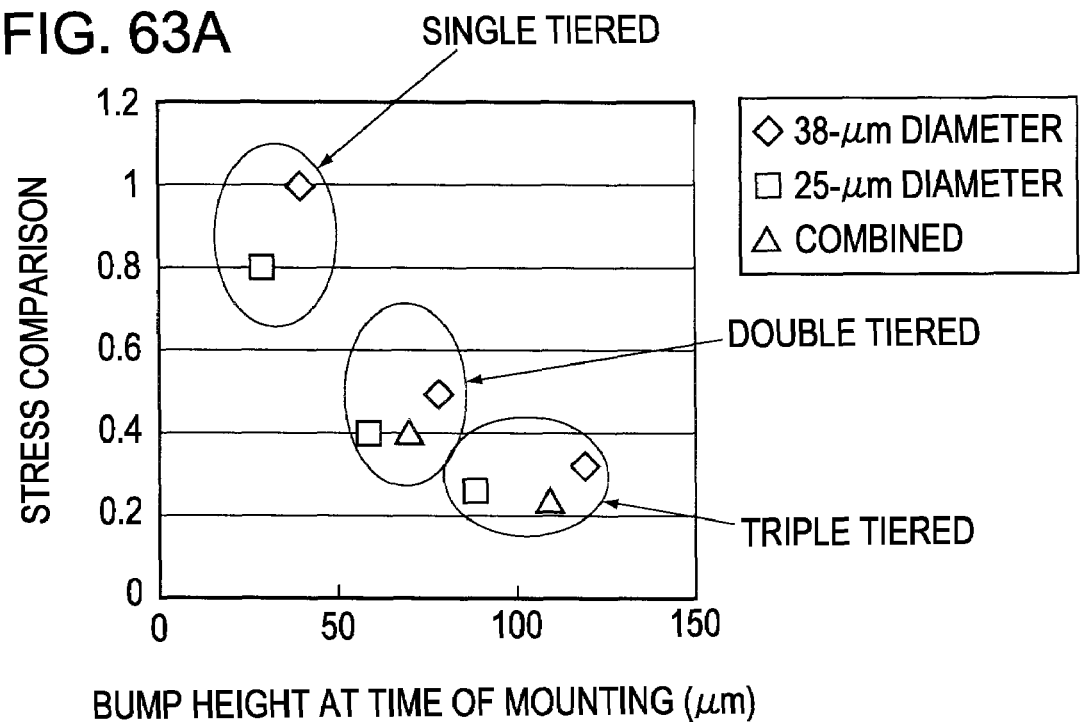
FIG. 63A is a characteristic diagram showing results of the practical example shown in FIGS. 62A and 62B.

FIG. 63A shows the relationship between the bump height at the time of mounting and the stress applied to the root section of the vibrator portion. In FIG. 63A, the stress corresponding to the single-tiered bump structure formed with a wire width of 38 µm is set as 1, and the stress corresponding to each of the remaining bump structures is indicated as a relative ratio. It is understood that the larger the number of tiers in each bump and the larger the mounting height, the smaller the stress exerted on the root section of the vibrator portion, and a high stress damping effect is attained at each bump junction. Furthermore, there are no notable differences observed due to different bump diameters between the tiers.

Figure 63B:
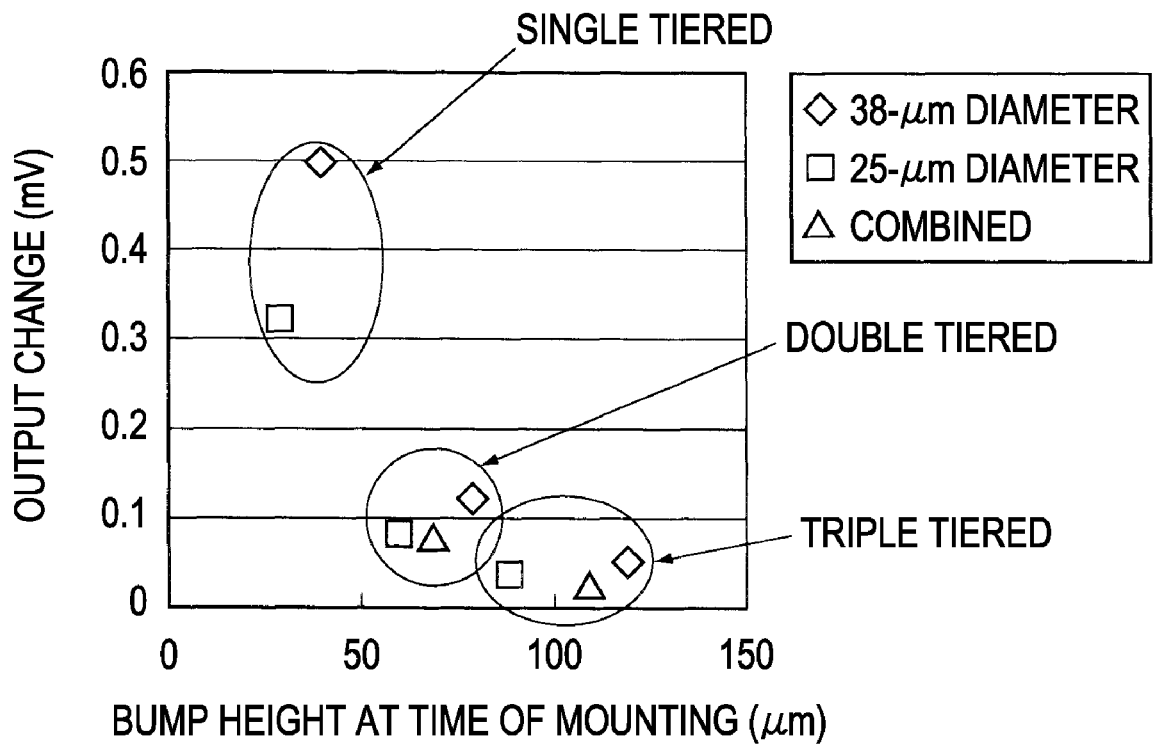
FIG. 63B is a characteristic diagram showing results of the practical example shown in FIGS. 62A and 62B.

FIG. 63B shows the relationship between the bump height at the time of mounting and an output change of the vibration element. The term "output change" refers to an amount of fluctuation of reference output before and after the mounting on the control substrate of the main apparatus. The larger the number of tiers in each bump, the smaller the output change, and stable detection accuracy is attained before and after the mounting. In particular, the output change of the sensor is significantly improved when the bump height is 50 µm or more. Increasing the bump height stabilizes the characteristics, but may lower the junction strength. Therefore, the bump height is preferably within a permissible range of up to, for example, about 100 µm.

Third Embodiment

Bump Positions

As described in the first embodiment, the vibration elements 20 are mounted on the supporting substrate 2 with the gold bumps 26 disposed therebetween. However, depending on the positions of the gold bumps 26, the supporting substrate 2 may warp in response to stress received from the control substrate of the main apparatus. In that case, the warpage may have a significant effect on the vibration elements 20 and may cause the vibration mode to change, thus leading to lower characteristics.

In this embodiment, the positions of the gold bumps 26 provided in the vibration elements 20 are determined so that the vibration mode of the vibration elements is stably maintained even when external strain is applied, thereby inhibiting the output accuracy from deteriorating.

Figure 64A:
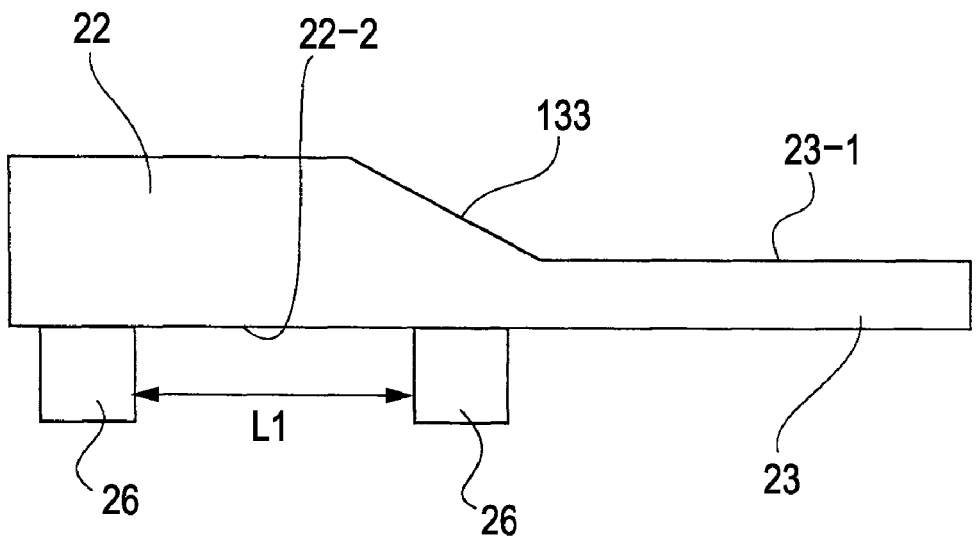
FIG. 64A is a schematic side view of a typical vibration element used for describing vibration elements according to a third embodiment of the present invention.

FIG. 64A schematically shows one of the vibration elements described in the first embodiment, in which the gold bumps 26 are provided at the four corners of the mounting surface 22-2 of the base portion 22. The magnitude of strain or stress transmitted to the vibration element from the supporting substrate depends on a distance L between the adjacent gold bumps 26. The larger the distance L, the greater the magnitude of strain or stress applied to the vibration element.

Figure 64B:
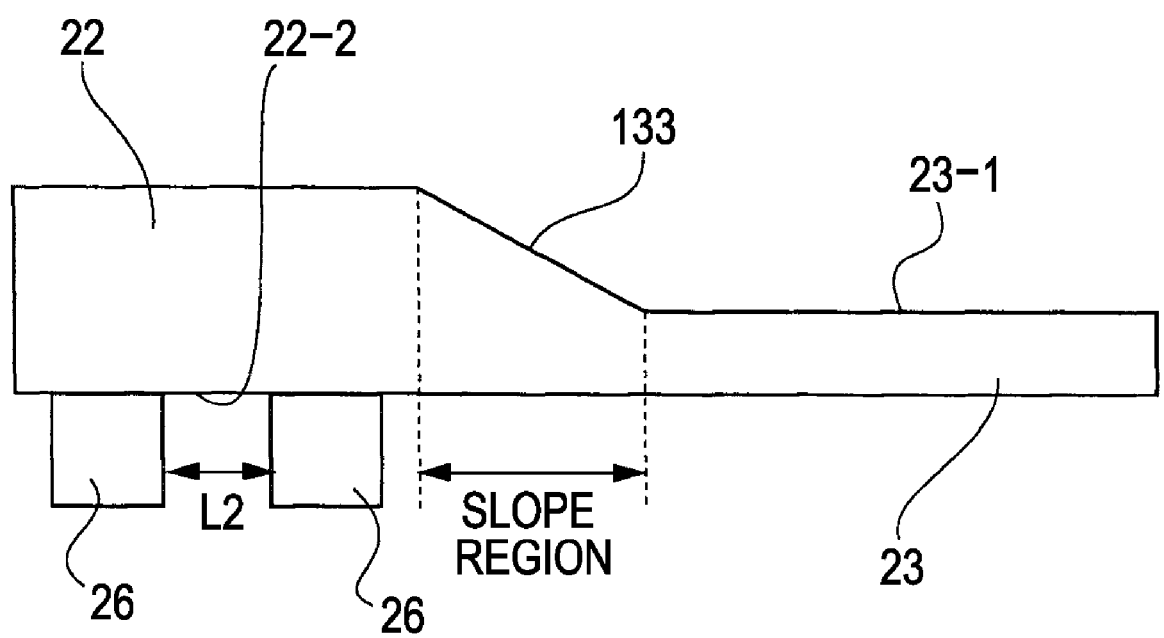
FIG. 64B is a schematic side view of one of the vibration elements according to the third embodiment of the present invention.

Referring to FIG. 64B, in this embodiment, a distance L2 between the adjacent gold bumps 26 is shorter than a distance L1 in the vibration element shown in FIG. 64A. Specifically, in each of the vibration elements according to the present invention, the top surface 23-1 of the vibrator portion 23 is disposed at a lower level from the top surface 22-1 of the base portion 22 with the slope 133 disposed therebetween (see FIG. 19). In the example shown in FIG. 64A, each gold bump 26 disposed proximate to the vibrator portion 23 is provided on the second main surface 22-2 of the base portion 22 in an area corresponding to the region of the slope 133. In contrast, in this embodiment, as shown in FIG. 64B, each gold bump 26 positioned proximate to the vibrator portion 23 is provided on the second main surface 22-2 of the base portion 22 in an area corresponding to a region free of the slope 133.

Since each gold bump 26 proximate to the vibrator portion 23 is provided on the second main surface 22-2 in the area corresponding to the region free of the slope 133, the vibrator portion 23 is less likely to receive strain or stress in comparison to a case where an area corresponding to the region of the slope 133 has a thickness that decreases in a stepwise fashion. Thus, the stress is inhibited from concentrating at the root section of the vibrator portion 23, thereby achieving stable vibration characteristics of the vibrator portion 23.

Accordingly, in order to reduce the effect of external strain or stress on the vibrator portion 23, the gold bumps 26 are preferably disposed distant from the vibrator portion 23 as much as possible. Moreover, by reducing the distance between the adjacent gold bumps 26 to a maximum extent, external strain is prevented from reaching the tip end of the vibrator portion 23.

Figure 65:
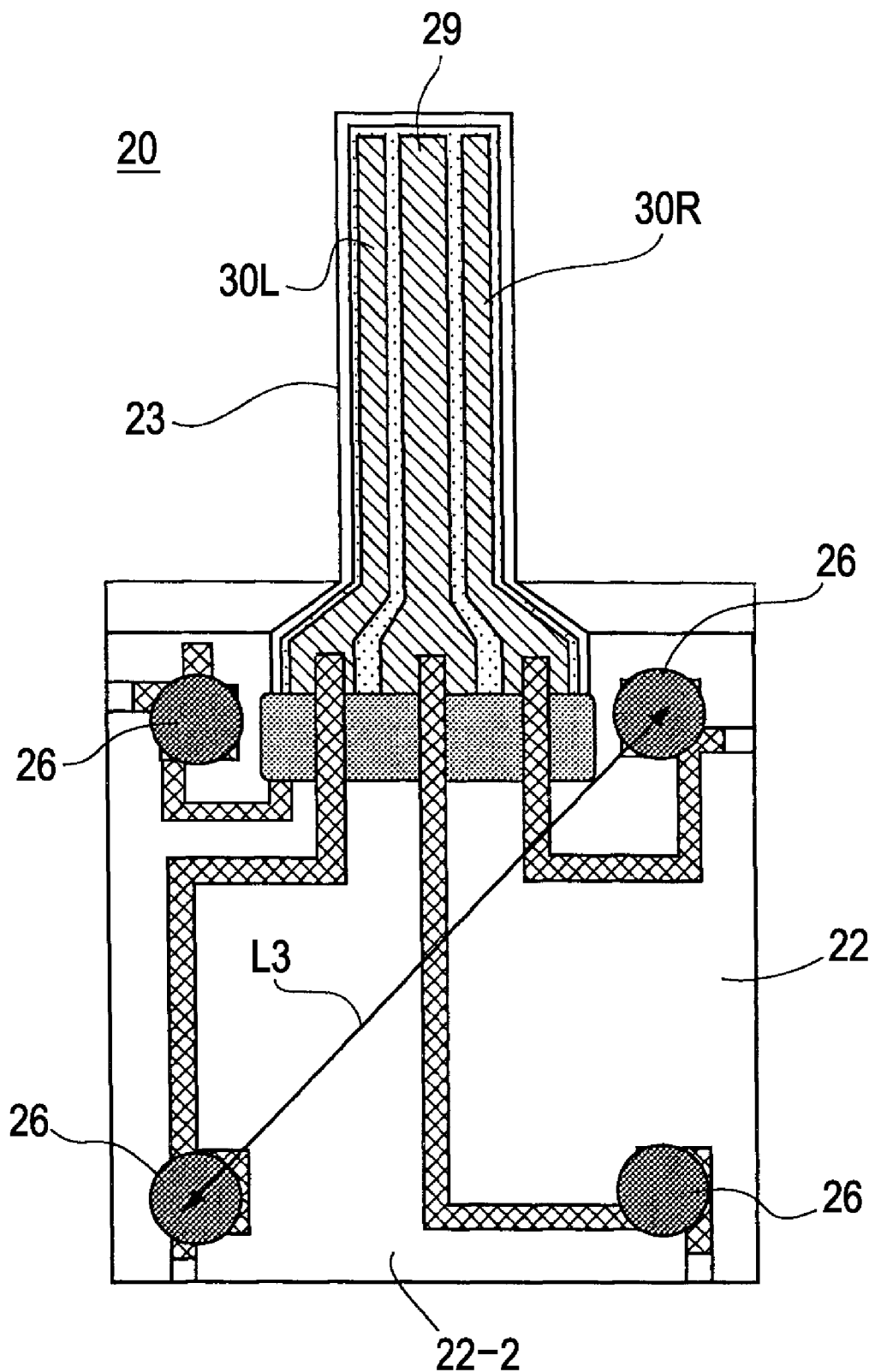
FIG. 65 is a bottom view of the vibration element and illustrates one practical example according to the third embodiment of the present invention.
Figure 66:
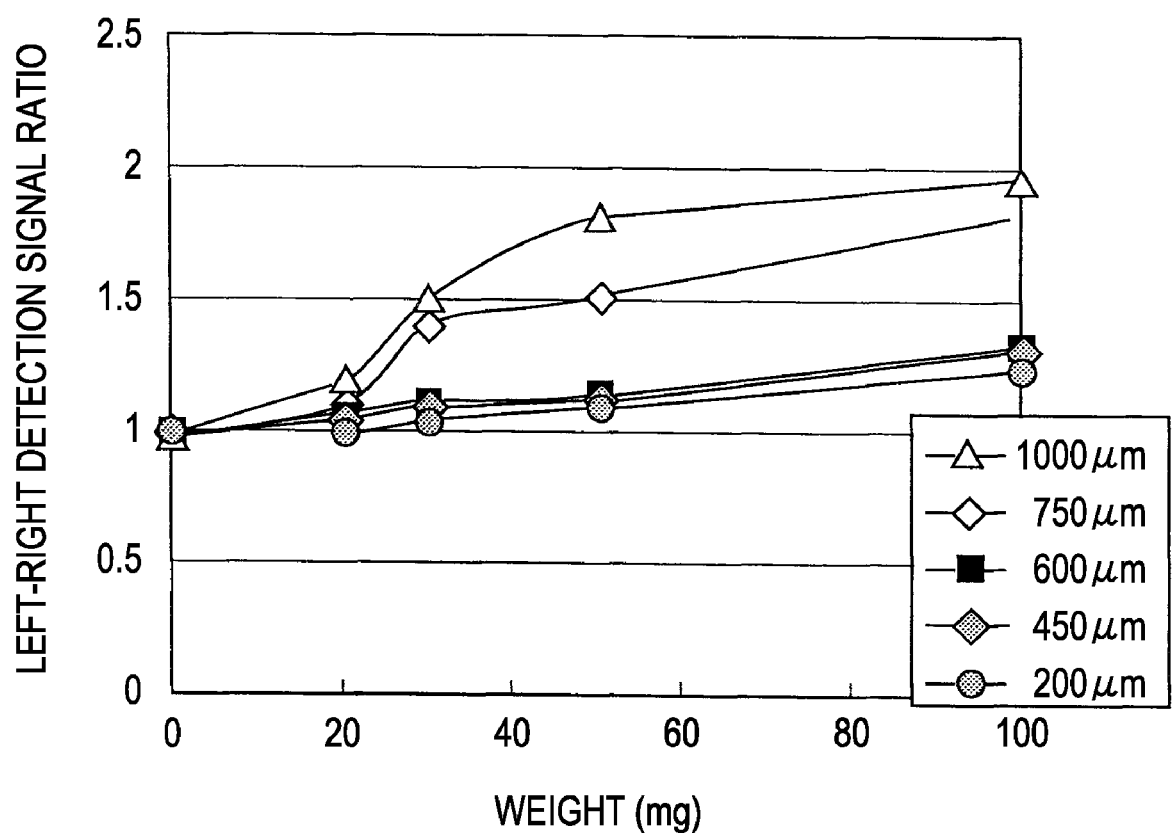
FIG. 66 is a characteristic diagram showing measurement results of the one practical example according to the third embodiment of the present invention.

Referring to FIG. 65, the relationship between a distance L3 between gold bumps 26 disposed at diagonal positions from each other on the second main surface 22-2 (i.e. distance between centers of bumps) and a change in the behavior of the vibration element 20 in response to a load applied to the supporting substrate was observed. The results obtained are shown in FIG. 66. FIG. 66 shows an output ratio of detection signals output from the left and right detection electrodes 30L, 30R of each vibration element 20 in association with the distance L3 between the gold bumps 26 disposed at diagonal positions from each other. The vibratory gyrosensor was mounted in the center of a 5-cm-square glass epoxy substrate, serving as the control substrate, by reflow soldering. Then, the control substrate was fixed at three points, and a load was applied to the remaining one point thereof to produce strain. A ratio between the left and right detection signals (the ratio being 1 when the outputs are the same) was measured.

Referring to FIG. 66, when the distance L3 along the diagonal line is 750 µm or more, the sensitivity against external strain increases drastically, and the vibration mode changes from the original vertical direction, thus producing a difference in the left and right detection signals. In contrast, when the distance L3 along the diagonal line is 600 µm or less, the degree of change with respect to external strain is small.

Figure 67:
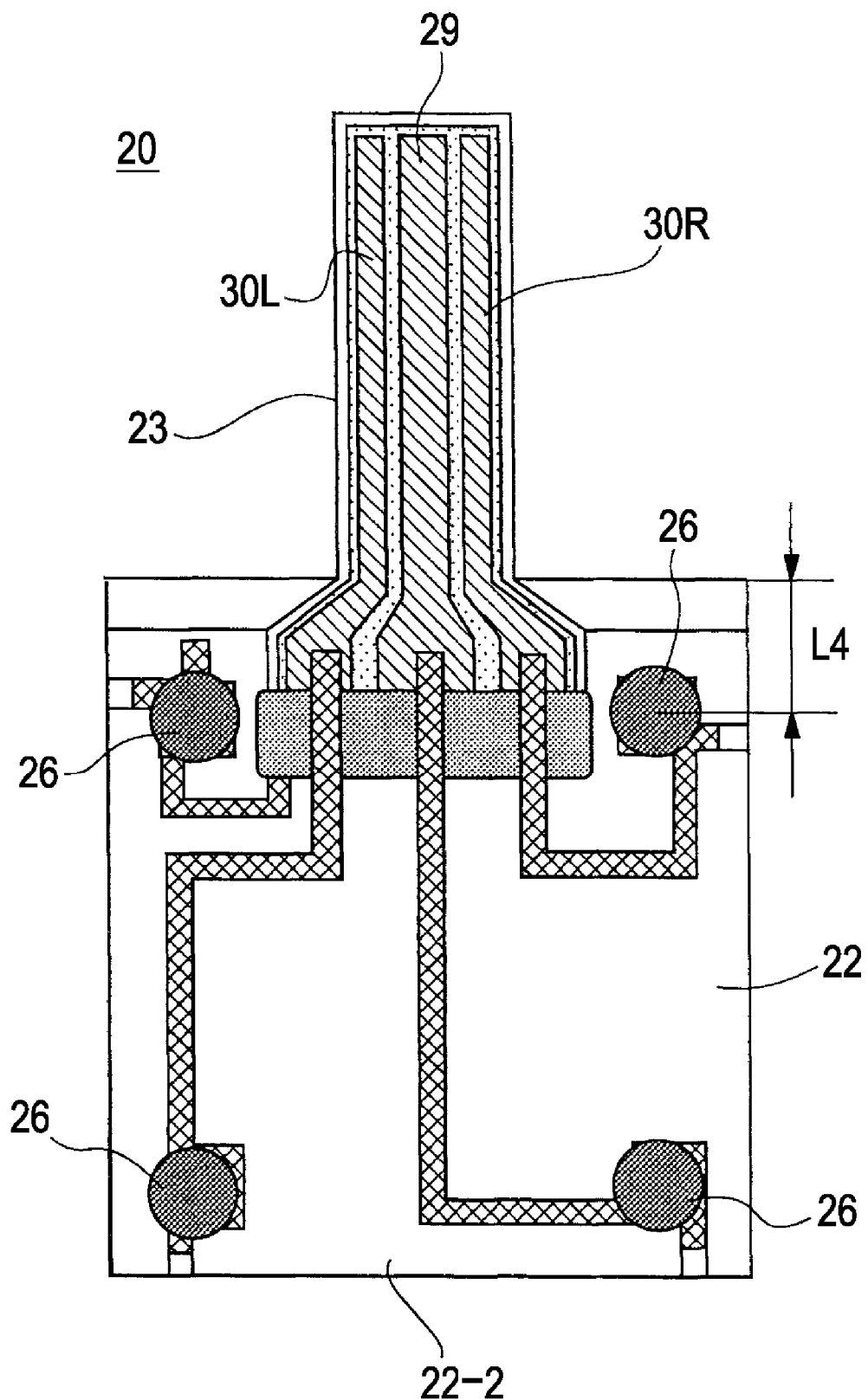
FIG. 67 is a bottom view of the vibration element and illustrates another practical example according to the third embodiment of the present invention.
Figure 68:
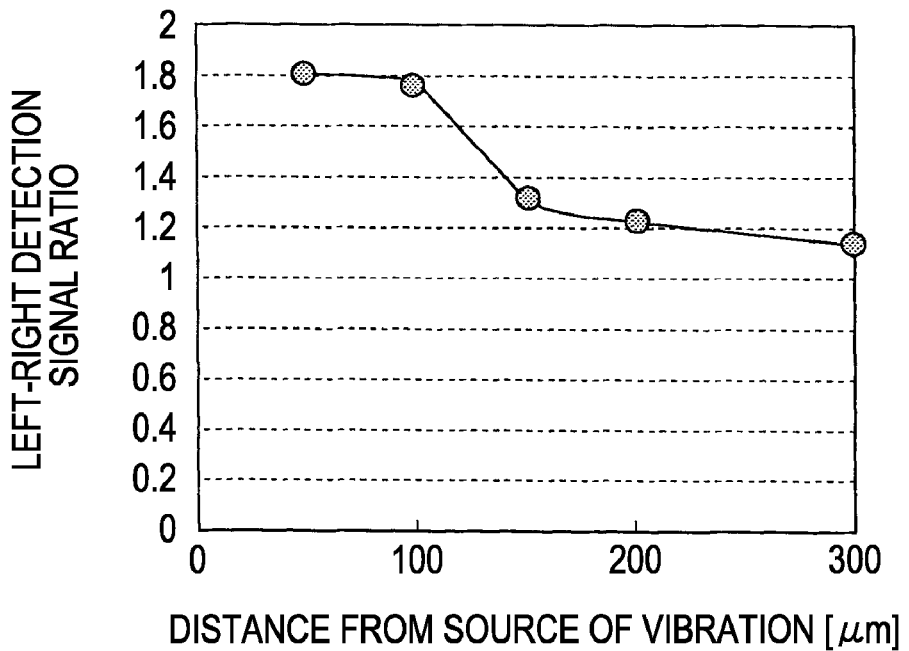
FIG. 68 is a characteristic diagram showing measurement results of the another practical example according to the third embodiment of the present invention.

Referring to FIG. 67, an output ratio between the left and right detection signals from each vibration element 20 in association with a distance L4 between each gold bump 26 positioned proximate to the vibrator portion 23 on the second main surface 22-2 and the root section of the vibrator portion 23 was measured in the same manner as above. The results obtained are shown in FIG. 68. FIG. 68 shows that the detection signals are less likely to change in response to external strain when the distance L4 from the root section of the vibrator portion 23 exceeds 150 µm. In this test, the distance between gold bumps 26 disposed at diagonal positions from each other is fixed at 600 µm.

Based on these results, with regard to the positions of the gold bumps 26 in each vibration element 20, it is important that the distance between gold bumps 26 disposed at diagonal positions from each other be 600 µm or less, or that each gold bump 26 be disposed distant from the root section of the vibrator portion 23 by a distance of 150 µm or more in order for the vibratory gyrosensor according to this embodiment to reduce the effect of external strain to maintain its original characteristics.

Fourth Embodiment

Load Buffering Layer

As described in the first embodiment, the vibration elements 20 are mounted on the supporting substrate 2 with the gold bumps 26 disposed therebetween. However, the supporting substrate 2 may warp in response to stress received from the control substrate of the main apparatus. In that case, the warpage may have a significant effect on the vibration elements 20 and may cause the vibration mode to change, thus leading to lower characteristics.

In this embodiment, a load buffering layer is provided between the supporting substrate 2 and the control substrate 100 or between each vibration element 20 and the supporting substrate 2 so that a stable vibration mode of the vibration element can be maintained even under external strain. The load buffering layer is not limited in structure as long as it can function as a buffer that absorbs external strain to inhibit the strain from being transmitted to the vibration element 20.

Figure 69:
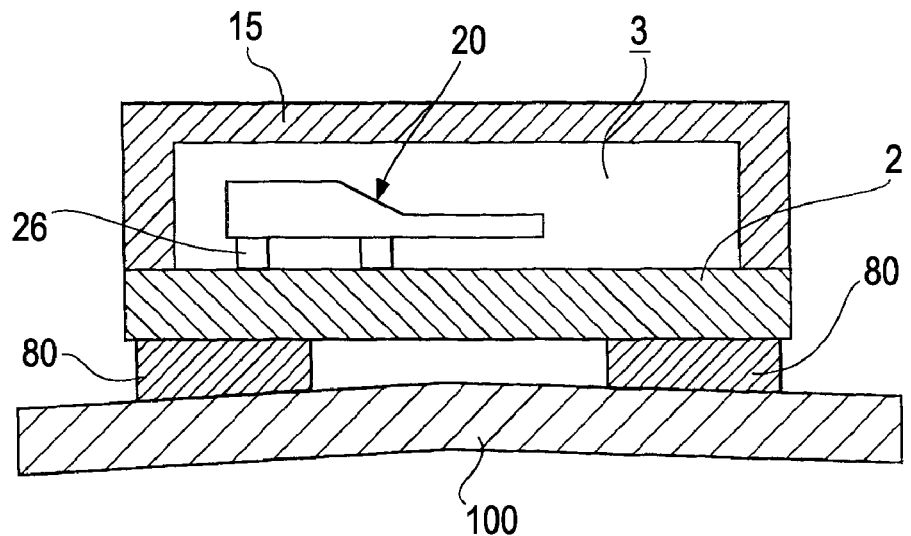
FIG. 69 is a schematic cross-sectional view of a vibratory gyrosensor according to a fourth embodiment of the present invention.

FIG. 69 illustrates a structural example in which the vibratory gyrosensor 1 and the control substrate 100 are electrically connected and mechanically joined to each other by means of anisotropic conductive layers 80. Each of the anisotropic conductive layers 80 is preferably defined by an anisotropic conductive film, but may alternatively be defined by an anisotropic conductive paste or an anisotropic conductive adhesive. An anisotropic conductive material is a high-performance material in which conductive particles are dispersed within a resin base material to produce conductivity in the pressure direction. The resin base material preferably has appropriate elasticity after it is solidified, and also has certain heat resistance against the reflow temperature (for example, 250° C.) of the components mounted on the control substrate 100.

Figure 70:
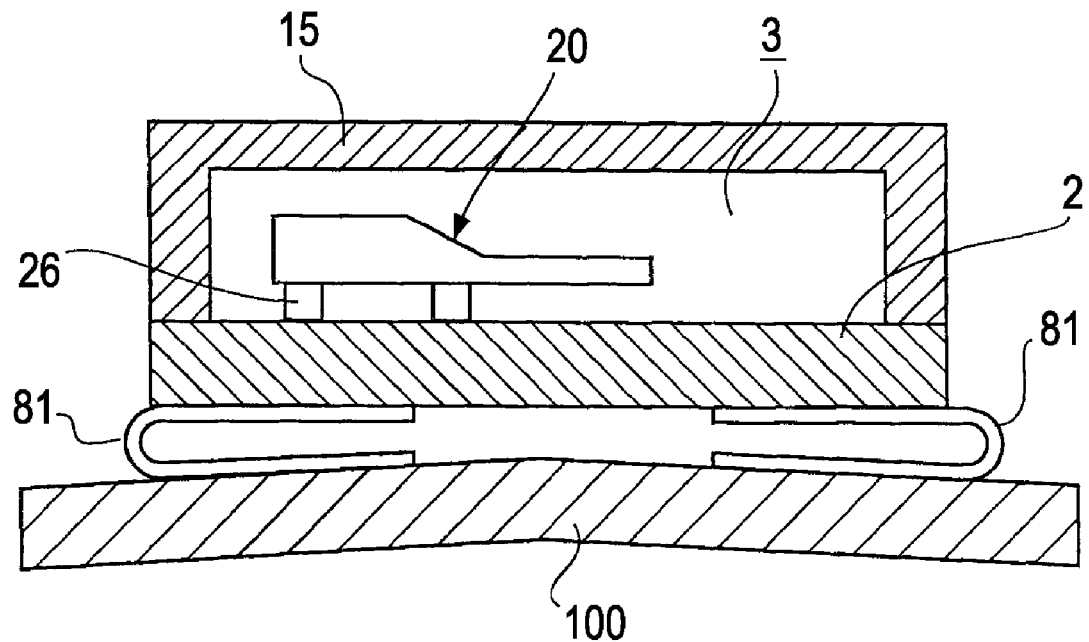
FIG. 70 is a schematic cross-sectional view of a vibratory gyrosensor according to the fourth embodiment of the present invention.

On the other hand, FIG. 70 illustrates another structural example in which the vibratory gyrosensor 1 and the control substrate 100 are electrically connected and mechanically joined to each other by means of flexible wiring substrates 81. The flexible wiring substrates of this type are each defined by a flexible printed-circuit board including a wiring layer disposed on a surface (or front and back surfaces) of a heat-resistant resin film composed of, for example, polyimide. By utilizing the flexibility of the flexible wiring substrates 81, external strain exerted on the control substrate 100 can be absorbed, whereby desired characteristics of the vibratory gyrosensor 1 can be maintained.

Figure 71:
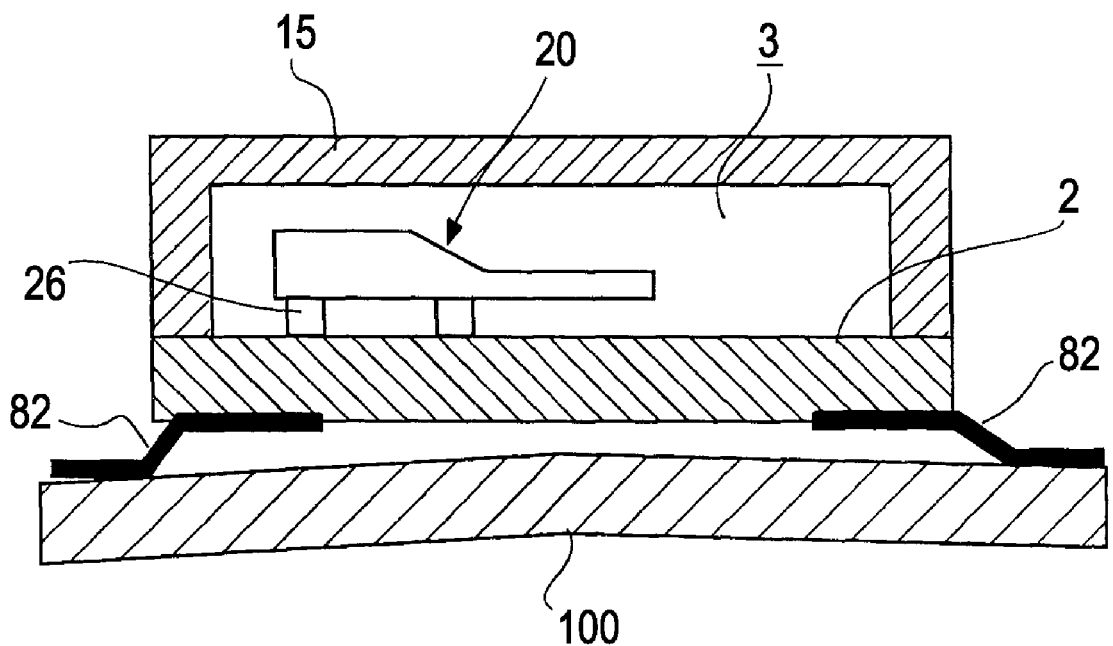
FIG. 71 is a schematic cross-sectional view of a vibratory gyrosensor according to the fourth embodiment of the present invention.

Each of the flexible wiring substrates 81 has connection terminals to be connected to the vibratory gyrosensor 1 and the control substrate 100 on a single surface thereof, and is folded back towards the back surface thereof so as to connect the vibratory gyrosensor 1 and the control substrate 100. This contributes to a reduction in the mounting area of the vibratory gyrosensor 1. On the other hand, FIG. 71 shows alternative flexible wiring substrates 82 whose first surfaces are connected to the vibratory gyrosensor 1 and whose second surfaces are connected to the control substrate 100. In that case, the mounting height of the vibratory gyrosensor 1 with respect to the control substrate 100 can be reduced.

Figure 72:
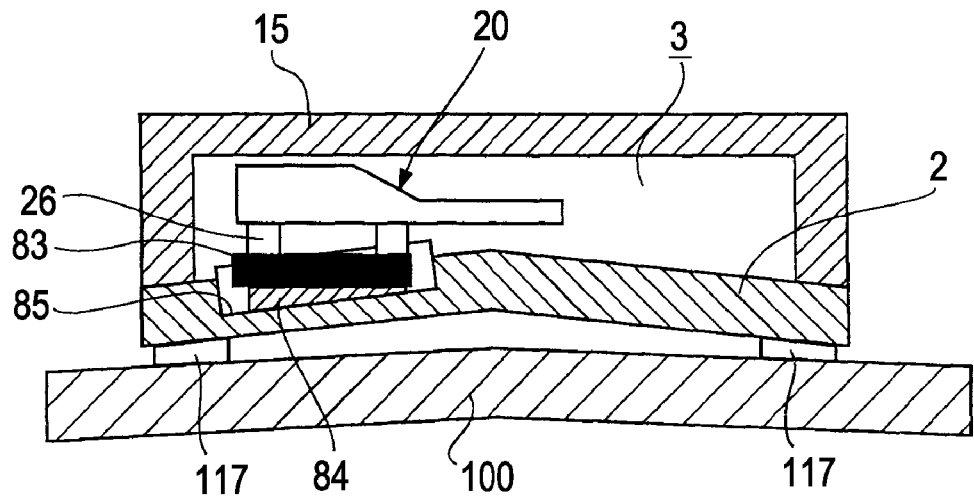
FIG. 72 is a schematic cross-sectional view of a vibratory gyrosensor according to the fourth embodiment of the present invention.

FIG. 72 illustrates another structural example in which each vibration element 20 is mounted on the supporting substrate 2 in a different manner from the above examples. Specifically, the vibration element 20 is mounted above a support plate 83 with the gold bumps 26 disposed therebetween, and the support plate 83 is electrically and mechanically joined to the supporting substrate 2 with an anisotropic conductive layer 84 disposed therebetween. Thus, the vibration element 20 is mounted above the supporting substrate 2 in a floating-island-like fashion. The support plate 83 may be, for example, a metallic plate composed of aluminum, or a ceramic plate, but the material thereof is not particularly limited as long as it can allows for a sufficient Q value for the vibration element. Similar to the above examples, the anisotropic conductive layer 84 has a function for absorbing strain transmitted from the supporting substrate 2 towards the vibration element 20. In the example shown in the drawing, the mounting area of the supporting substrate 2 is provided with a recess 83 having a predetermined depth in order to reduce the mounting height of the vibration element 20 with respect to the supporting substrate 2.

Figure 73:
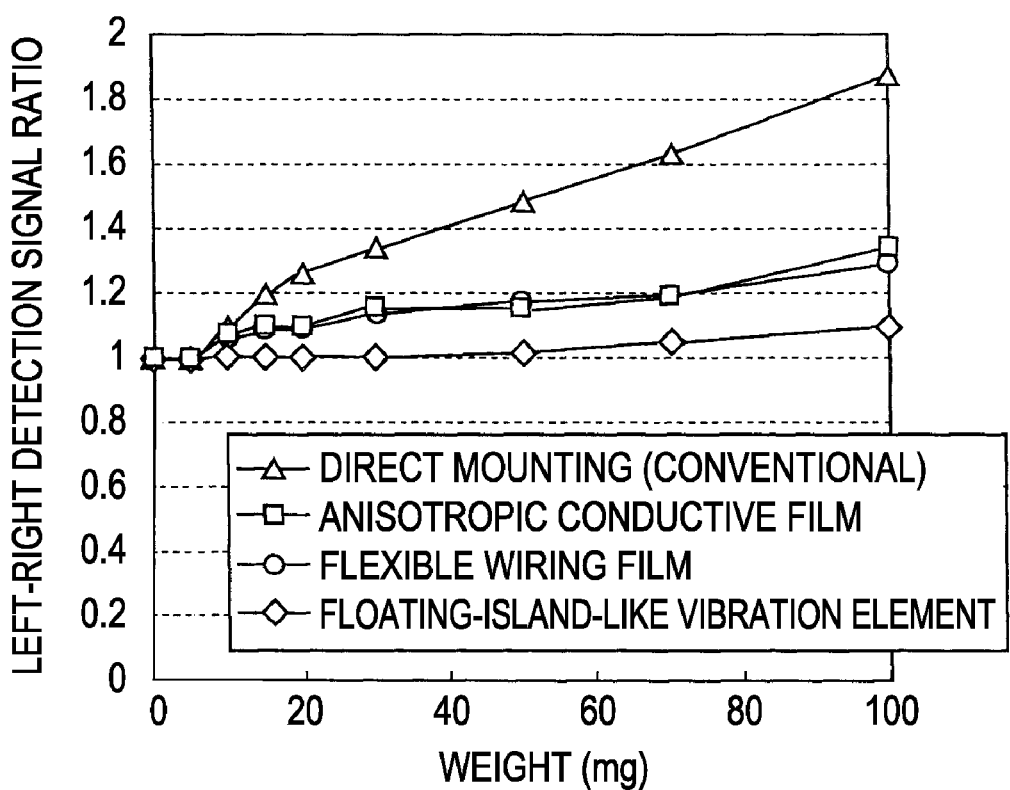
FIG. 73 is a characteristic diagram showing measurement results of the practical examples according to the fourth embodiment of the present invention.

FIG. 73 illustrates test results in accordance with this embodiment. In this test, a 5-cm-square glass epoxy substrate was used as the control substrate 100, and three of the four corners thereof were fixed. A load was then applied to the remaining one corner thereof to produce strain. An output ratio between the left and right detection signals of each vibration element 20 was measured. Referring to FIG. 73, in a case where the vibration element 20 is directly mounted on the supporting substrate 2, the vibration mode changes when the control substrate is under strain in response to the load, and the balance between left and right detection signals changes significantly.

In contrast, changes in the signals are slightly or scarcely seen when the vibratory gyrosensor 1 is mounted on the control substrate 100 by means of anisotropic conductive films or flexible wiring substrates or when the vibration elements 20 are mounted above the supporting substrate 2 in a floating-island-like fashion. It is therefore confirmed that the strain applied to the control substrate 100 is less likely to be transmitted to the vibration elements 20.

Fifth Embodiment

Groove Formation in Vibration Elements

As described in the first embodiment, the vibration elements 20 are mounted on the supporting substrate 2 with the gold bumps 26 disposed therebetween. However, the supporting substrate 2 may warp in response to stress received from the control substrate of the main apparatus. In that case, the warpage may have a significant effect on the vibration elements 20 and may cause the vibration mode to change, thus leading to lower characteristics.

In this embodiment, the second main surface 22-2 of each vibration element 20 is provided with grooves for inhibiting transmission of strain so that a stable vibration mode of the vibrator portion 23 can be maintained even under external strain. Consequently, high detection accuracy can be attained.

Figure 74:
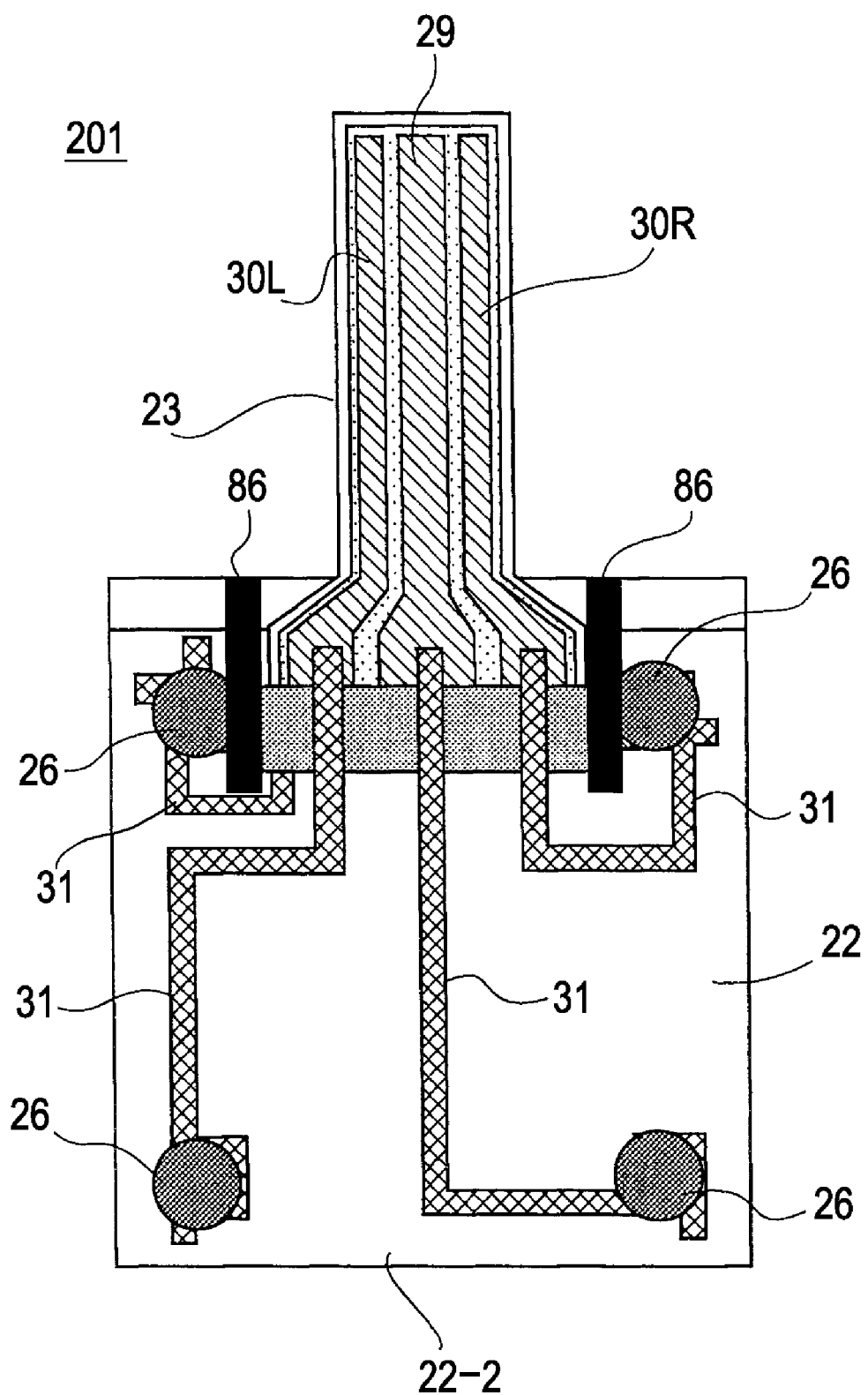
FIG. 74 is a bottom view of one of vibration elements according to a fifth embodiment of the present invention.

Referring to FIG. 74, a vibration element 201 is similar to that in the first embodiment and includes a base portion 22 provided with gold bumps 26, and a vibrator portion 23 protruding from the base portion 22 in a cantilever manner. The mounting surface of the base portion 22 is provided with leads 31, which electrically connect a reference electrode, a drive electrode 29, and left and right detection electrodes 30L, 30R disposed on the vibrator portion 23 to the gold bumps 26 disposed on corresponding terminals.

The vibration element 201 according to this embodiment is provided with grooves 86 for inhibiting external-strain transmission from the gold bumps 26 joined to the supporting substrate to the vibrator portion 23. The grooves 86 are disposed between the root section (base end) of the vibrator portion 23 and a pair of the gold bumps 26 (terminal positions) on the second main surface 22-2 of the base portion 22 that are disposed proximate to the vibrator portion 23. The grooves 86 isolate the vibrator portion 23 from the base portion 22 so as to reduce the effect of external strain, whereby a sufficient S/N ratio (signal-to-noise ratio) can be attained.

Figure 75:
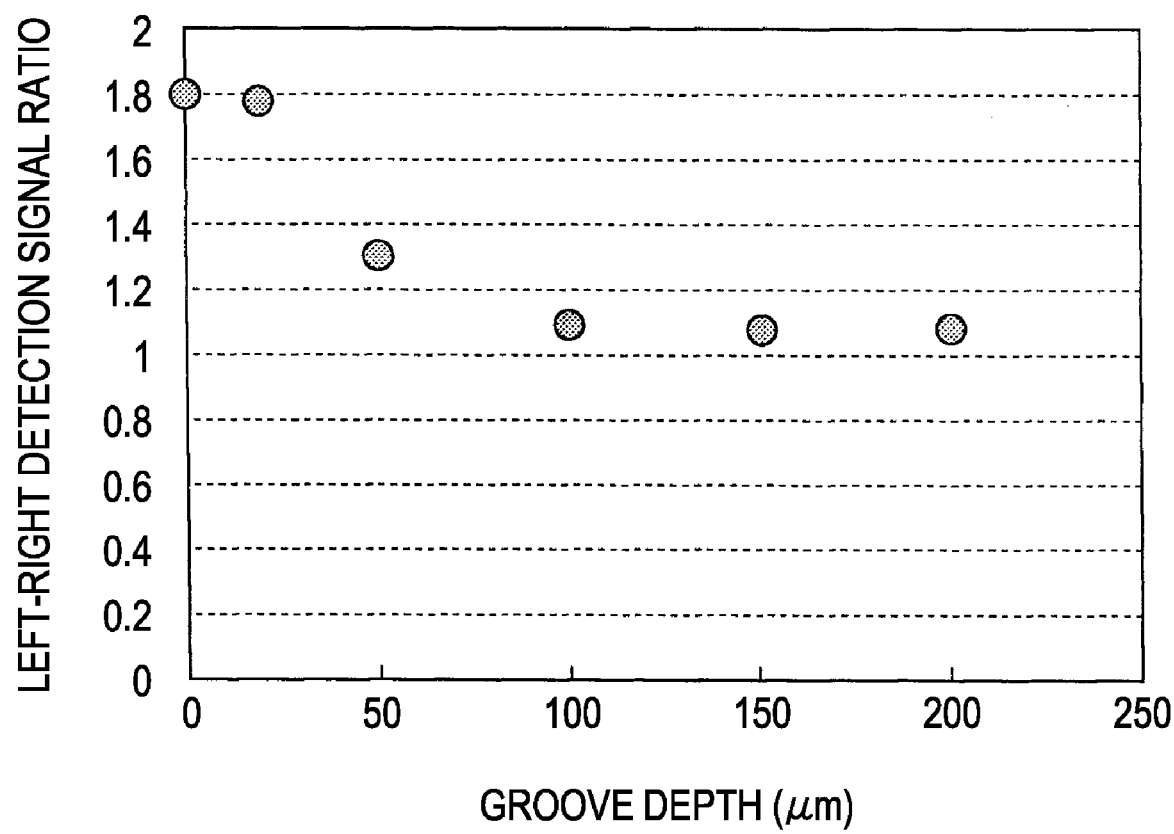
FIG. 75 is a characteristic diagram showing measurement results of a practical example according to the fifth embodiment of the present invention.

Each of the grooves 86 provided in the base portion 22 is provided in an area free of the leads 31 and the various types of the electrode layers, and crosses a line that connects the root section of the vibrator portion 23 to the corresponding one of the gold bumps 26 of the pair disposed proximate to the vibrator portion 23. FIG. 75 illustrates test results obtained after measuring a change in the behavior of the vibration element when the supporting substrate is under strain. The relationship between the depth of the grooves 86 and an output ratio of the left and right detection signals was determined in the same manner as in the third embodiment. Based on the results shown in FIG. 75, when the groove depth is 50

µm or more, or more preferably, 100 µm or more, a difference between the left and right detection signals becomes zero, thereby stable vertical vibration can be maintained. A groove depth of 100 µm corresponds to the thickness of the vibrator portion 23.

Figure 76:
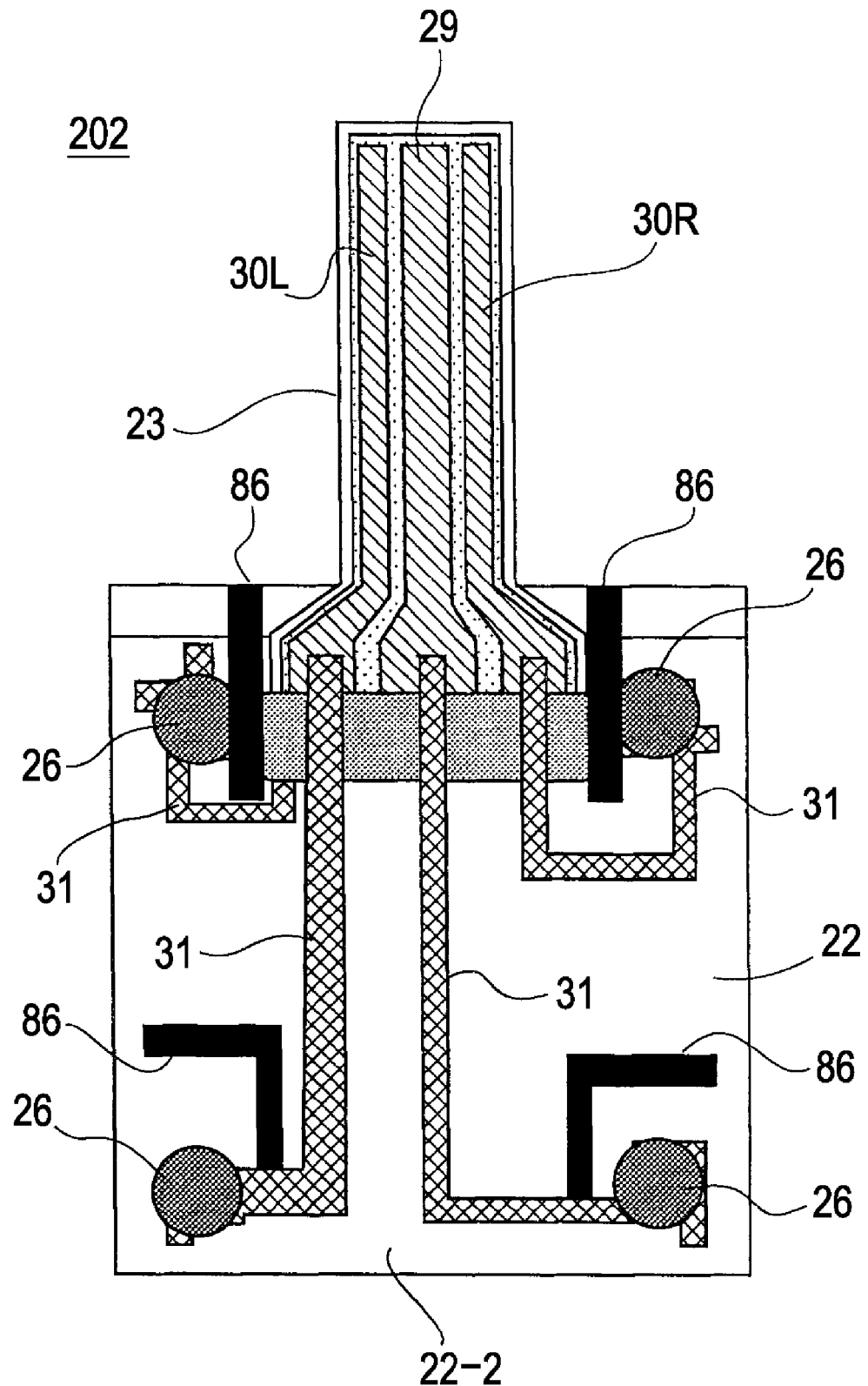
FIG. 76 is a bottom view of a modified example of the vibration element according to the fifth embodiment of the present invention.

The positions of the grooves 86 are not limited to the positions near the pair of gold bumps 26 disposed proximate to the vibrator portion 23, as shown in FIG. 74. As in a vibration element 202 shown in FIG. 76, similar grooves 86 may be provided near the other pair of gold bumps 26 disposed proximate to the vibrator portion 23 so as to cross lines connected to the root section of the vibrator portion 23. The grooves 86 do not have to be linear-shaped, and may alternatively be, for example, bent-shaped or curve-shaped. Furthermore, for example, the first end portions of the grooves 86 may extend toward the sides of the base portion 22 as shown in FIG. 74 so that the effect of the grooves 86 for inhibiting transmission of external strain is further enhanced.

Figure 77:
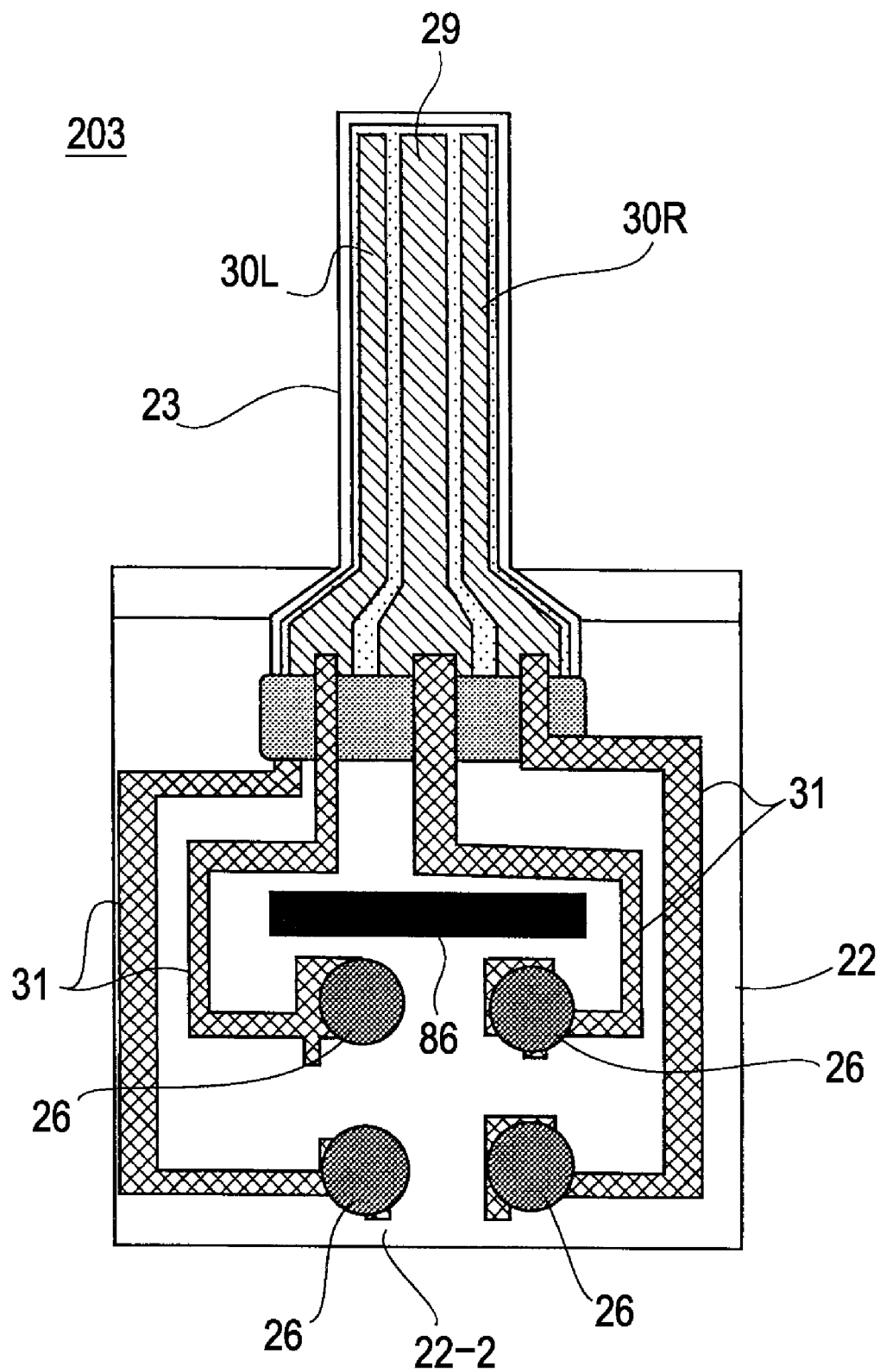
FIG. 77 is a bottom view of another modified example of the vibration element according to the fifth embodiment of the present invention.

FIG. 77 shows another example of the vibration element 202 in which the gold bumps 26 are disposed close to each other on the second main surface 22-2 of the base portion 22. In this example, only one groove 86 for inhibiting strain transmission is provided. The groove 86 extends linearly and crosses lines that connect the root section of the vibrator portion 23 to the gold bumps 26. This configuration allows for an achievement of the same effect as that achieved by the configurations shown in FIGS. 74 and 76.

Sixth Embodiment

Groove Formation in Mounting Region of IC Circuit Element

Figure 78A:
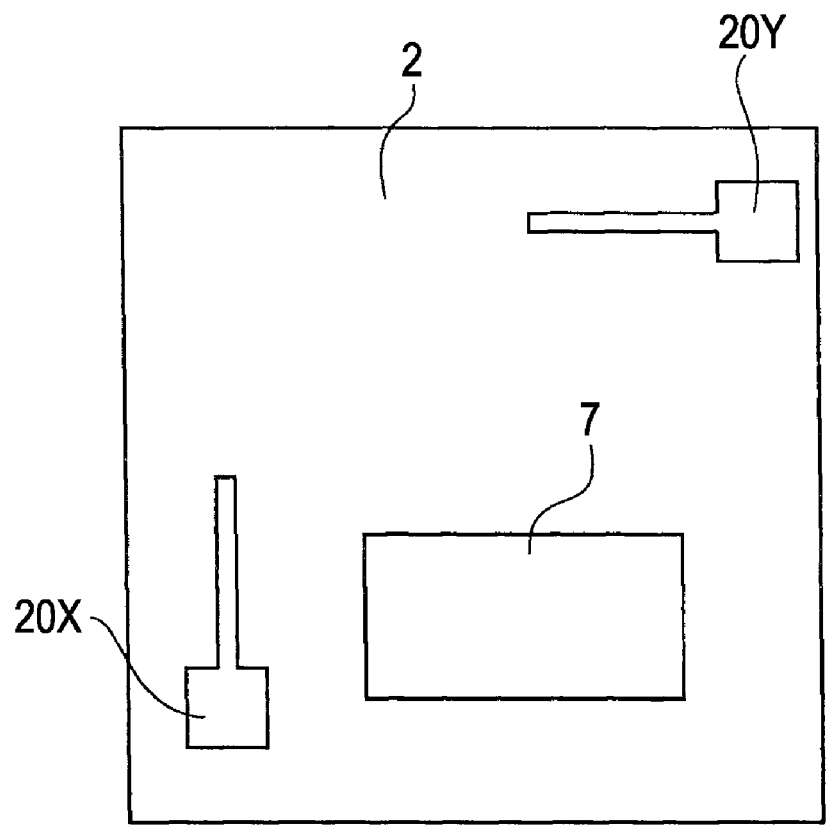
FIG. 78A is a plan view showing a relevant portion of a typical vibratory gyrosensor used for describing a sixth embodiment of the present invention.
Figure 78B:
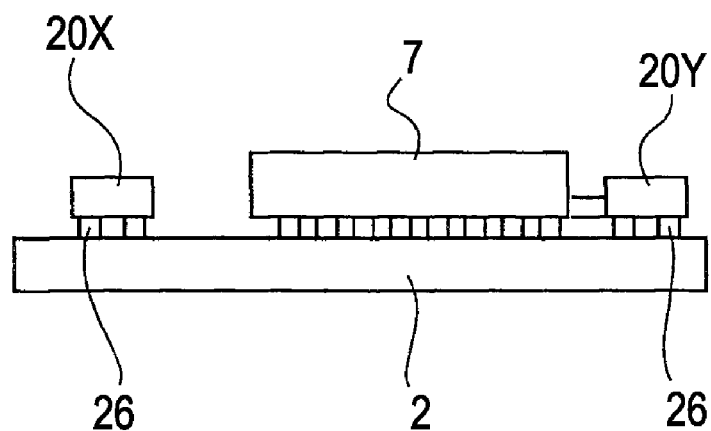
FIG. 78B is a side view showing a relevant portion of the typical vibratory gyrosensor used for describing the sixth embodiment of the present invention.

As described in the first embodiment, the vibration elements 20 are mounted on the supporting substrate 2 with the gold bumps 26 disposed therebetween. Referring to FIGS. 78A and 78B, the supporting substrate 2 has mounted thereon components such as the IC circuit element 7 in addition to the vibration elements 20 (20X, 20Y). These components are generally mounted by reflow soldering.

Thus, when multi-legged components such as the IC circuit element 7 are reflowed after flip-chip mounting of the vibration elements 20, the supporting substrate 2 may become warped in response to thermal stress. The warpage may have an adverse effect on the vibration elements 20 to cause the vibration mode to change, thus leading to lower characteristics. Furthermore, when the supporting substrate 2 having the vibration elements 20 disposed thereon is reflowed onto the control substrate of the main apparatus, the junction between the IC circuit element 7 and the supporting substrate 2 may be subject to reflow again. Thus, the warpage of the supporting substrate 2 occurring in the mounting process, for example, may have an adverse effect on the vibration elements 20.

Figure 79A:
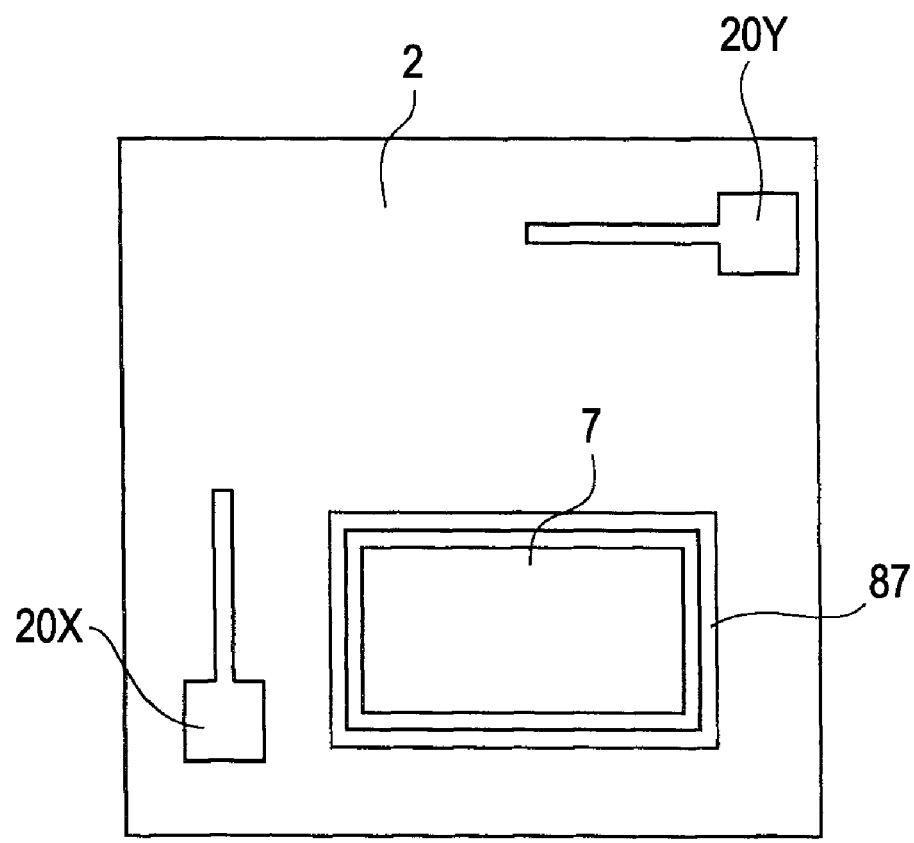
FIG. 79A is a plan view showing a relevant portion of a vibratory gyrosensor according to the sixth embodiment of the present invention.
Figure 79B:
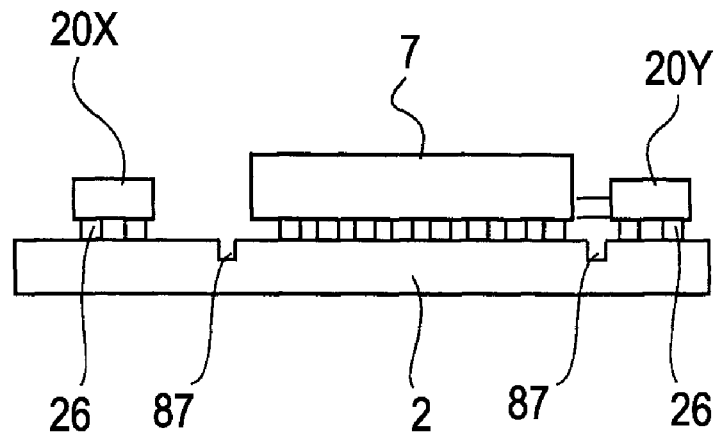
FIG. 79B is a side view showing a relevant portion of the vibratory gyrosensor according to the sixth embodiment of the present invention.

Referring to FIGS. 79A and 79B, in this embodiment, the mounting region of the IC circuit element 7 on the supporting substrate 2 is surrounded by a groove 87. The groove 87 inhibits thermal stress or strain, which may be generated when the IC circuit element 7 is being reflowed or when the supporting substrate 2 is being reflowed, from being transmitted towards the mounting regions of the vibration elements 20, thereby preventing the vibration characteristics of the vibration elements 20 from deteriorating. In addition to the mounting region of the IC circuit element 7, the groove 87 of this type may be provided in the mounting regions of other multi-legged components.

FIG. 80 illustrates the relationship between the number of times a reflow process is performed on the supporting substrate 2 and an output-value change between the left and right detection signals from each vibration element 20 in accordance with different depths of the groove 87. The vertical axis shows absolute values of an output-value change (which is zero before reflow) between the left and right detection signals, which is induced when the vibration mode of each vibration element changes in response to transmission of strain. Based on the results shown in FIG. 80, by giving the groove 87 surrounding the mounting region of the IC circuit element 7 a depth of 50 µm or more, an output-value change of each vibration element can be suppressed, as compared with a case where the groove is not provided. In particular, an output-value change of each vibration element 20 can be suppressed by giving the groove 87 a depth of 100 µm or more.

Seventh Embodiment

Mounting Position of IC Circuit Element

This embodiment is related to the sixth embodiment described above and is directed to a study on the mounting region of the IC circuit element 7.

Figure 81:
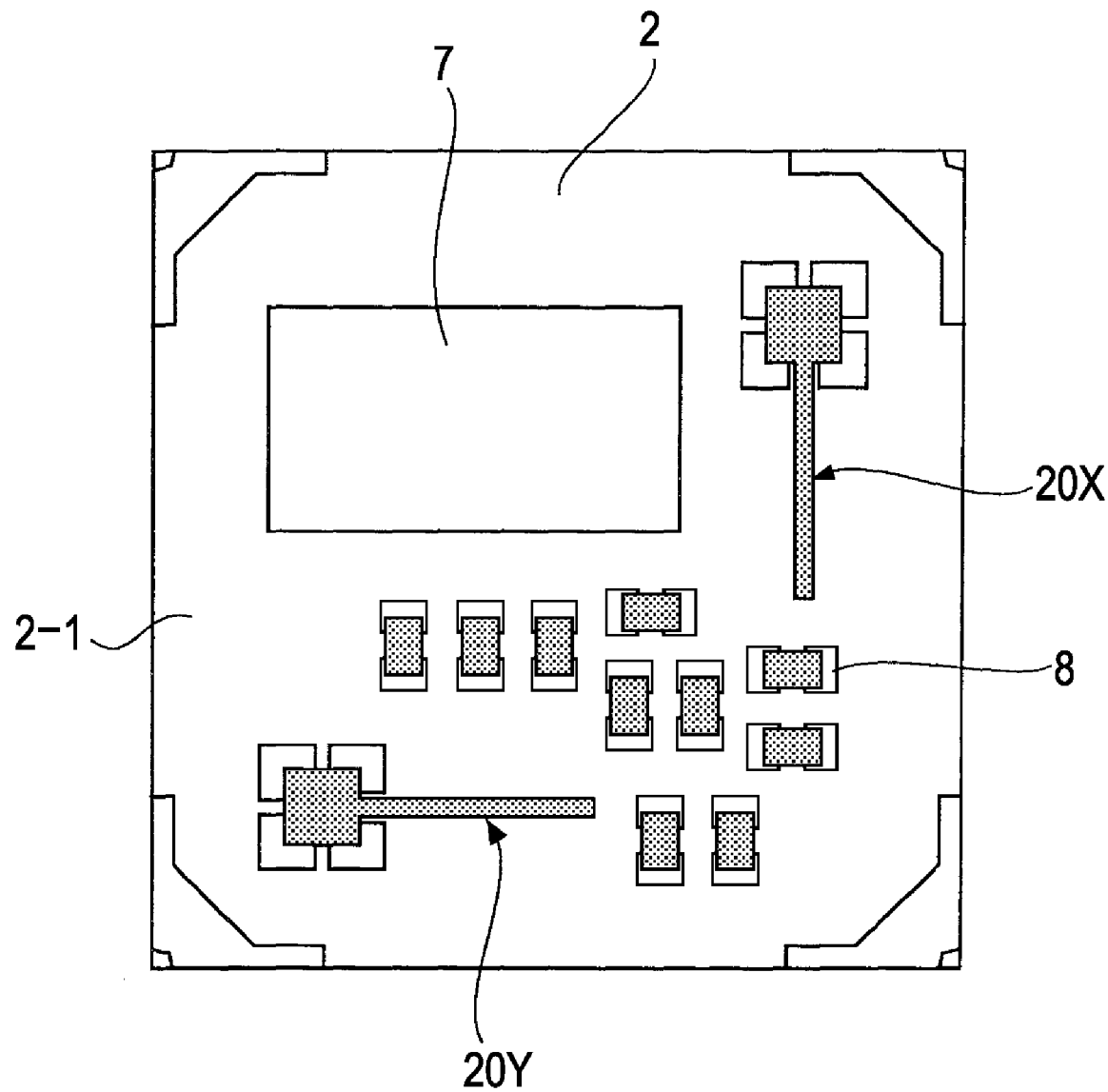
FIG. 81 is a plan view showing a relevant portion of a typical vibratory gyrosensor used for describing a seventh embodiment of the present invention.

In the first embodiment, as shown in FIG. 81, the IC circuit element 7 is mounted on the supporting substrate 2 near a corner region thereof that is different from the corner regions in which the vibration elements 20 (20X, 20Y) are mounted. Moreover, the electronic components 8 are concentrated at one side of the supporting substrate 2. This causes the thermal stress and thermal strain produced at the time of a reflow process to spread unevenly over the plane of the supporting substrate 2, thus preventing the thermal stress or the like from acting evenly on the mounting regions of the pair of vibration elements 20X, 20Y. This may lead to unbalanced detection accuracy between the vibration elements.

Figure 82:
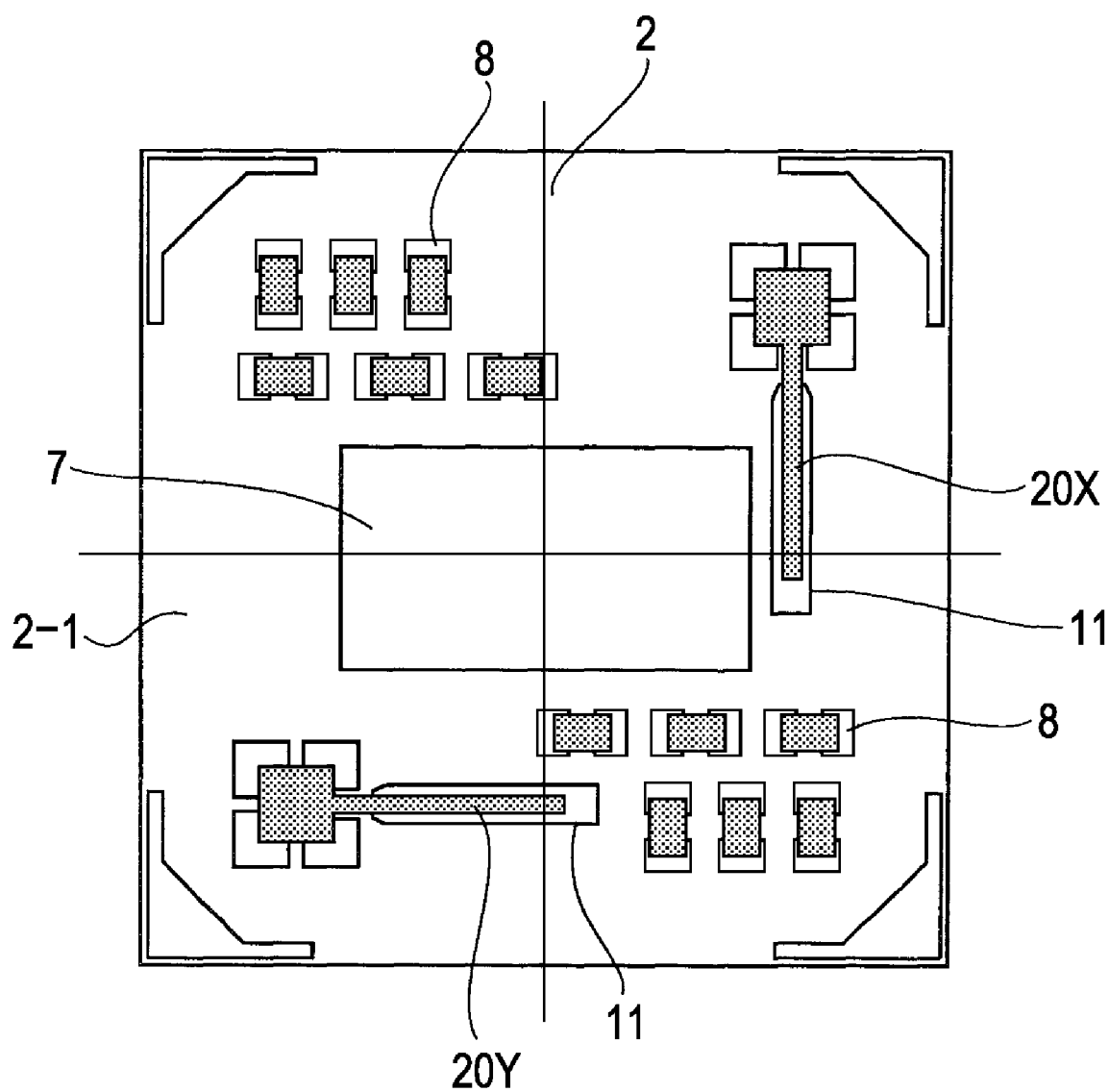
FIG. 82 is a plan view showing a relevant portion of a vibratory gyrosensor according to the seventh embodiment of the present invention.

Referring to FIG. 82, in this embodiment, a main mounting region of the IC circuit element is located in an intermediate section of a line that connects the mounting regions of the pair of vibration elements 20. Thus, the thermal stress exerted on the supporting substrate 2 during the reflow process for mounting the IC circuit element 7 or during the reflow process for mounting the supporting substrate 2 on the control substrate can be evenly distributed to the pair of vibration elements 20, thereby a difference in characteristics between the vibration elements can be suppressed.

As shown in FIG. 82, the mounting region of the IC circuit element 7 is preferably determined such that the IC circuit element having a rectangular shape in plan view is disposed at an intermediate point (symmetrical point) between the pair of vibration elements 20. However, the IC circuit element 7 may actually be disposed within a certain region that has the mounting region of the IC circuit element 7 shown in the drawing as the center. In this case, the term "certain region" refers to a region in which, when the plane of the supporting substrate 2 is divided into first to fourth quadrants, at least a portion of the mounting region of the IC circuit element 7 belongs to each of the quadrants.

Furthermore, as shown in FIG. 82, in addition to the mounting region of the IC circuit element 7, the mounting regions of the other electronic components 8 are preferably determined such that the electronic components 8 are evenly or symmetrically distributed with respect to the vibration elements 20. Moreover, the mounting regions of the electronic components 8 preferably include the same number of components. Consequently, the stress produced in the reflow process for the other electronic components 8 as well as the IC circuit element 7 can be evenly distributed to the vibration elements 20.

FIG. 83 illustrates the relationship between the number of times a reflow process is performed on the supporting substrate 2 and an output difference between the pair of vibration elements in accordance with different mounting regions of the IC circuit element 7. The smaller the output difference between the vibration elements, the more uniform the amount of strain transmitted to the vibration elements, whereas the larger the output difference, the greater the difference in the amount of strain transmitted to the vibration elements. The output difference is zero before reflow. The embodiment according to the present invention shown in FIG. 82 has substantially no output difference between the vibration elements and is obviously advantageous to a comparative example (FIG. 81) in which the IC circuit element 7 is localized in a corner region of the supporting substrate 2.

Eighth Embodiment

Positioning Regions for External Connection Terminals and Vibration Elements

Figure 84A:
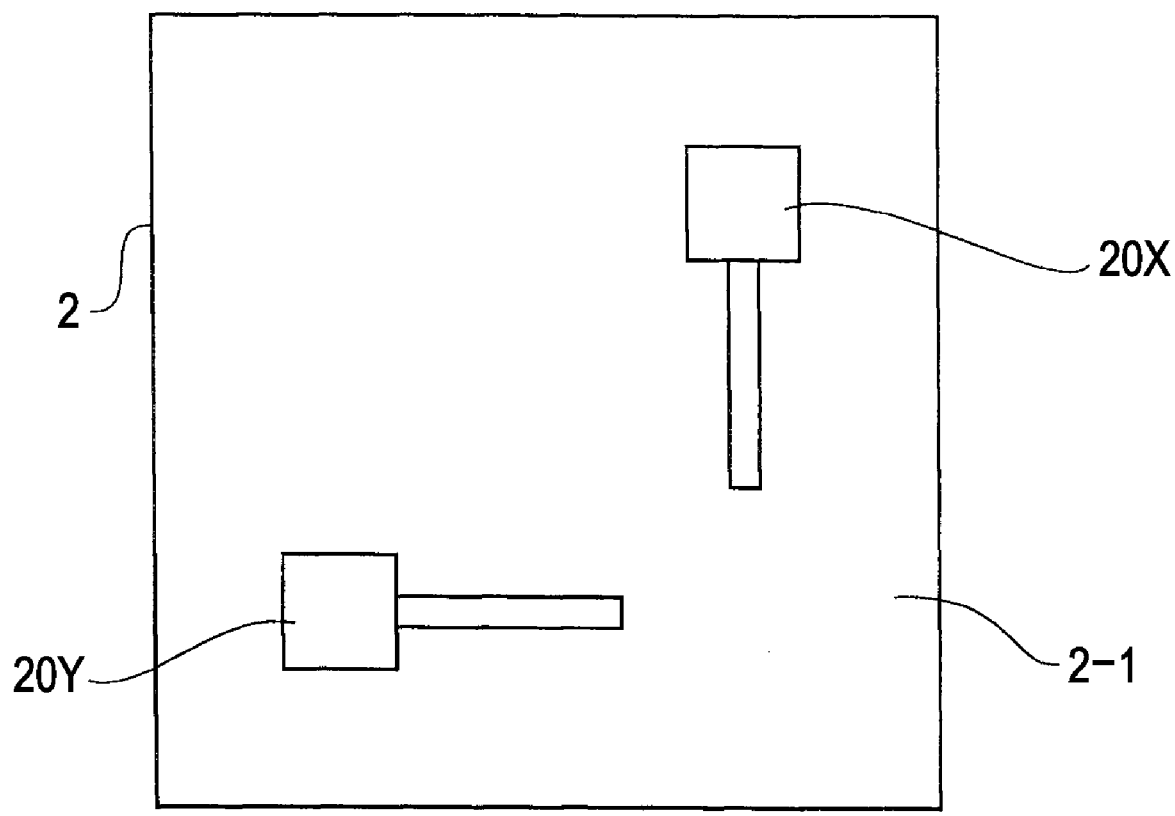
FIG. 84A is a plan view showing a relevant portion of a typical vibratory gyrosensor used for describing an eighth embodiment of the present invention.
Figure 84B:
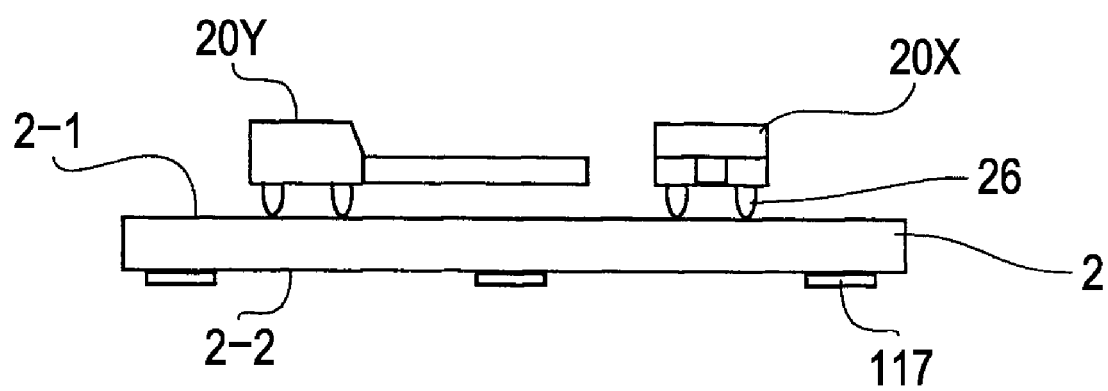
FIG. 84B is a side view showing a relevant portion of the typical vibratory gyrosensor used for describing the eighth embodiment of the present invention.
Figure 84C:
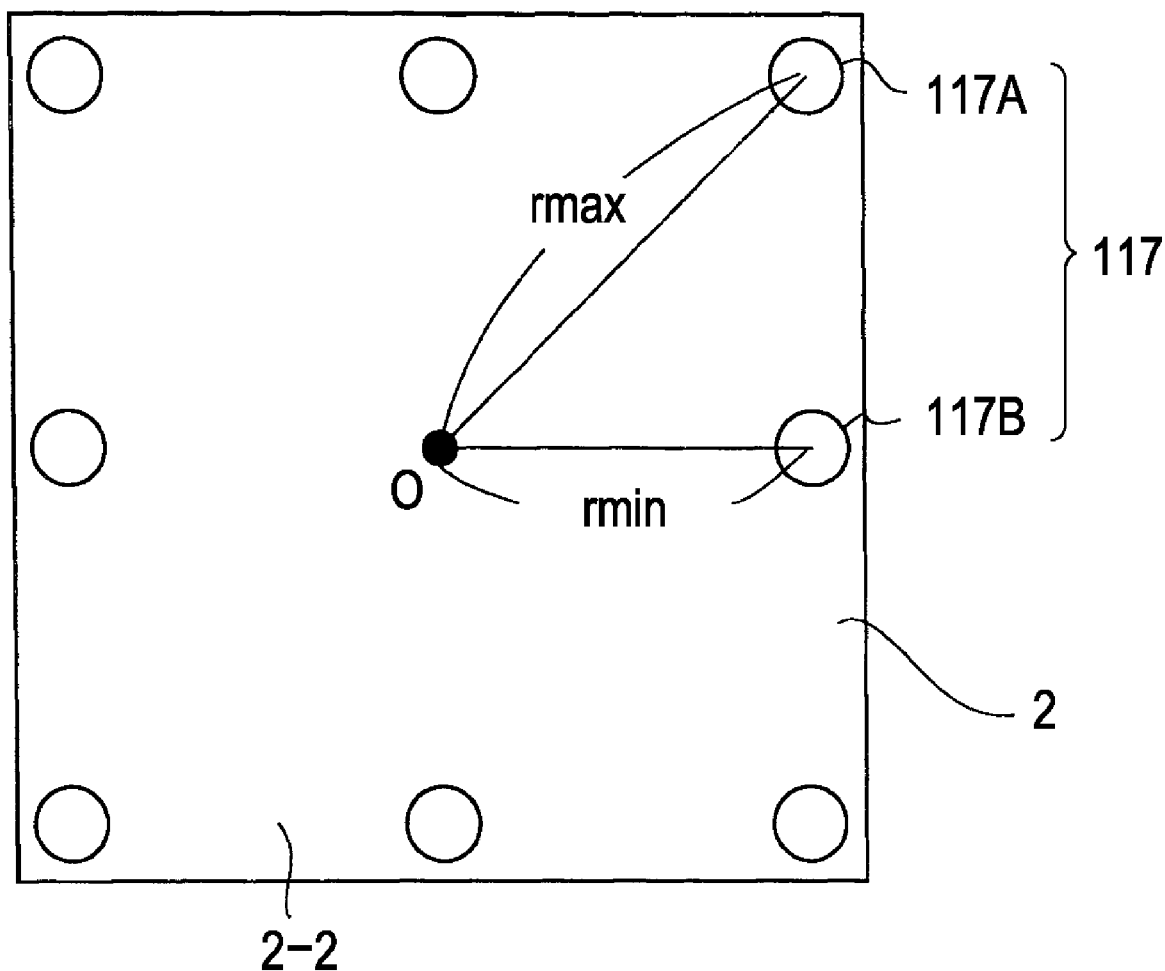
FIG. 84C is a bottom view showing a relevant portion of the typical vibratory gyrosensor used for describing the eighth embodiment of the present invention.

Referring to schematic diagrams of FIGS. 84A to 84C, the first main surface 2-1 of the supporting substrate 2 included in the vibratory gyrosensor 1 has mounted thereon the vibration elements 20 (20X, 20Y) and electronic components such as the IC circuit element (not shown). The second main surface 2-2 opposite to the first main surface 2-1 is provided with a plurality of external connection terminals (mounting terminals) 117 which are to be mounted to the control substrate of the main apparatus. Generally, the central section of the supporting substrate 2 is preferably used as a wiring region of an internal circuit in order to achieve higher wiring efficiency. Therefore, the external connection terminals 117 are disposed along the outer periphery of the supporting substrate 2.

However, with this arrangement of the external connection terminals 117, the distance between the center O of the supporting substrate 2 and each external connection terminal 117 is large, thus leading to an increase in the amount of strain during the reflow process for mounting the supporting substrate 2. Moreover, as shown in FIG. 84C, external connection terminals 117A positioned at the corners of the supporting substrate 2 are more distant from the center O of the supporting substrate 2 than external connection terminals 117B positioned at intermediate points on the sides of the supporting substrate 2. This leads to an uneven distribution of strain exerted on the plane of the supporting substrate 2 at the time of the reflow process. In particular, the strain concentrates on the external connection terminals 117A disposed at diagonal positions from each other (i.e. near the four corners).

With the arrangement example of the external connection terminals 117 shown in FIGS. 84A to 84C, large magnitude of strain tends to occur frequently at the time of the reflow process for mounting the supporting substrate 2 and can have an adverse effect on the vibration elements 20 disposed on the supporting substrate 2.

Figure 85:
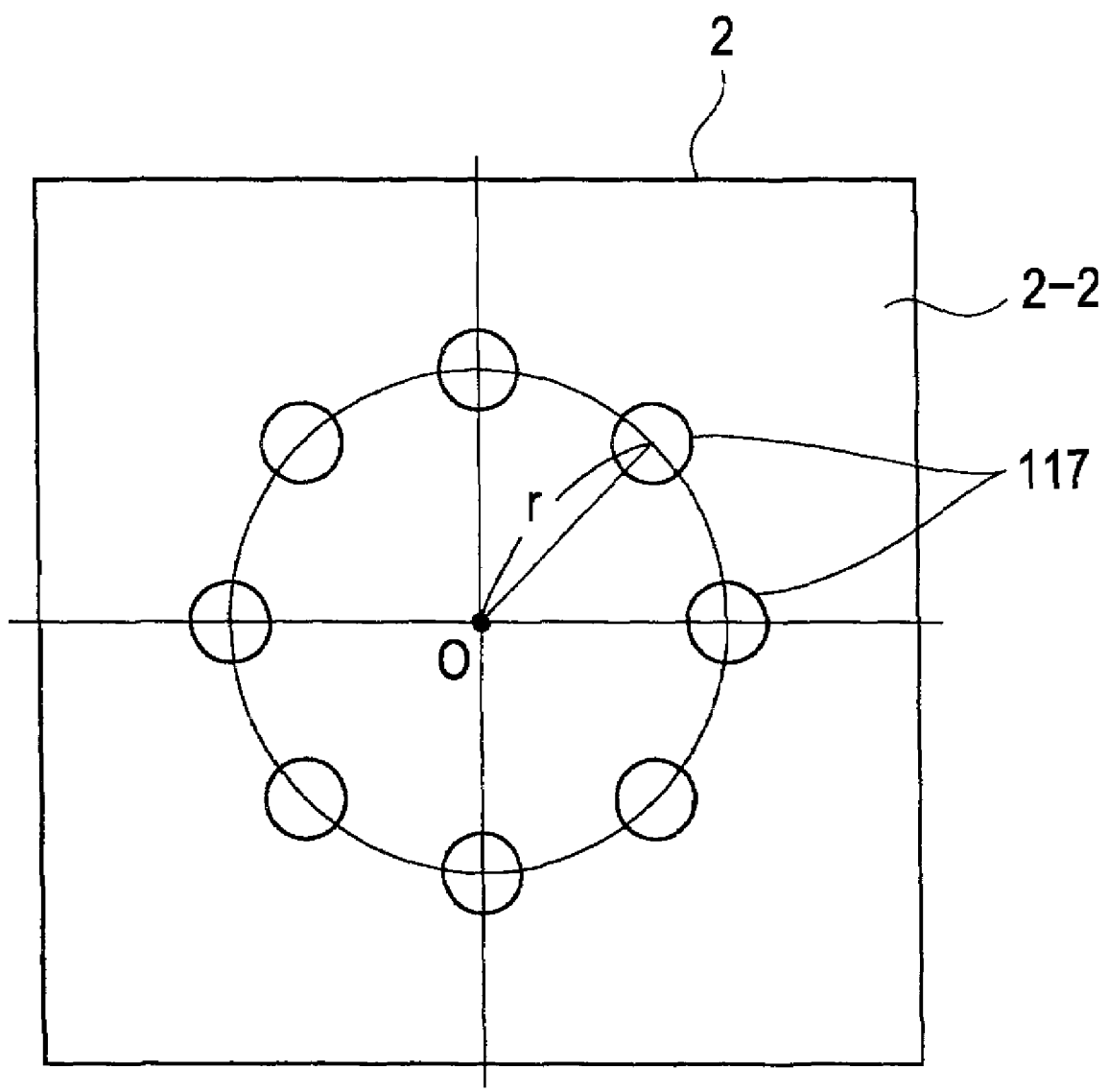
FIG. 85 is a bottom view of the supporting substrate according to the eighth embodiment of the present invention.

Referring to FIG. 85, in this embodiment, the plurality of external connection terminals 117 disposed on the second main surface 2-2 of the supporting substrate 2 are arranged concyclically along a circle on the supporting substrate 2, the circle defining a main region in which each external connection terminal 117 is disposed. Specifically, in the example shown in FIG. 85, the external connection terminals are equiangularly arranged along a circumference of a circle having a radius r with respect to the center O of the supporting substrate 2 as the center of the circle.

Accordingly, by arranging the external connection terminals 117 with an equal distance from the center O of the supporting substrate 2, the strain produced in the supporting substrate 2 at the time of the reflow process for mounting the supporting substrate 2 can be evenly distributed, and the amount of strain produced in the supporting substrate can be reduced. Accordingly, an adverse effect on the vibration elements 20 above the supporting substrate 2 can be reduced, thereby ensuring a stable vibration detecting operation.

The radius r of the circle along which the external connection terminals 117 are arranged is preferably set to the smallest value possible in view of, for example, the required mounting accuracy (i.e. the parallelism, and the distance between terminals).

Figure 86A:
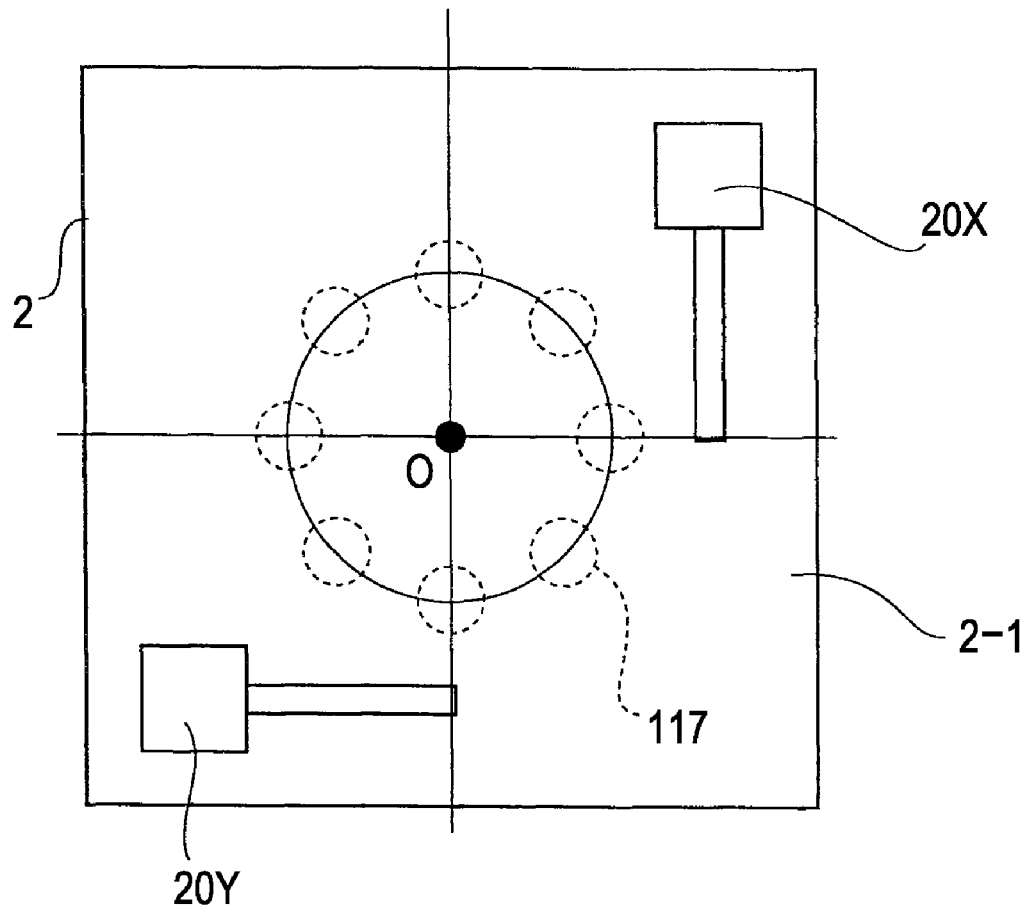
FIG. 86A is a plan view showing a relevant portion of the vibratory gyrosensor according to the eighth embodiment of the present invention.
Figure 86B:
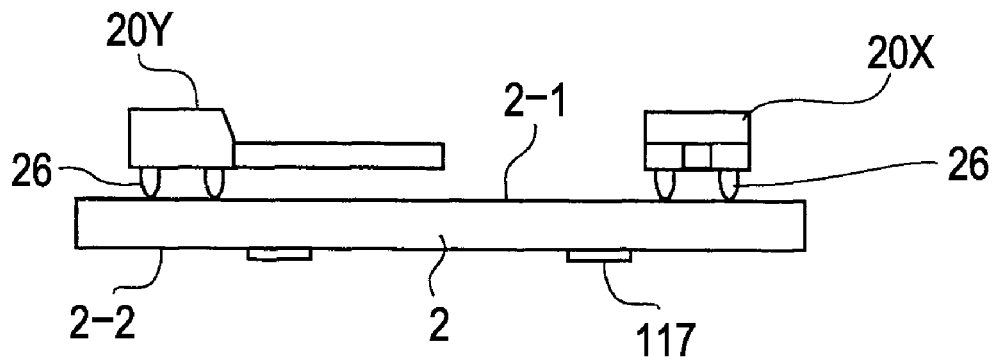
FIG. 86B is a side view showing a relevant portion of the vibratory gyrosensor according to the eighth embodiment of the present invention.

Referring to FIGS. 86A and 86B, the vibration elements 20 are preferably disposed closer to the outer periphery of the supporting substrate 2 than to the regions in which the external connection terminals 117 are provided. This is due to the fact that the amount of strain exerted on the supporting substrate 2 is smaller towards the outer periphery than towards the inner area within the regions having the external connection terminals 117. Accordingly, an adverse effect on the vibration elements 20 can be reduced. In this case, although the external connection terminals 117 are preferably arranged in a concyclic manner, the arrangement of the external connection terminals 117 is not limited to this manner.

Figure 87:
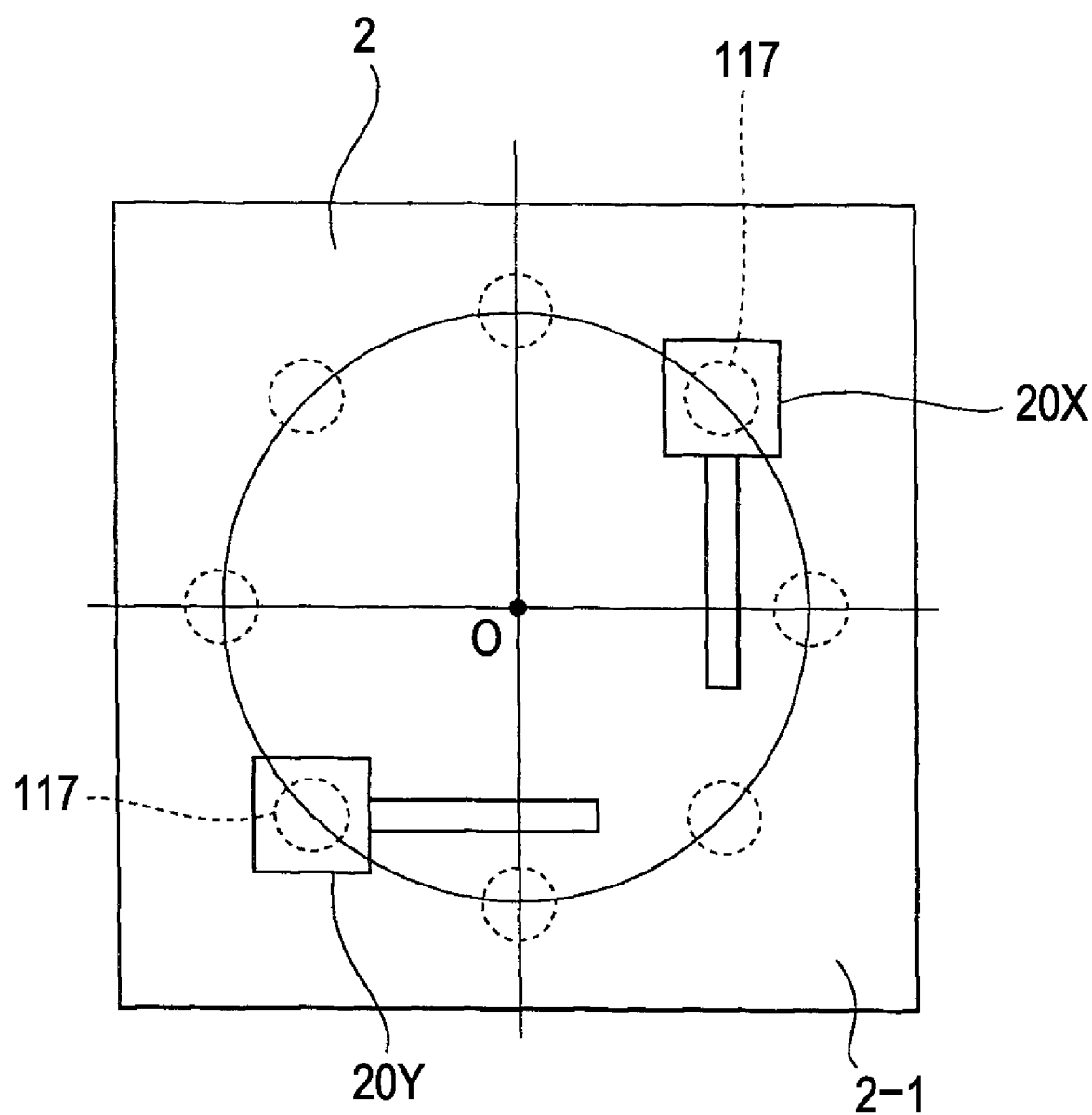
FIG. 87 is a partial plan view showing one arrangement example of the vibration elements according to the eighth embodiment of the present invention.
Figure 88:
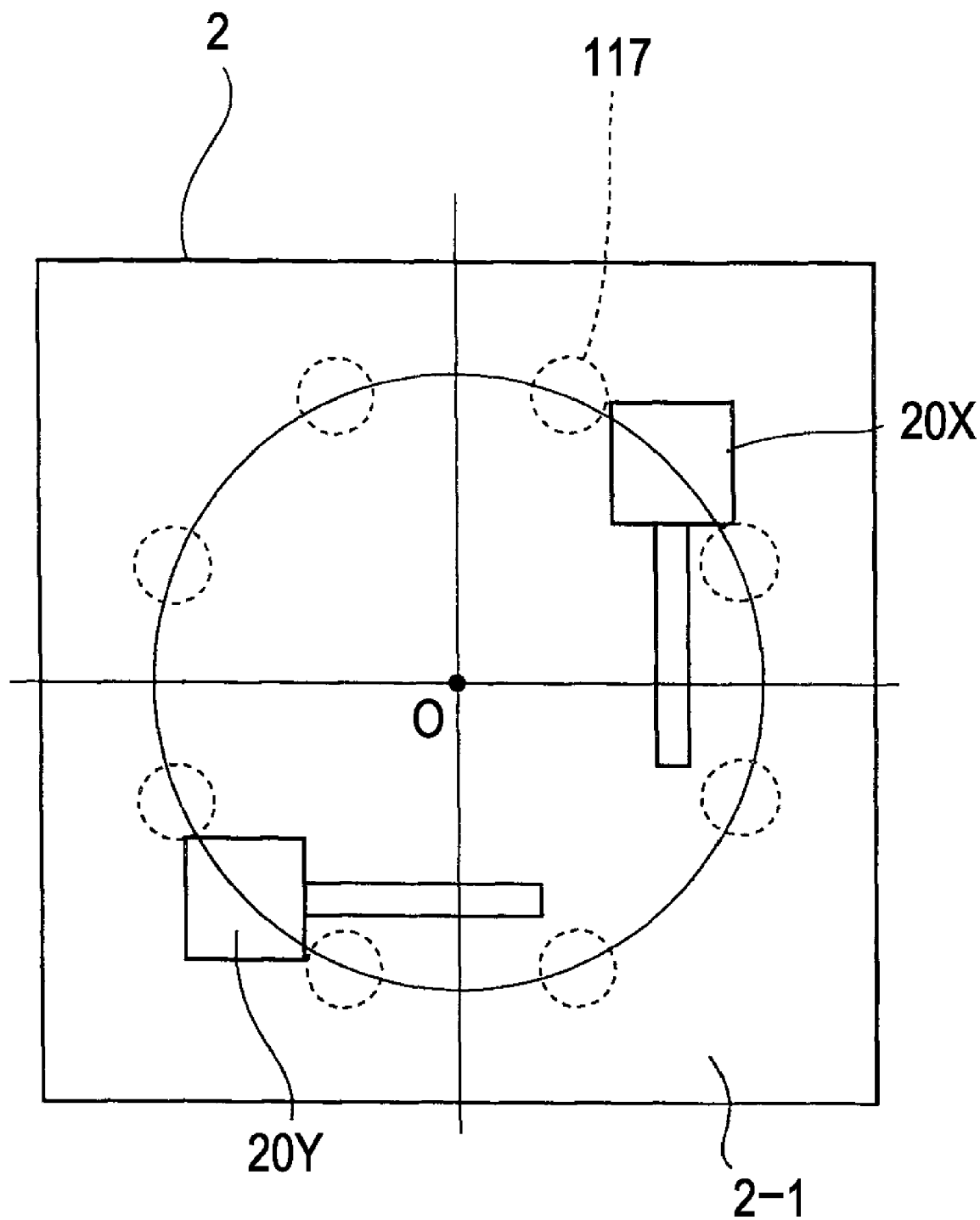
FIG. 88 is a partial plan view showing another arrangement example of the vibration elements according to the eighth embodiment of the present invention.

Furthermore, the vibration elements 20 may alternatively be disposed on the circle along which the external connection terminals 117 are arranged. In that case, rather than mounting the vibration elements 20 directly above the external connection terminals 117 as shown in FIG. 87, it is preferable that the vibration elements 20 be mounted at positions that are not directly above the external connection terminals 117 as shown in FIG. 88. This is due to the following reason. When external shock is received, the shock is transmitted to the supporting substrate 2 via the external connection terminals 117. If the vibration elements 20 are mounted directly above the external connection terminals 117, the amount of strain received by the vibration elements 20 increases, which may interfere with an achievement of a stable vibration mode.

The invention claimed is:
1. A vibratory gyrosensor comprising:
a supporting substrate, which has a wiring pattern having a plurality of lands disposed thereon; and
a vibration element mounted on a surface of the supporting substrate, the vibration element having a base portion having a mounting surface that faces the supporting substrate and provided with a plurality of terminals that are connected to the lands and a vibrator portion extending integrally from a side of the base portion in a cantilever manner and having a substrate-facing surface, the substrate-facing surface being provided with a first electrode layer, a piezoelectric layer stacked on the first electrode layer, and a second electrode layer stacked on the piezoelectric layer,
wherein,
at least one of the first electrode layer and second electrode layer having a plurality of electrodes,
the vibration element is mounted on the supporting substrate by joining the terminals to the lands with metallic projections disposed therebetween.
2. The vibratory gyrosensor according to claim 1, wherein the metallic projections comprise gold bumps each provided on a corresponding one of the terminals, each gold bump being welded to the corresponding one of the lands.
3. The vibratory gyrosensor according to claim 2, wherein each gold bump comprises multi-tiered bump components.

4. The vibratory gyrosensor according to claim 1, wherein the mounting surface of the base portion is provided with a dummy bump.

5. The vibratory gyrosensor according to claim 1, wherein the vibrator portion is disposed at a lower level from a top surface of the base portion with a slope disposed therebetween, and
at least one of the metallic projections is disposed in a region corresponding to a region in which the slope is not provided.

6. The vibratory gyrosensor according to claim 1, wherein the mounting surface of the base portion is provided with a groove which extends across a region between a base end of the vibrator portion and at least one of the terminals positioned proximate to the vibrator portion.

7. The vibratory gyrosensor according to claim 1, wherein the supporting substrate is provided with a recess in a region facing the substrate-facing surface of the vibrator portion, the recess providing a space in which the vibrator portion is allowed to vibrate freely in a thickness direction thereof.

8. The vibratory gyrosensor according to claim 1, wherein the supporting substrate has a circuit element and a plurality of vibration elements mounted thereon, the vibration elements have vibrator portions oriented in different axial directions from each other.

9. A vibratory gyrosensor comprising:
a supporting substrate, which has a circuit element mounted thereon and a wiring pattern having a plurality of lands disposed thereon; and
a vibration element mounted on a surface of the supporting substrate, the vibration element having a base portion having a mounting surface that faces the supporting substrate and provided with a plurality of terminals that are connected to the lands, and a vibrator portion extending integrally from a side of the base portion in a cantilever manner and having a substrate-facing surface, the substrate-facing surface being provided with a first electrode layer, a piezoelectric layer stacked on the first electrode layer, and a second electrode layer stacked on the piezoelectric layer,
wherein,
at least one of the first electrode layer and second electrode layer having a plurality of electrodes,
the vibration element is mounted on the supporting substrate by joining the terminals to the lands with metallic projections disposed therebetween,
wherein the supporting substrate has a first main surface on which the vibration element and the circuit element are mounted, and a second main surface is provided with a plurality of external connection terminals for electrically connecting the vibration element to an external control substrate.

10. The vibratory gyrosensor according to claim 9, wherein the vibration element is covered with a light-shielding cover.

11. The vibratory gyrosensor according to claim 9, wherein the external connection terminals and the control substrate have a load buffering layer disposed therebetween.

12. The vibratory gyrosensor according to claim 1, wherein the substrate-facing surface is flush with the mounting surface of the base portion.

13. The vibratory gyrosensor according to claim 9, wherein the substrate-facing surface is flush with the mounting surface of the base portion.

14. The vibratory gyrosensor according to claim 1, wherein:
the mounting surface of the base portion is square shape, and
the plurality of lands is equal to at least four lands and two of the plurality of lands are located at corner positions of the mounting surface.

* * * * *